(12) United States Patent
Mittal et al.

(10) Patent No.: US 12,346,913 B2
(45) Date of Patent: Jul. 1, 2025

(54) METHOD, APPARATUS AND COMPUTER PROGRAM PRODUCT FOR PREDICTIVE GRAPH-BASED NETWORK ANALYSIS

(71) Applicant: UnitedHealth Group Incorporated, Minnetonka, MN (US)

(72) Inventors: Chirag Mittal, Gurgaon (IN); Arjun Rana, Noida (IN); Rajesh Sabapathy, Gurgaon (IN); Erin Conway, Minneapolis, MN (US); Sudeep Vishnumurthy, Eden Prairie, MN (US); Arushi Parganiha, Bhopal (IN)

(73) Assignee: UnitedHealth Group Incorporated, Minnetonka, MN (US)

( * ) Notice: Subject to any disclaimer, the term of this patent is extended or adjusted under 35 U.S.C. 154(b) by 110 days.

(21) Appl. No.: 17/249,383

(22) Filed: Mar. 1, 2021

(65) Prior Publication Data
US 2022/0277315 A1    Sep. 1, 2022

(51) Int. Cl.
*G06Q 30/018* (2023.01)
*G06F 16/908* (2019.01)
(Continued)

(52) U.S. Cl.
CPC ....... *G06Q 30/0185* (2013.01); *G06F 16/908* (2019.01); *G06F 16/951* (2019.01);
(Continued)

(58) Field of Classification Search
CPC ........... G06Q 10/0635; G06Q 30/0201; G06Q 10/10; G06Q 40/08; G06Q 50/01; G06Q 30/0185; G06F 16/951; G06F 16/908
See application file for complete search history.

(56) References Cited

U.S. PATENT DOCUMENTS 8,290,845 B2    10/2012   Leibon et al.
10,009,358 B1 *  6/2018   Xie ...................... G06F 21/552
(Continued)

OTHER PUBLICATIONS

Feczak, Szabolcs et al. "Towards a Complex Adaptive Link Prediction in Health Insurance Fraud," Association for Information Systems AIS Electronic Library (AISeL), UK Academy for Information Systems Conference Proceedings 2011, Paper 16, Apr. 11, 2011, (15 pages), DOI: http://aisel.aisnet.org/ukais2011/16.
(Continued)

*Primary Examiner* — Deirdre D Hatcher
(74) *Attorney, Agent, or Firm* — ALSTON & BIRD LLP

(57) ABSTRACT

Methods, apparatuses, systems, computing entities, and/or the like are provided. An example method may include retrieving a scheme data object; generating a tabular data object; generating a graph data object including a plurality of nodes and a plurality of edges; calculating, based on the graph data object, a plurality of node attributes for the plurality of nodes and a plurality of edge attributes for the plurality of edges; identifying at least one irregular member node from the plurality of member nodes; identifying at least one irregular referring provider node from the plurality of referring provider nodes; identifying at least one irregular servicing provider node from the plurality of servicing provider nodes based at least in part on the at least one irregular member node and the at least one irregular referring provider node; and performing one or more responsive actions.

19 Claims, 19 Drawing Sheets

(51) Int. Cl.
   *G06F 16/951*   (2019.01)
   *G06Q 10/0635*  (2023.01)
   *G06Q 10/10*    (2023.01)
   *G06Q 30/0201*  (2023.01)
   *G06Q 40/08*    (2012.01)
   *G06Q 50/00*    (2012.01)

(52) U.S. Cl.
   CPC ......... *G06Q 10/0635* (2013.01); *G06Q 10/10* (2013.01); *G06Q 30/0201* (2013.01); *G06Q 40/08* (2013.01); *G06Q 50/01* (2013.01)

(56) References Cited

U.S. PATENT DOCUMENTS

| | | |
|---|---|---|
| 10,372,879 B2 | 8/2019 | Subramanian et al. |
| 10,460,377 B2 | 10/2019 | Waks et al. |
| 10,509,890 B2 | 12/2019 | Van Arkel et al. |
| 2008/0172257 A1 | 7/2008 | Bisker et al. |
| 2015/0235334 A1 | 8/2015 | Wang et al. |
| 2016/0117778 A1 | 4/2016 | Costello et al. |
| 2018/0181625 A1* | 6/2018 | Lyons ................... G06F 16/248 |
| 2019/0311377 A1 | 10/2019 | Ruan et al. |
| 2020/0027089 A1* | 1/2020 | Kuchar ............... G06Q 20/4016 |
| 2020/0272740 A1* | 8/2020 | Obee ..................... G06F 21/577 |
| 2022/0172211 A1* | 6/2022 | Muthuswamy ........ G06N 20/00 |

OTHER PUBLICATIONS

Liu, Juan et al. "Graph Analysis for Detecting Fraud, Waste, and Abuse in Health-Care Data," AI Magazine, vol. 37, No. 2, Jul. 4, 2016, pp. 33-46.

* cited by examiner

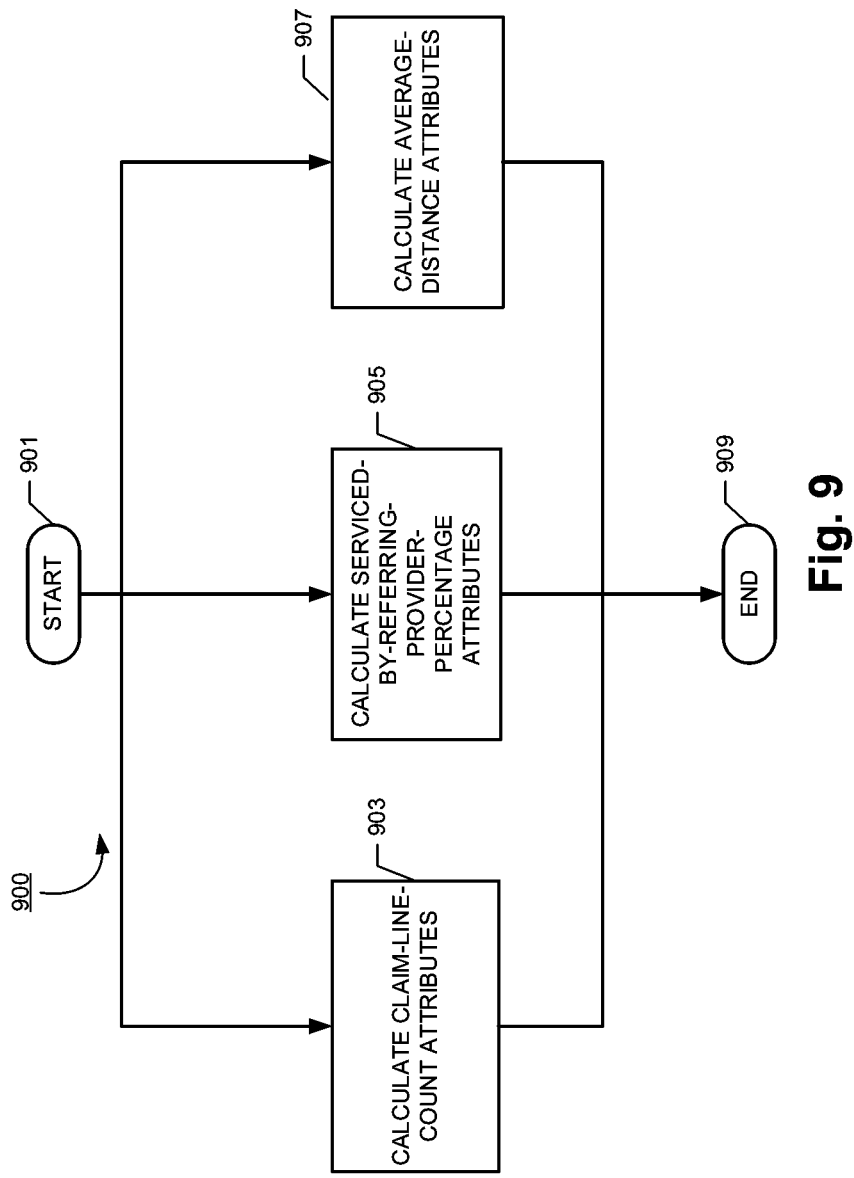

METHOD, APPARATUS AND COMPUTER PROGRAM PRODUCT FOR PREDICTIVE GRAPH-BASED NETWORK ANALYSIS

TECHNOLOGICAL FIELD

Embodiments of the present disclosure relate generally to predictive graph-based network analysis techniques that may improve interpretability of and reduce the false positive rate in identifying network-wide irregularities. For example, various embodiments of the present disclosure may be implemented to detect fraud across a network by identifying suspicious members, suspicious referring providers, and suspicious servicing providers through conducting a predictive graph-based network analysis.

BACKGROUND

Applicant has identified many technical challenges and difficulties associated with conventional fraud detection techniques. For example, many fraud detection techniques fail to provide accurate results and/or consume unnecessary computing resources.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to retrieve a scheme data object, wherein the scheme data object comprises scheme metadata; generate a tabular data object based at least in part on a plurality of input data objects and the scheme metadata of the scheme data object; generate a graph data object based at least in part on the tabular data object, wherein the graph data object comprises a plurality of nodes and a plurality of edges, wherein the plurality of nodes comprises a plurality of member nodes, a plurality of referring provider nodes, and a plurality of servicing provider nodes, wherein each of the plurality of edges connects two of the plurality of nodes; calculate, based at least in part on the graph data object, a plurality of node attributes for the plurality of nodes and a plurality of edge attributes for the plurality of edges; identify at least one irregular member node from the plurality of member nodes based at least in part on at least one of the plurality of node attributes or the plurality of edge attributes; identify at least one irregular referring provider node from the plurality of referring provider nodes based at least in part on at least one of the plurality of node attributes or the plurality of edge attributes; identify at least one irregular servicing provider node from the plurality of servicing provider nodes based at least in part on the at least one irregular member node and the at least one irregular referring provider node; and perform one or more responsive actions based on the at least in part on the at least one irregular member node, the at least one irregular referring provider node, and the at least one irregular servicing provider node.

In some embodiments, prior to retrieving the scheme data object, the at least one non-transitory memory and the computer program code are configured to, with the at least one processor, cause the apparatus to: access webpage data objects comprising webpage metadata; perform natural language processing on the webpage metadata to generate the scheme data object; and store the scheme data object in a database.

In some embodiments, when generating the tabular data object, the at least one non-transitory memory and the computer program code are configured to, with the at least one processor, cause the apparatus to: retrieve the plurality of input data objects, wherein each of the plurality of input data objects comprises input metadata; and select a first subset of input data objects from the plurality of input data objects, wherein at least one input metadata field of the input metadata of each input data object in the first subset of input data objects matches a corresponding scheme metadata field of the scheme metadata of the scheme data object.

In some embodiments, the at least one non-transitory memory and the computer program code are configured to, with the at least one processor, cause the apparatus to: generate the tabular data object based at least in part on the first subset of input data objects, wherein the tabular data object indicates a plurality of tabular correlations among the input metadata of the first subset of input data objects.

In some embodiments, the at least one non-transitory memory and the computer program code are configured to, with the at least one processor, cause the apparatus to: select a second subset of input data objects from the plurality of input data objects, wherein an input actor metadata field of the input metadata of each input data object in the second subset of input data objects matches the input actor metadata field of the input metadata of at least one input data object in the first subset of input data objects; and generate the tabular data object based at least in part on the second subset of input data objects, wherein the tabular data object indicates a plurality of tabular correlations among the input metadata of the second subset of input data objects.

In some embodiments, when generating the graph data object, the at least one non-transitory memory and the computer program code are configured to, with the at least one processor, cause the apparatus to: generate the plurality of member nodes based at least in part on a first subset of input actor metadata of the plurality of input data objects indicating a plurality of members; generate the plurality of referring provider nodes based at least in part on a second subset of input actor metadata of the plurality of input data objects indicating a plurality of referring providers; and generate the plurality of servicing provider nodes based at least in part on a third subset of input actor metadata of the plurality of input data objects indicating a plurality of servicing providers.

In some embodiments, when generating the graph data object, the at least one non-transitory memory and the computer program code are configured to, with the at least one processor, cause the apparatus to: generate the plurality of edges based at least in part on a plurality of tabular correlations indicated by the tabular data object.

In some embodiments, when calculating the plurality of node attributes for the plurality of nodes and the plurality of edge attributes for the plurality of edges, the at least one non-transitory memory and the computer program code are configured to, with the at least one processor, cause the apparatus to: calculate a plurality of claim-line-count attributes for the plurality of member nodes; calculate a plurality of serviced-by-referring-provider-percentage attributes for the plurality of member nodes; and calculate a plurality of average-distance attributes for the plurality of member nodes.

In some embodiments, when identifying the at least one irregular member node from the plurality of member nodes, the at least one non-transitory memory and the computer program code are configured to, with the at least one processor, cause the apparatus to: select a candidate member node from the plurality of member nodes; determine whether a claim-line-count attribute of the candidate member node is an outlier attribute among the plurality of claim-line-count attributes; determine whether a serviced-by-referring-provider-percentage attribute of the candidate member node is an outlier attribute among the plurality of serviced-by-referring-provider-percentage attributes; and determine whether an average-distance attribute of the candidate member node is an outlier attribute among the plurality of average-distance attributes.

In some embodiments, when identifying the at least one irregular member node from the plurality of member nodes, the at least one non-transitory memory and the computer program code are configured to, with the at least one processor, cause the apparatus to: calculate a Mahalanobis distance value based at least in part on the claim-line-count attribute, the serviced-by-referring-provider-percentage attribute, and the average-distance attribute.

In some embodiments, the at least one non-transitory memory and the computer program code are configured to, with the at least one processor, cause the apparatus to: identify the candidate member node as one of the at least one irregular member node in response to determining that: the Mahalanobis distance value satisfies a Mahalanobis distance threshold, and at least two conditions of a group of conditions are satisfied, the group of conditions comprising: (1) a first condition requiring that the claim-line-count attribute being the outlier attribute among the plurality of claim-line-count attributes, (2) a second condition requiring that the serviced-by-referring-provider-percentage attribute being the outlier attribute among the plurality of serviced-by-referring-provider-percentage attributes, and (3) a third condition requiring that the average-distance attribute being the outlier attribute among the plurality of average-distance attributes.

In some embodiments, when calculating the plurality of node attributes for the plurality of nodes and the plurality of edge attributes for the plurality of edges, the at least one non-transitory memory and the computer program code are configured to, with the at least one processor, cause the apparatus to: calculate a plurality of average-claim-line-per-member attributes for the plurality of referring provider nodes; calculate a plurality of claim-line-count attributes for the plurality of referring provider nodes; calculate a plurality of serviced-member-percentage attributes for the plurality of referring provider nodes; calculate a plurality of average-distance attributes for the plurality of referring provider nodes; calculate a plurality of member-entropy attributes for the plurality of referring provider nodes; and calculate a plurality of servicing-provider-entropy attributes for the plurality of referring provider nodes.

In some embodiments, when identifying the at least one irregular referring provider node from the plurality of referring provider nodes, the at least one non-transitory memory and the computer program code are configured to, with the at least one processor, cause the apparatus to: select a candidate referring provider node from the plurality of referring provider nodes; determine whether an average-claim-line-per-member attribute of the candidate referring provider node is an outlier attribute among the plurality of average-claim-line-per-member attributes; determine whether a claim-line-count attribute of the candidate referring provider node is an outlier attribute among the plurality of claim-line-count attributes; determine whether a serviced-member-percentage attribute of the candidate referring provider node is an outlier attribute among the plurality of serviced-member-percentage attributes; determine whether an average-distance attribute of the candidate referring provider node is an outlier attribute among the plurality of average-distance attributes; determine whether a member-entropy attribute of the candidate referring provider node is an outlier attribute among the plurality of member-entropy attributes; and determine whether a servicing-provider-entropy attribute of the candidate referring provider node is an outlier attribute among the plurality of servicing-provider-entropy attributes.

In some embodiments, when identifying the at least one irregular referring provider node from the plurality of referring provider nodes, the at least one non-transitory memory and the computer program code are configured to, with the at least one processor, cause the apparatus to: calculate a Mahalanobis distance value based at least in part on the average-claim-line-per-member attribute, the claim-line-count attribute, the serviced-member-percentage attribute, the average-distance attribute, the member-entropy attribute, and the servicing-provider-entropy attribute.

In some embodiments, the at least one non-transitory memory and the computer program code are configured to, with the at least one processor, cause the apparatus to: identify the candidate referring provider node as one of the at least one irregular referring provider node in response to determining that: the Mahalanobis distance value satisfies a Mahalanobis distance threshold, and at least three conditions of a group of conditions are satisfied, the group of conditions comprising: (1) a first condition requiring that the average-claim-line-per-member attribute being the outlier attribute among the plurality of average-claim-line-per-member attributes, (2) a second condition requiring that the claim-line-count attribute being the outlier attribute among the plurality of claim-line-count attributes, (3) a third condition requiring that the serviced-member-percentage attribute being the outlier attribute among the plurality of serviced-member-percentage attributes, (4) a fourth condition requiring that the average-distance attribute being the outlier attribute among the plurality of average-distance attributes, (5) a fifth condition requiring that the member-entropy attribute being the outlier attribute among the plurality of member-entropy attributes, and (6) a sixth condition requiring that the servicing-provider-entropy attribute being the outlier attribute among the plurality of servicing-provider-entropy attributes.

In some embodiments, when identifying the at least one irregular servicing provider node from the plurality of servicing provider nodes, the at least one non-transitory memory and the computer program code are configured to, with the at least one processor, cause the apparatus to: identify a candidate servicing provider node from the plurality of servicing provider nodes; calculate a first percentage based at least in part on a first number of edges connecting the at least one irregular member node to the candidate servicing provider node and a second number of edges connecting the plurality of member nodes to the candidate servicing provider node; calculate a second percentage based at least in part on a third number of edges connecting the at least one irregular referring provider node to the candidate servicing provider node and a fourth number of edges connecting the plurality of referring provider nodes to the candidate servicing provider node; determine a plurality of irregular communities among the plurality of servicing provider nodes; and determine whether the candidate servicing provider node is at least one of the at least one irregular servicing provider node based at least in part on the first percentage, the second percentage, and the plurality of irregular communities.

In accordance with various embodiments of the present disclosure, a computer-implemented method is provided. The computer-implemented method may comprise: retrieving, using one or more processors, a scheme data object, wherein the scheme data object comprises scheme metadata; generating, using the one or more processors, a tabular data object based at least in part on a plurality of input data objects and the scheme metadata of the scheme data object; generating, using the one or more processors, a graph data object based at least in part on the tabular data object, wherein the graph data object comprises a plurality of nodes and a plurality of edges, wherein the plurality of nodes comprises a plurality of member nodes, a plurality of referring provider nodes, and a plurality of servicing provider nodes, wherein each of the plurality of edges connects two of the plurality of nodes; calculating, by the one or more processors and based at least in part on the graph data object, a plurality of node attributes for the plurality of nodes and a plurality of edge attributes for the plurality of edges; identifying, by the one or more processors, at least one irregular member node from the plurality of member nodes based at least in part on the plurality of node attributes or the plurality of edge attributes; identifying, by the one or more processors, at least one irregular referring provider node from the plurality of referring provider nodes based at least in part on the plurality of node attributes or the plurality of edge attributes; identifying, by the one or more processors, at least one irregular servicing provider node from the plurality of servicing provider nodes based at least in part on the at least one irregular member node and the at least one irregular referring provider node; and performing, by the one or more processors, one or more responsive actions based on the at least in part on the at least one irregular member node, the at least one irregular referring provider node, and the at least one irregular servicing provider node.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to retrieve a scheme data object, wherein the scheme data object comprises scheme metadata; generate a tabular data object based at least in part on a plurality of input data objects and the scheme metadata of the scheme data object; generate a graph data object based at least in part on the tabular data object, wherein the graph data object comprises a plurality of nodes and a plurality of edges, wherein the plurality of nodes comprises a plurality of member nodes, a plurality of referring provider nodes, and a plurality of servicing provider nodes, wherein each of the plurality of edges connects two of the plurality of nodes; calculate, based at least in part on the graph data object, a plurality of node attributes for the plurality of nodes and a plurality of edge attributes for the plurality of edges; identify at least one irregular member node from the plurality of member nodes based at least in part on the plurality of node attributes or the plurality of edge attributes; identify at least one irregular referring provider node from the plurality of referring provider nodes based at least in part on at least one of the plurality of node attributes or the plurality of edge attributes; identify at least one irregular servicing provider node from the plurality of servicing provider nodes based at least in part on the at least one irregular member node and the at least one irregular referring provider node; and perform one or more responsive actions based on the at least in part on the at least one irregular member node, the at least one irregular referring provider node, and the at least one irregular servicing provider node.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 3:
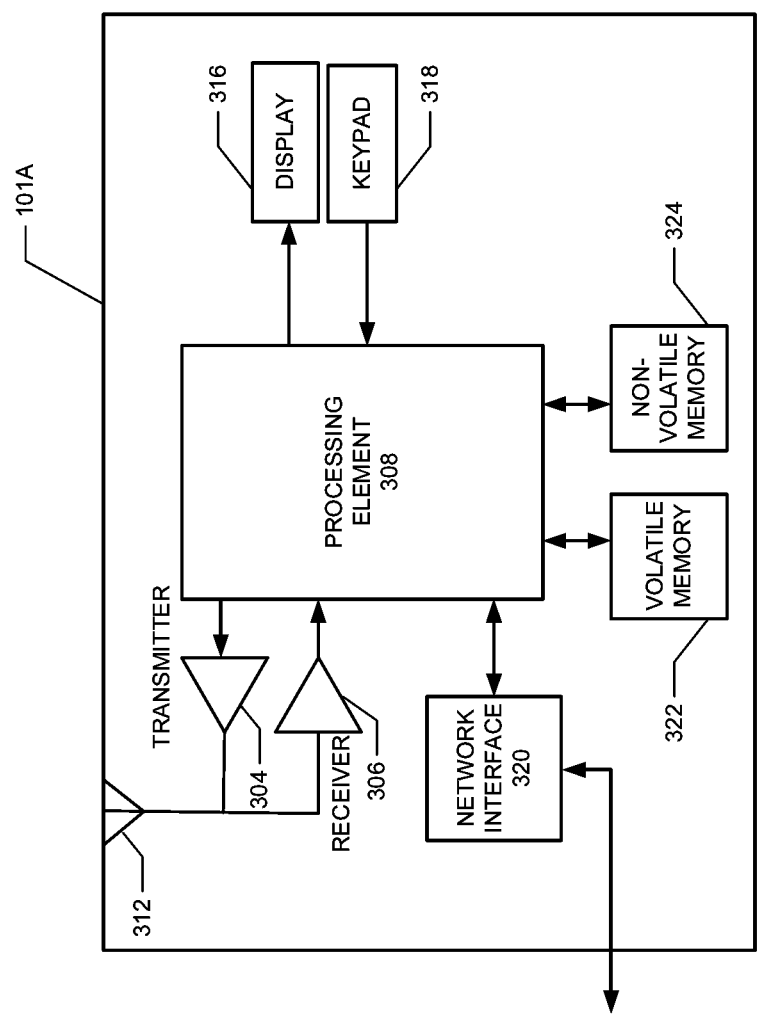

FIG. 3 is a schematic representation of an example user computing entity in accordance with various embodiments of the present disclosure; and FIGS. 4, 5, 6, 7, 8, 9, 10A, 10B, 11, 12, 13, 14, 15A, 15B, 16, 17, 18, 19A, 19B, 20, and 21 provide example flowcharts and diagrams illustrating example steps, processes, procedures, and/or operations associated with an example network analysis platform/system in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

I. Overview and Technical Advantages

Various embodiments of the present invention disclose techniques for pattern recognitions in transactional datasets that facilitate detecting anomalous/irregular activity patterns (e.g., fraudulent activity schemes) in such transactional datasets. To do so, various embodiments of the present invention convert transactional dataset into multi-node-type graph data objects, and then analyze interactions of a first subset of the node types to determine a first subset of anomalous nodes belonging to a first subset of node types that can then be used to detect a second subset of anomalous nodes belong to a second subset of node types. For example, the noted techniques can be used to: (i) convert transactional data into a graph data object characterized by edges between member nodes, servicing provider nodes, and referring provider nodes, (ii) analyze the graph to detect anomalous member nodes and anomalous referring provider nodes, and (iii) determine anomalous servicing provider nodes based on the detected anomalous member nodes and the detected anomalous referring provider nodes. This stage-wise processing of a graph data object uses graph processing inferences from earlier graph processing iterations to facilitate generating graph processing inferences in later graph processing iterations, an approach that reduces the computational complexity of later graph processing iterations by reducing the search space of those later graph processing iterations.

Accordingly, by reducing the computational complexity of later graph processing iterations by reducing the search space of those later graph processing iterations, various embodiments of the present invention reduce the computational complexity of graph-based pattern recognition in transactional datasets, which in turn reduces the computational complexity of performing pattern recognition in relation to transactional datasets more generally. This in turn increases improves the computational efficiency of performing pattern recognition and makes important technical contributions to the field of predictive data analysis, especially to the sub-field of transactional data predictive data analysis.

An exemplary application of some of the concepts of the present disclosure relates to detecting healthcare fraud based on predictive analysis of healthcare networks. Healthcare fraud refers to dishonest and intentional acts that are committed by one or more actors, individually or in collusion, with the understanding or expectations that such acts would induce healthcare insurance benefit to the actor committed the act(s) (or another actor who did not commit the act(s)), and such actor(s) are not entitled to such benefit but for the dishonest and intentional acts. These actors may commit fraud by, for example, submitting health insurance claims (which is a demand or request for payment or reimbursement) for healthcare services that are unnecessary or not rendered, or submitting health insurance claims that contain mistakes.

There are various types of actors that may be involved in or associated with healthcare fraud. For example, a "member" refers an individual whom received healthcare service and/or is covered under a health insurance plan, for example (an insurance policy holder through independent subscription to a health insurance policy or through coverage extension by another policyholder). A "referring provider" in this context may refer to an individual or facility (for example, a physician) who orders, directs, or refers a patient (for example, a health insurance member) to another individual or facility (for example, a servicing provider as defined herein), where the other individual or facility may provide or render healthcare services to the patient. A "servicing provider" may refer to an individual or facility who provides or renders healthcare services to a patient (for example, a member). Information associated with members, referring providers, and servicing providers may be reported in a health insurance claim.

For example, a family physician (e.g. a referring provider) may refer a patient (e.g. a member) to a specialist (e.g. a servicing provider). As another example, a primary care provider (e.g. a referring provider) may order a test for a patient (e.g. a member) through a testing laboratory (e.g. a servicing provider).

As described above, healthcare fraud may be committed through a collusion of actors, and many methods and systems face technical challenges and limitations in detecting such healthcare fraud scenarios. For example, given the large amount of datasets associated with health insurance claims, many methods and systems produce a high false positive rate when identifying potential healthcare fraud. As another example, many methods and systems provide low interpretability in relation to reasons why a member, a referring provider, or a servicing provider is identified as suspicious of committing healthcare fraud.

Accordingly, as described above, there are technical challenges, deficiencies and problems associated identifying healthcare fraud.

In some embodiments, algorithmic approaches to detect healthcare fraud may involve claim-level solutions and provider-level solutions. However, these solutions may face many technical imitations in detecting healthcare fraud. The claim-level solutions review a claim in isolation, and their technical limitations include potentially missing out on broader behavioral trends at the level of an individual provider. The provider-level solutions review activities associated with a provider in isolation, and their technical limitations include: (a) they may potentially miss out on providers colluding to perpetuate healthcare fraud; and (b) they may not necessarily take into consideration member behavior.

In contrast, virous embodiments of the present disclosure provide approaches based on network analysis to detect healthcare fraud. These network analysis approaches may overcome the technical limitations of claim-level and provider-level solutions by taking into consideration network-wide relationships between claims, providers and groups of providers. This allows for detection of collusion among providers and thereby may enable, for example, fraud investigation teams, law enforcement agencies, as well as payers to pursue a group of connected fraudulent providers rather than going after a single claim or a single provider.

Approaches based on network analysis may be differentiated based on whether they utilize data associated with already-identified fraudulent providers for ground truth/labels or not. In some examples, one network analysis approach for detecting healthcare fraud may involve the following: (i) creating a "monopartite" graph where there is only one type of node/vertex, representing individual providers, and the edges/connections between the nodes/vertices represent "shared members" (e.g. members who "visited" both providers, whose respective claims were received from both providers within a certain time window, and/or whose claims had both providers listed, for example one as referring provider and one as referring provider); (ii) calculating graph-related attributes of a mathematical nature such as degree, centrality, betweenness etc.; (iii) applying a suitable graph algorithm to detect outliers or communities of interest; and (iv) shortlisting the outliers or suspicious communities or suspicious providers (referred to as "leads" herein) inside suspicious communities based on graph-related mathematical attributes for further investigation by, for example, a fraud investigation team.

However, there are several technical limitations associated with the graph-based network analysis approaches discussed above. For example, the noted approaches often fail to integrate information about incidences when the same member visits multiple providers, which is a vital analytical clue for fraud detection.

As another example, the noted approaches fail to integrate information about the claims being filed by individual members. In some embodiments, although the shared-members edge can be populated with aggregated claim attributes across all the shared members, several important indicators which might help in identifying a suspicious member are ignored while aggregating attributes for all the members at a provider level, including but not limited to member's servicing relationship with all the associated referring providers, the ratio of member claims that relate to a scheme and the total number of the member's total claims, and/or the like. There are various graph-related metrics at a member level which cannot be created using the graph-based network analysis approaches, such as but not limited to entropy related attributes based on a proportion of claims of a referring provider that relate to all connected members. If the metric value is low, it may indicate that referring provider is referring most of the claims only for a few set of members.

As another example of the limitations of graph-based network analysis approaches, the shortlisting of outliers or suspicious communities or suspicious providers is based only on graph-related mathematical attributes, but these graph-related mathematical attribute may lack any real-world intuition about the exact suspicious behavior of the graphed providers. This makes it difficult for the fraud investigation team to reliably interpret and analyze these leads. The fraud investigation team may need to spend a significant amount of time conducting additional data analysis of their own to understand the exact behavior of these suspicious providers, or given the paucity of time at their end, look for quick ways to discard the leads as false positives. For example, in order to consume the leads, a fraud investigator may need various data points to build the required intuition—such as list of suspicious claims, list of members associated with a provider, amounts corresponding to the suspicious claims to know the dollar impact of the lead, and so on. But in the graph-based network analysis approaches described above, the dataset is aggregated at a provider level and ingested into the graph database, an approach as a result of to which all the granular information around claims and members are lost in the process. Consequently, the fraud investigator needs to churn through the entire data repository trying to find the "signals" that explain why the lead is suspicious in terms of real-world intuitions. As a result, a solution designed based on the graph-based network analysis approaches suffers from a high false positive rate, a significant increase in unnecessary computer resource usage (for example, processing resources needed for churning through the entire data repository described above), and/or the like.

In some examples, one network analysis approach for detecting healthcare fraud may creating a "bipartite" graph with two types of nodes/vertices, one for providers and one for members. The edges/connections in such graphs may represent different real-world properties depending on the implementation. However, there are several technical limitations associated with the above approach.

For example, the above bipartite-graph-based approach faces technical limitations in creating the graph structures in a manner that enables calculating attributes of every type of node and edge. The graph structure described in the above bipartite-graph-based approach will require various provider/member level attributes to be pre-computed before ingesting the data into graph. This removes the flexibility of calculating new attributes using the graph itself and by performing graph analysis on the graph, which in turn necessitates the creation of a novel graph structure.

As another example of the technical limitations of the bipartite-graph-based approach, the bipartite-graph-based approach faces technical limitations in identifying the various node-level and edge-level attributes that need to be created to achieve the objectives of low false positive rate and easy consumption of leads. To identify fraudulent providers with a high true positive rate, a large set of granular node attributes and edge attributes have to be created, which in turn reduces the efficiency and practicability of performing fraud detection using this bipartite-graph-based approach.

As another example of the technical limitations of the bipartite-graph-based approach, the bipartite-graph-based approach faces technical limitations in combining real-world intuitions about provider behavior and collusion with the mathematical nature of graph algorithms to generate leads that are both easy to consume and have a low false positive rate. For example, the fraudulent servicing providers do not yield themselves to easy detection as these providers may carry out fraudulent activities only with a few members/referring providers. Having a large member base usually hides suspicious behavioral patterns.

Various embodiments of the present disclosure may overcome the above-discussed technical challenges associated with other network analysis solutions. For example, in accordance with various embodiments of the present disclosure, a predictive graph-based network analysis is provided. In some embodiments, the predictive graph-based network analysis may create a graph data object that describes member nodes, referring provider nodes, servicing provider nodes, and edges connecting these nodes. Node attributes and edge attributes are dynamically calculated based on the graph data object. In some embodiments, the predictive graph-based network analysis may identify irregular member nodes that may indicate suspicious members. In some embodiments, the predictive graph-based network analysis may identify irregular referring provider nodes that may indicate suspicious referring providers (for example, based on the identified irregular member nodes). In some embodiments, the predictive graph-based network analysis may identify irregular servicing provider nodes that may indicate suspicious servicing providers (for example, based on the identified irregular referring provider nodes and the identified irregular member nodes).

As such, various embodiments of the present disclosure may provide a graph data object that retains a large set of granular node attributes and edge attributes associated with members, referring providers, and servicing providers, while providing the flexibility of calculating new attributes using the graph data object itself. All three sets of suspicious actors (suspicious members/referring providers/servicing providers) are identified with low false positive rate. As such, various embodiments are accompanied with attributes that describe and/or flag suspicious collusion among the actors, and these attributes may generate leads that are both easy to consume and have a low false positive rate. Various embodiments may reduce computer resource usage as compared to other approaches (for example, less processing resources needed for fraud investigation teams as they need to conduct minimal to no secondary analysis).

II. Definitions

In the present disclosure, the term "data object" may refer to a data structure that represents one or more functionalities and/or characteristics associated with a unit of data and/or information. In some embodiments, the data object may comprise one or more metadata fields. The term "metadata" refers to a parameter, a data field, a data element, or the like that describes an attribute of a data object. In some embodiments, metadata may include text string(s), numerical character(s), alphabetical character(s), alphanumeric code(s), American Standard Code for Information Interchange (ASCII) character(s), and/or the like.

For example, a "scheme data object" may refer to a data object associated with a fraud scheme (e.g., a healthcare fraud scheme) and may comprise data and/or information related to the fraud scheme. In this example, the scheme data object may comprise scheme metadata that describes data and/or information related to the healthcare fraud scheme. In some embodiments, the scheme metadata of a scheme data object may comprise one or more scheme metadata fields.

In some embodiments, the scheme data object and the scheme metadata may be generated by the computing entity based on one or more user inputs (for example, user inputs by a member of the fraud investigation team providing text strings that describe a potential scheme). For example, the scheme data object may comprise "note metadata" or "note metadata field" that provides data/information related to notes describing a fraud scheme. The scheme data object may comprise "provider specialty metadata" or "provider specialty metadata field" that provides data/information related to specialties of the providers associated with the fraud scheme. The scheme data object may comprise "procedure code metadata" or "procedure code metadata field" that provides data/information related to a procedure code list associated with the fraud scheme, which describes services which are misused to commit fraud. The scheme data object may comprise "geographical area metadata" or "geographical area metadata field" that provides data/information related to geographical area associated with the fraud scheme (for example, interconnected locations where the fraud is concentrated). The scheme data object may comprise "timeframe metadata" or "timeframe metadata field" that provides data/information related to a timeframe associated with the fraud scheme (for example, describing the onset of the fraudulent behavior or describing a historical period when the fraud scheme is thought to have been perpetuated). The scheme data object may comprise "line of business (LOB) metadata" or "LOB metadata field" that provides data/information related to line of business associated with the fraud scheme (Medicare, Medicaid or commercial).

In the present disclosure, the term "tabular data object" may refer to a type of data object that may be represented, processed, transmitted, and/or stored in a tabular form. For example, a tabular data object may order or arrangement data/information in one or more rows and one or more columns.

In the present disclosure, the term "input data object" or "claim data object" may refer to a type of data object that is associated with a claim under processing (e.g., a health insurance) and may comprise data and/or information related to the claim. In this example, the input data object may comprise "input metadata" (also referred to as "claim metadata") that describes data and/or information related to the claim. In some embodiments, the input metadata of an input data object may comprise one or more input metadata fields.

For example, the input data object may comprise "input type metadata" or "input type metadata field" (also referred to as "claim type metadata" or "claim type metadata field") that provides data/information related to the type of a health insurance claim (for example, a physician claim, a facility claim, etc. associated with the health insurance claim). The input data object may comprise "input actor metadata" or "input actor metadata field" (also referred to as "claim actor metadata" or "claim actor metadata field") that provides data/information related to the actors associated with the health insurance claim (for example, one or more names/identifiers of member(s), referring provider(s), and/or servicing provider(s) associated with the health insurance claim). The input data object may comprise "procedure code metadata" or "procedure code metadata field" that provides data/information related to procedure code associated with the health insurance claim (for example, CPT codes associated with the health insurance claim). The input data object may comprise "geographical area metadata" or "geographical area metadata field" that provides data/information related to geographical area associated with the health insurance claim (for example, where the services associated with the health insurance claim were rendered). The input data object may comprise "timeframe metadata" or "timeframe metadata field" that provides data/information related to timeframe associated with the health insurance claim (for example, the timeframe for rendering the service). The input data object may comprise "line of business (LOB) metadata" or "LOB metadata field" that provides data/information related to LOB associated with the health insurance claim. As used herein, the terms "claim data object" and "input data object" are used interchangeably. Moreover, as used herein, the terms "claims metadata" and "input metadata" are used interchangeably.

In the present disclosure, the term "graph data object" may refer to a type of data object that may be represented, processed, transmitted, and/or stored in a graph-based form. For example, a graph data object may describe an ordering or arrangement of data/information as nodes and edges connecting the nodes.

The term "webpage data object" may refer to a data object associated with a webpage and may comprise data/information related to the webpage. For example, the webpage data object may comprise webpage metadata that describes data and/or information related to the webpage. For example, the webpage metadata may describe one or more text files (for example, written in the Hypertext Markup Language (HTML), JavaScript codes, Cascading Style Sheets (CSS)). Additionally, or alternatively, the webpage metadata may comprise files such as, but not limited to, images, and/or other multimedia files. For example, the webpage data object may be associated with webpages of industry journals, web articles that describe, for example, information related to healthcare fraud. In this example, the webpage may include text files that describe an existing or suspected healthcare fraud scheme. In some embodiments, the webpage data object may be stored in a database. In some embodiments, the webpage data object may be dynamically generated based on, for example, a web crawler that systematically browses the World Wide Web.

The term "claim-line-count attribute" may refer to a data entity that is configured to describe a type of node attribute that is associated with counts (or the amount) of claim lines. For example, to calculate a claim-line-count attribute for a member node, a computing entity may calculate a first value that represents the total count or amount of claim lines that correlate the member node to referring provider node(s), and a second value that represents the count of amount of claim lines that correlate the member node to the referring provider node(s) and are related to a scheme data object. The computing entity may calculate a percentage or ratio of the second value in the first value as the claim-line-count attribute for the member node.

The term "serviced-by-referring-provider-percentage attribute" may refer to a data entity that is configured to describe a type of node attribute that indicates the proportion (for example, a percentage or ratio) of all referring provider(s) that also have servicing relationship with a member. For example, to calculate a serviced-by-referring-provider-percentage attribute, a computing entity may calculate a ratio of claims of a member that are referral claims to all of the claims of the member. In some embodiments, the serviced-by-referring-provider-percentage attribute may indicate whether the member has only a referring relationship with a provider or has also a servicing relationship with a provider (which may be expected in non-fraudulent circumstances).

The term "average-distance attribute" may refer to a data entity that describes a type of edge attribute that indicates an average physical distance between the locations of member(s) and referring provider(s). For example, the average-distance attribute for a member node may correspondence to an average physical distance between the location(s) of a member as represented by a member node and location(s) of all referring provider(s) correlated to that member as represented by referring provider node(s) that are connected to the member node. In some embodiments, the average-distance attribute may indicate, on an average, how far is the member from the referring providers that they see.

The term "average-claim-line-per-member attribute" may refer to data entity that describes a type of node attribute that is associated with counts (or the amount) of claim lines on a per member basis. For example, to calculate an average-claim-line-per-member attribute for a referring provider node, a computing entity may calculate a number of claim lines associated with the referring provider node that are associated with the scheme data object, and may divided by the number of member nodes that are correlated to the servicing provider node in the graph data object.

The term "serviced-member-percentage attribute" may refer to a data entity that is configured to describe a type of node attribute that indicates the proportion (for example, a percentage or ratio) of all member(s) that also have servicing relationship with a referring provider. In some embodiments, the serviced-member-percentage attribute may indicate whether the referring provider's relationship with their members center around referrals, as normally referring providers may also render some services to the member.

The term "member-entropy attribute" may refer to a data entity that is configured to describe an entropy value that corresponds to the share of claims that a referring provider node received from various members that are related to the scheme data object. In some embodiments, the member-entropy attribute may be low if the referring provider node refers most claims related to the fraud scheme as indicated by the scheme data object from only a few members.

The term "servicing-provider-entropy attribute" may refer to a data entity that is configured to describe an entropy value that corresponds to the share of claims that a referring provider node refers to various servicing providers that are related to the scheme data object. In some embodiments, the servicing-provider-entropy attribute may be low if the referring provider node refers most claims related to the fraud scheme as indicated by the scheme data object to only a few servicing providers.

III. Computer Program Products, Methods, and Computing Entities

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

Figure 1:
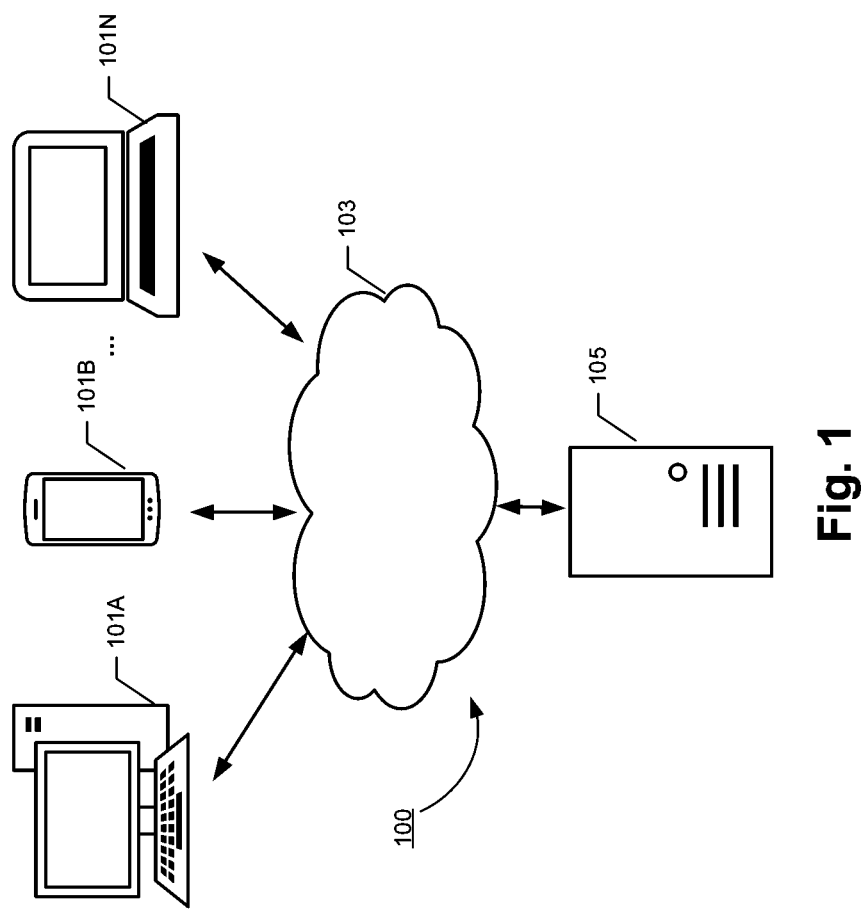
FIG. 1 is a diagram of an example network analysis platform/system that can be used in accordance with various embodiments of the present disclosure.

FIG. 1 provides an illustration of a network analysis platform/system 100 that can be used in conjunction with various embodiments of the present disclosure. As shown in FIG. 1, the network analysis platform/system 100 may comprise one or more network analysis computing entities 105, one or more user computing entities 101A, 101B, . . . 101N, and one or more networks 103. Each of the components of the network analysis platform/system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Network Analysis Computing Entity

Figure 2:
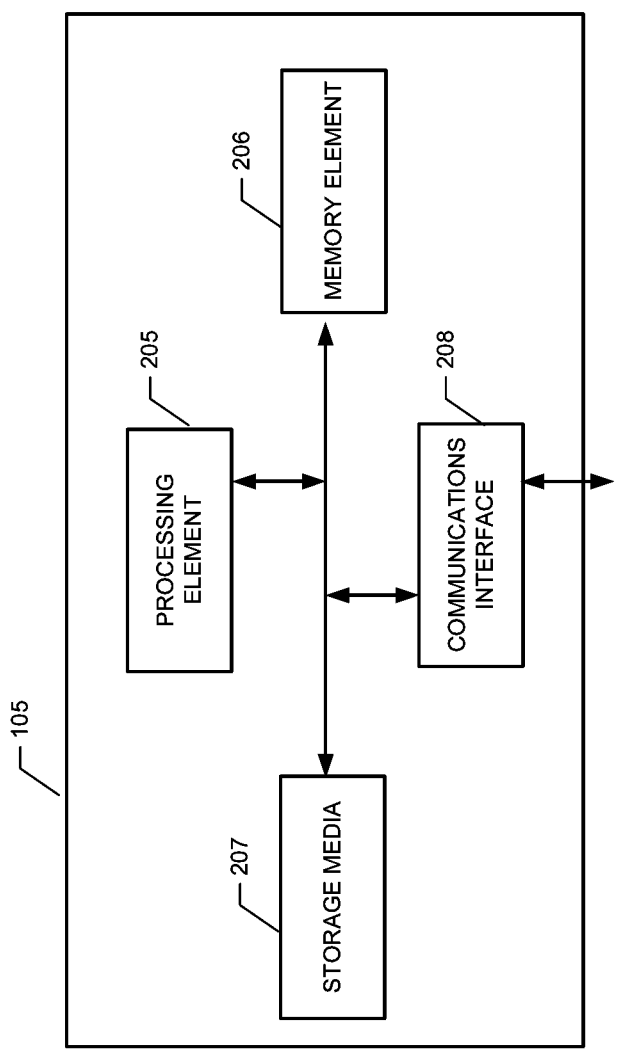
FIG. 2 is a schematic representation of an example network analysis computing entity in accordance with various embodiments of the present disclosure.

FIG. 2 provides a schematic of a network analysis computing entity 105 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the network analysis computing entity 105 may also include one or more network and/or communications interface 208 for communicating with various computing entities, such as by communicating data, content, information, and/or similar terms used herein that can be transmitted, received, operated on, processed, displayed, stored, and/or the like. For instance, the network analysis computing entity 105 may communicate with other network analysis computing entities 105, one or more user computing entities 101A-101N, and/or the like.

As shown in FIG. 2, in one embodiment, the network analysis computing entity 105 may include or be in communication with one or more processing elements (for example, processing element 205) (also referred to as processors, processing circuitry, and/or similar terms used herein interchangeably) that communicate with other elements within the network analysis computing entity 105 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the network analysis computing entity 105 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205 as shown in FIG. 2 and/or the processing element 308 as described in connection with FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the network analysis computing entity 105 with the assistance of the processing element 205 and operating system.

In one embodiment, the network analysis computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored. Further, the information/data required for the operation of the recovery prediction system may also be partially stored in the cloud data storage system and partially stored in a locally maintained data storage system. More specifically, storage media 207 may encompass one or more data stores configured to store information/data usable in certain embodiments.

As indicated, in one embodiment, the network analysis computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. For instance, the network analysis computing entity 105 may communicate with computing entities or communication interfaces of other network analysis computing entities 105, user computing entities 101A-101N, and/or the like.

As indicated, in one embodiment, the network analysis computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the network analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The network analysis computing entity 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/

Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the network analysis computing entity's components may be located remotely from components of other network analysis computing entities 105, such as in a distributed system. Furthermore, one or more of the components may be aggregated and additional components performing functions described herein may be included in the network analysis computing entity 105. Thus, the network analysis computing entity 105 can be adapted to accommodate a variety of needs and circumstances.

b. Exemplary User Computing Entity

FIG. 3 provides an illustrative schematic representative of one of the user computing entities 101A to 101N that can be used in conjunction with embodiments of the present disclosure. As will be recognized, the user computing entity may be operated by an agent and include components and features similar to those described in conjunction with the network analysis computing entity 105. Further, as shown in FIG. 3, the user computing entity may include additional components and features. For example, the user computing entity 101A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a network analysis computing entity 105, another user computing entity 101A, and/or the like. In this regard, the user computing entity 101A may be capable of operating with one or more air interface standards, communication protocols, modulation types, and access types. More particularly, the user computing entity 101A may comprise a network interface 320, and may operate in accordance with any of a number of wireless communication standards and protocols. In a particular embodiment, the user computing entity 101A may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The user computing entity 101A can also download changes, add-ons, and updates, for instance, to its firmware, software (e.g., including executable instructions, applications, program modules), and operating system.

According to one embodiment, the user computing entity 101A may include location determining aspects, devices, modules, functionalities, and/or similar words used herein interchangeably. For example, the user computing entity 101A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 101A may include indoor positioning aspects, such as a location module adapted to acquire, for example, latitude, longitude, altitude, geocode, course, direction, heading, speed, time, date, and/or various other information/data. Some of the indoor aspects may use various position or location technologies including Radio-Frequency Identification (RFID) tags, indoor beacons or transmitters, Wi-Fi access points, cellular towers, nearby computing devices (e.g., smartphones, laptops) and/or the like. For instance, such technologies may include iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user computing entity 101A may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 101A to cause display or audible presentation of information/data and for user interaction therewith via one or more user input interfaces. The user output interface may be updated dynamically from communication with the network analysis computing entity 105. The user input interface can comprise any of a number of devices allowing the user computing entity 101A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 101A can collect information/data, user interaction/input, and/or the like.

The user computing entity 101A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entities 101A-101N.

c. Exemplary Networks

In one embodiment, the networks 103 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 103 may have any suitable communication range associated therewith and may include, for example, global networks (e.g., the Internet), MANs, WANs, LANs, or PANs. In addition, the networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 103 may utilize a variety of networking protocols including, but not limited to, TCP/IP based networking protocols. In some embodiments, the protocol is a custom protocol of JavaScript Object Notation (JSON) objects sent via a Websocket channel. In some embodiments, the protocol is JSON over RPC, JSON over REST/HTTP, and/or the like.

V. Exemplary Operations

Reference will now be made to FIGS. 4, 5, 6, 7, 8, 9, 10A, 10B, 11, 12, 13, 14, 15A, 15B, 16, 17, 18, 19A, 19B, 20, and 21, which provide flowcharts and diagrams illustrating example steps, processes, procedures, and/or operations associated with a network analysis platform/system and/or a network analysis computing entity in accordance with various embodiments of the present disclosure.

While example embodiments of the present disclosure may be described in the context of identifying healthcare fraud schemes, as will be recognized, embodiments of the present disclosure are not limited to this context only. For example, the disclosed techniques may be utilized in other network-wide fraud detection schemes.

a. Exemplary Operations for Identification of Irregular Nodes

Figure 4:
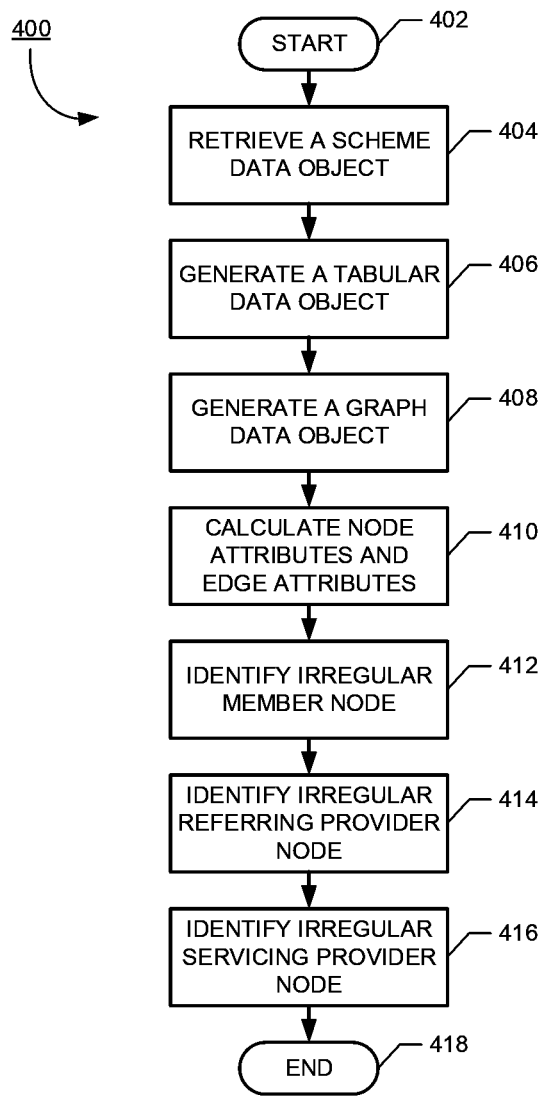

Referring now to FIG. 4, an example method 400 for identification of irregular member nodes (which correspond to suspicious members), irregular referring provider nodes (which correspond to suspicious referring providers), and irregular servicing provider nodes (which correspond to suspicious servicing providers) in accordance with embodiments of the present disclosure is provided.

The example method 400 starts at step/operation 402.

At step/operation 404, a computing entity (such as the network analysis computing entity 105 described above in connection with FIG. 1 and FIG. 2) may include means (such as the processing element 205 of the network analysis computing entity 105 described above in connection with FIG. 2) for retrieving a scheme data object.

As described above, a "scheme data object" may refer to a data object associated with a healthcare fraud scheme and may comprise data and/or information related to the healthcare fraud scheme. In this example, the scheme data object may comprise scheme metadata that describes data and/or information related to the healthcare fraud scheme.

As an example, the following illustrates example a scheme data object including the scheme metadata for the scheme data object. The example scheme data object may describe the following healthcare fraud scenario: providers in the states of Florida, Georgia, South Carolina and North Carolina who supply durable medical equipment (DME) were suspected in 2019 of supplying back braces to members who do not need them. These providers usually collude with a primary care physician to first get details of members. After receiving the member details, these providers may dump back braces even though a member does not need them. These back brace are expensive and the DME provider earns revenue by dumping these back braces. These providers may dump extra types of braces on these members and then file for claims with Medicare to get reimbursement. Usually, this goes unnoticed as CPT codes for all braces are different, resulting in a scenario according to which flag is not raised for these types of claims in fraud detection processes. In this case, the DME provider earns a revenue by dumping extra braces on members. In many cases, a claim is filed on behalf of a member and the member is not even aware of it. In this case, the provider earns without even incurring a cost on braces. In these cases, kickbacks are provided to primary care physicians for sharing member details and referring them to these DME providers. In 2019, many members complained about receiving unnecessary braces from DME providers. A series of investigations were conducted which identified multiple such fraudulent DME providers across the country. In multiple interviews, members complained about receiving unnecessary equipment even though they were physically fit enough to not to need this equipment, or were unable to use this equipment even if they wanted to use the equipment due to size mismatch.

Continuing from the above example, the scheme data object may comprise scheme metadata that include one or more of note metadata (describing the healthcare fraud scheme), provider specialty metadata (describing the specialty of the provider as DME), procedure code metadata (describing CPT codes referring to back braces), geographical area metadata (describing Florida, Georgia, South Carolina and North Carolina, which are the states that are associated with the healthcare fraud scheme), timeframe metadata (describing 2019), or line of business (LOB) metadata (describing Medicare and retirement).

Figure 5:
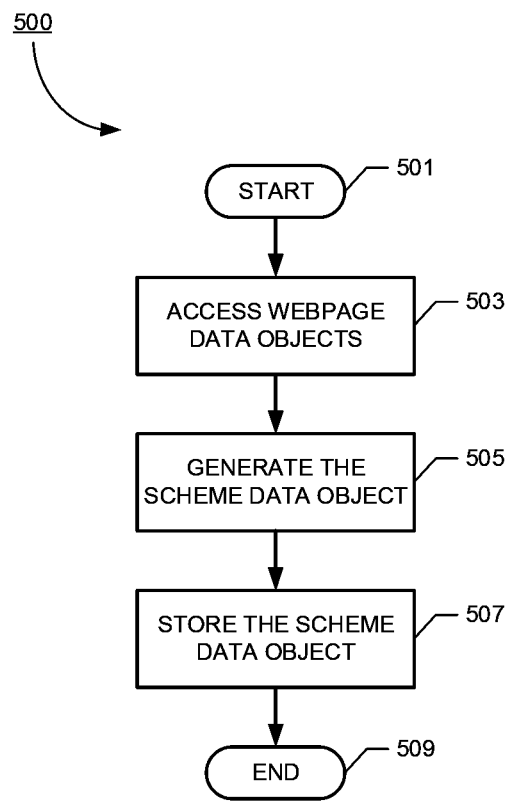

While the description above provides an example of retrieving a scheme data object, it is noted that the scope of the present disclosure is not limited to the exemplary description above. In some embodiments, a scheme data object may be generated and/or retrieved based on one or more additional and/or alternative steps/operations. For example, FIG. 5 provides example steps/operations associated with generating and storing a scheme data object, details of which are described herein.

Referring back to FIG. 4, subsequent to step/operation 404, the example method 400 proceeds to step/operation 406. At step/operation 406, a computing entity (such as the network analysis computing entity 105 described above in connection with FIG. 1 and FIG. 2) may include means (such as the processing element 205 of the network analysis computing entity 105 described above in connection with FIG. 2) for generating a tabular data object.

As described above, the term "tabular data object" refers to a type of data object that may be represented, processed, transmitted, and/or stored in a tabular form. For example, a tabular data object may describe an ordering or arrangement of data/information in one or more rows and one or more columns.

In some embodiments, the computing entity may generate the tabular data object based at least in part on a plurality of input data objects and the scheme metadata of the scheme data object retrieved at step/operation 404.

In some embodiments, the plurality of input data objects may be retrieved from a database. As described above, the term "input data object" may refer to a type of data object that is associated with a health insurance claim and may comprise data and/or information related to the health insurance claim.

In some embodiments, the tabular data object may comprise a plurality of columns and a plurality of rows. In some embodiments, each of the plurality of columns may correspond to one of input metadata types associated with input data objects (for example, claim type metadata, claim actor metadata, procedure code metadata, geographical area metadata, timeframe metadata, or LOB metadata), and each of the plurality of rows may corresponding to each of the input data objects. As such, each cell (defined by a corresponding column and a corresponding row) in the tabular data object may indicate data/information for metadata associated with an input data object.

Continuing from the example above, based on the scheme metadata of the scheme data object, the computing entity may filter input data objects via their corresponding input metadata types such as, but not limited to, claim type metadata, claim actor metadata, procedure code metadata, geographical area metadata, timeframe metadata, or line of business (LOB) metadata. For example, the computing entity may identify one or more input data objects that comprise input metadata that include procedure code (for example, CPT codes) referring to back braces, geographical area metadata describing Florida, Georgia, South Carolina or North Carolina, timeframe metadata describing 2019, and/or line of business (LOB) metadata describing Medicare and retirement.

In some embodiments, the computing entity may identify members (for example, based on the input actor metadata of these filtered data objects) who received services that are present in the impacted set of procedures. In some embodiments, the computing entity may identify servicing providers (for example, based on the input actor metadata of these filtered data objects) who provided services that are present in the impacted set of procedures. In some embodiments, the computing entity may identify referring providers (for example, based on the input actor metadata of these filtered data objects) who referred for the services present in the impacted set of procedures. In some embodiments, the computing entity may extract all of the claim objects corresponding to identified members, servicing providers and referring providers to generate the tabular data object, exemplary details of which are described in connection with FIG. 6.

Referring back to FIG. 4, subsequent to step/operation 406, the example method 400 proceeds to step/operation 408. At step/operation 408, a computing entity (such as the network analysis computing entity 105 described above in connection with FIG. 1 and FIG. 2) may include means (such as the processing element 205 of the network analysis computing entity 105 described above in connection with FIG. 2) for generating a graph data object.

As described above, the term "graph data object" refers to a type of data object that may be represented, processed, transmitted, and/or stored in a graph-based form. For example, a graph data object may describe an ordering or arrangement of data/information as nodes and edges connecting the nodes. For example, the graph data object may comprise a plurality of nodes and a plurality of edges, and each of the plurality of edges may connect two of the plurality of nodes.

In some embodiments, the plurality of nodes may comprise a plurality of member nodes, a plurality of referring provider nodes, and a plurality of servicing provider nodes. Each of the plurality of member nodes may correspond to a member. Each of the plurality of referring provider nodes may correspond to a referring provider. Each of the plurality of servicing provider nodes may correspond to a servicing provider. As such, the graph data object allows for the analysis of "triangular relationships" between members, referring providers and servicing providers for detecting analyzing healthcare fraud with low false positive rate, details of which are described herein.

In some embodiments, the computing entity may generate the graph data object based at least in part on the tabular data object generate at step/operation 406.

In some embodiments, the main nodes of the graph data object may include member nodes and provider nodes (both referring provider nodes and servicing provider nodes) that are generated based on input actor metadata (for example, based on the corresponding columns in the tabular data object). A referring provider node and a servicing provider node may be connected by an edge based on the number of unique members referred by referring provider to servicing provider. A servicing provider node may be connected with a member node based on number of claims in which servicing provider served the member. A referring provider node may be connected with a member node based on number of claims in which referring provider referred the member to servicing provider.

In some embodiments, some or all columns from the tabular data object (for example, those other than the columns identifying the input actor metadata) may be used to create supporting nodes and/or attributes in the graph data object. For example, values corresponding to the columns of the tabular data object may be identifiers of these supporting nodes and/or attribute values for a member node, a referring provider node or a servicing provider node. In some embodiments, the computing entity may generate edges connecting a supporting node with another supporting node or a main node based on how different nodes are related to each other in the tabular data object. For example, the computing entity may generate an edge connecting a member node (100692005) to a claim node (GSO0054377457) if 100692005 has a claim GSO0054377457 in the tabular data object.

Figure 7:
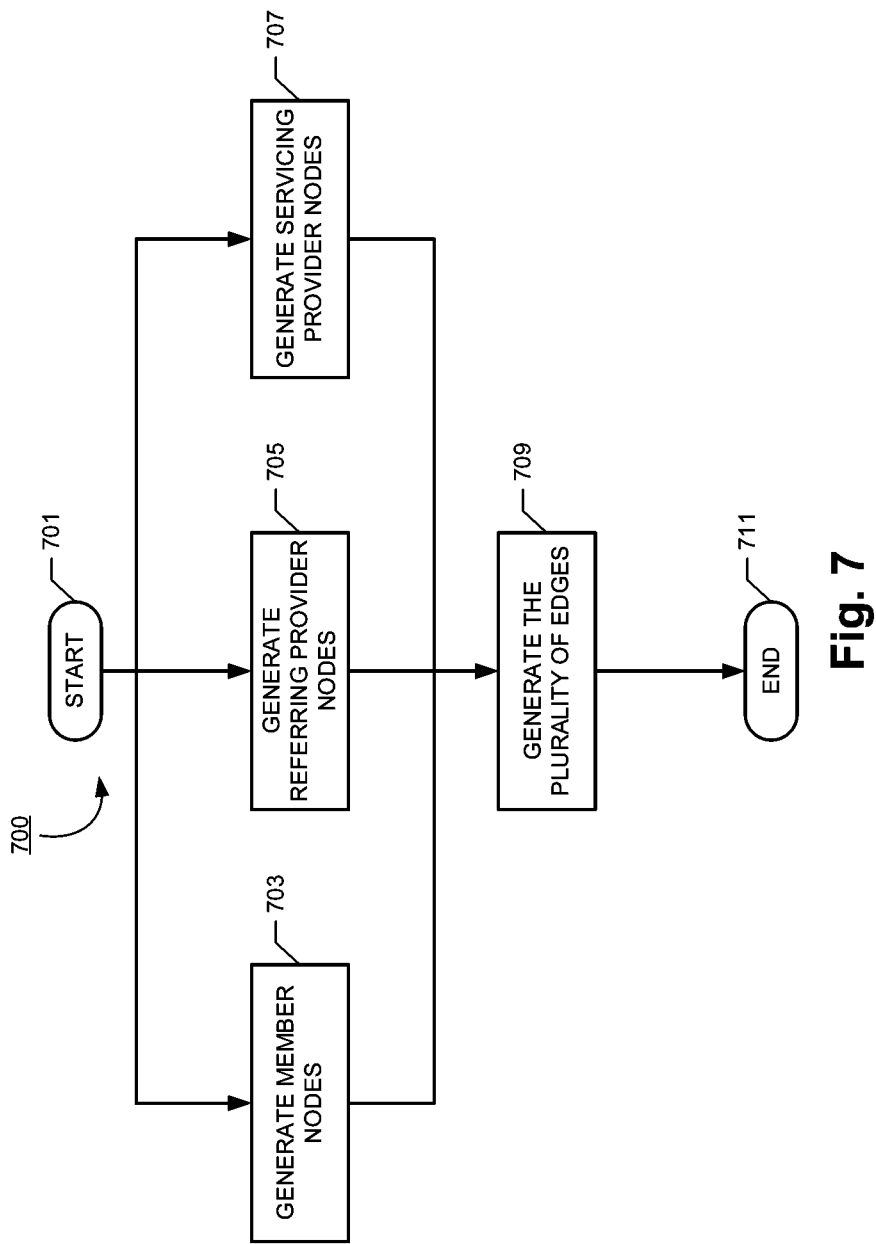
Figure 8:
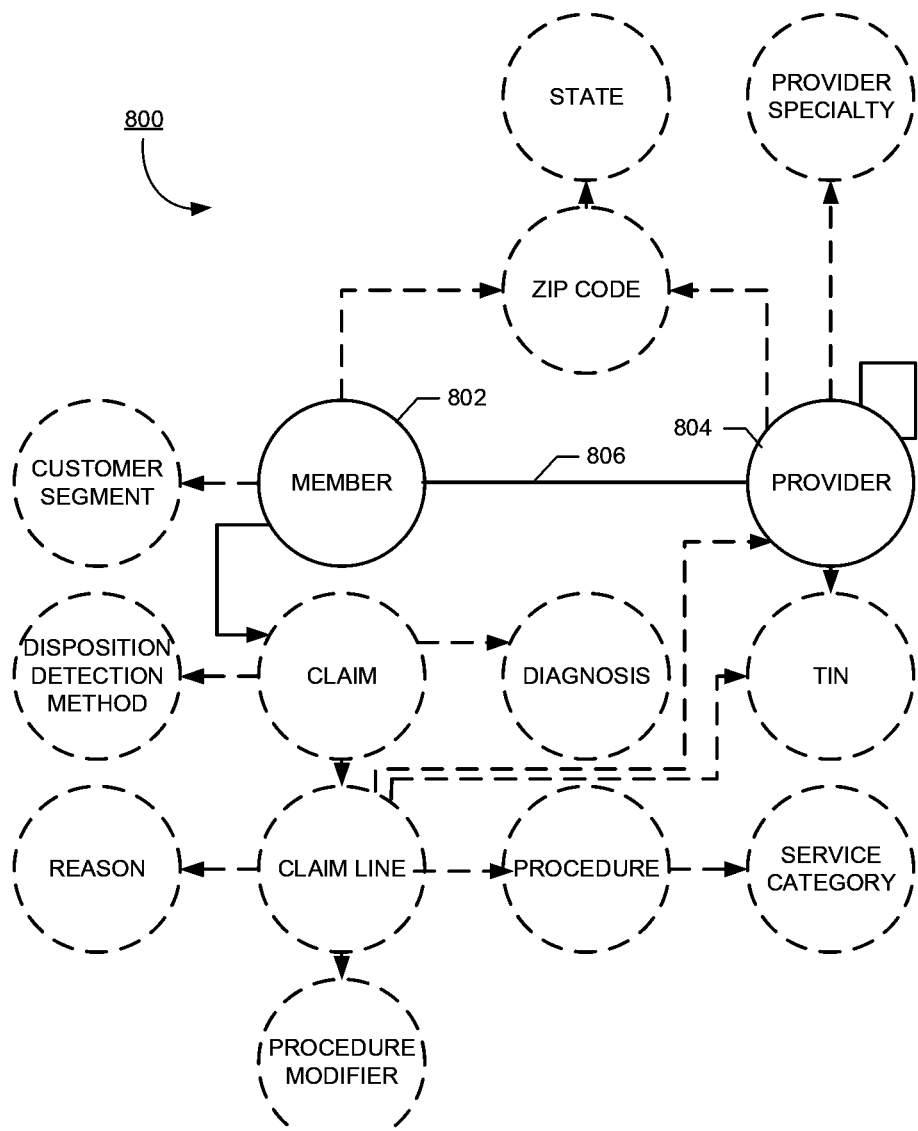

While the description above provides an example of generating a graph data object, it is noted that the scope of the present disclosure is not limited to the description provided above. In some embodiments, a graph data object may be generated based on one or more additional and/or alternative steps/operations. For example, FIG. 7 and FIG. 8 provide example steps/operations associated with generating graph data object, details of which are described herein.

Referring back to FIG. 4, subsequent to step/operation 408, the example method 400 proceeds to step/operation

410. At step/operation 410, a computing entity (such as the network analysis computing entity 105 described above in connection with FIG. 1 and FIG. 2) may include means (such as the processing element 205 of the network analysis computing entity 105 described above in connection with FIG. 2) for calculating a plurality of node attributes for the plurality of nodes and a plurality of edge attributes for the plurality of edges based on the graph data object.

In some embodiments, the plurality of node attributes and the plurality of edge attributes may be calculated based on the graph data object "on-the-fly" (e.g., based on the graph data object itself), instead of and/or in addition to being based on the tabular data object in a precomputed manner. The plurality of node attributes and the plurality of edge attributes may capture the behavioral utilization aspects of the "triangular relationship" among referring provider, servicing provider and member and with respect to the fraud scheme corresponding to the scheme data object.

For example, the scheme data object may indicate a fraud scheme associated with genetic testing. In this example, the computing entity may generate a tabular data object based on input data objects associated with genetic testing (for example, similar to those described above in connection with step/operation 406), and may generate a graph data object based on the tabular data object (for example, similar to those described above in connection with step/operation 408). The graph data object may comprise a plurality of member nodes, a plurality of referring provider nodes, a plurality of servicing provider nodes, and a plurality of edges connecting these nodes. At step/operation 410, the computing entity may calculate the following node attributes listed in TABLE 1 for a member node:

TABLE 1

Example Node Attributes for a Member Node

| Node Attribute | Note |
| --- | --- |
| Count of claim lines ("Claim-Line-Count Attribute") | Calculated based on a first value associated with all claims and/or a second values associated with only claims related to genetic testing |
| Count of claims | Calculated based on a first value associated with all claims and/or a second values associated with only claims related to genetic testing |
| Count of Unique CPT codes | Calculated based on a first value associated with all claims and/or a second values associated with only claims related to genetic testing |
| Total Claim Net Paid Amount | Calculated based on a first value associated with all claims and/or a second values associated with only claims related to genetic testing |
| Total Claim Billed Amount | Calculated based on a first value associated with all claims and/or a second values associated with only claims related to genetic testing |
| Average Lines per claim | Calculated based on a first value associated with all claims and/or a second values associated with only claims related to genetic testing |
| Average Net Paid Amount Per Claim | Calculated based on a first value associated with all claims and/or a second values associated with only claims related to genetic testing |
| Average Net Paid Amount Per Claim Line | Calculated based on a first value associated with all claims and/or a second values associated with only claims related to genetic testing |
| Count of Connected Provider | Calculated based on a first value associated with all claims and/or a second values associated with only claims related to genetic testing |
| Proportion of Referring Provider having Servicing Relationship ("Serviced-By-Referring-Provider-Percentage Attribute") | Calculated based on a value related to all claims |
| Count of claims in Disposition Data | Calculated based on a first value associated with all claims and/or a second values associated with only claims related to genetic testing |
| Total Net Paid Amount of Claims in Disposition | Calculated based on a first value associated with all claims and/or a second values associated with only claims related to genetic testing |
| Proportion of Claims in Disposition | Calculated based on a first value associated with all claims and/or a second values associated with only claims related to genetic testing |
| Ratio of Net Paid Amount for Claims in Disposition vs Total Net paid Amount | Calculated based on a first value associated with all claims and/or a second values associated with only claims related to genetic testing |
| Count of Fully Paid Claims | Calculated based on a first value associated with all claims and/or a second values associated with only claims related to genetic testing |
| Count of Denied Claims | Calculated based on a first value associated with all claims and/or a second values associated with only claims related to genetic testing |
| Count of Partially Paid Claims | Calculated based on a first value associated with all claims and/or a second values associated with only claims related to genetic testing |

TABLE 1-continued

Example Node Attributes for a Member Node

| Node Attribute | Note |
| --- | --- |
| Average Distance with Connected Entity | Calculated based on a first value associated with all claims and/or a second values associated with only claims related to genetic testing |
| Minimum Days before Genetic Claim | Calculate a values based on only claims associated with genetic testing |
| Address State | Calculated based on a value related to all claims |
| Address ZIP | Calculated based on a value related to all claims |

The computing entity may calculate the following node attributes listed in TABLE 2 for a referring provider node or a servicing provider node:

TABLE 2

Example Node Attributes for a Referring Provider Node or a Servicing Provider Node

| Node Attribute | Note |
| --- | --- |
| Count of claim lines ("Claim-Line-Count Attribute") | Calculated based on a first value associated with all claims and/or a second values associated with only claims related to genetic testing |
| Count of claims | Calculated based on a first value associated with all claims and/or a second values associated with only claims related to genetic testing |
| Count of Unique CPT codes | Calculated based on a first value associated with all claims and/or a second values associated with only claims related to genetic testing |
| Total Claim Net Paid Amount | Calculated based on a first value associated with all claims and/or a second values associated with only claims related to genetic testing |
| Total Claim Billed Amount | Calculated based on a first value associated with all claims and/or a second values associated with only claims related to genetic testing |
| Average Lines per claim | Calculated based on a first value associated with all claims and/or a second values associated with only claims related to genetic testing |
| Average Net Paid Amount Per Claim | Calculated based on a first value associated with all claims and/or a second values associated with only claims related to genetic testing |
| Average Net Paid Amount Per Claim Line | Calculated based on a first value associated with all claims and/or a second values associated with only claims related to genetic testing |
| Count of Members having only Genetic Claims | Calculated based only on a value associated with genetic testing |
| Count of Connected Provider | Calculated based on a first value associated with all claims and/or a second values associated with only claims related to genetic testing |
| Count of Members Served or Referred | Calculated based on a first value associated with all claims and/or a second values associated with only claims related to genetic testing |
| Count of Members having only Genetic Claims Relationship | Calculated based only on a value associated with genetic testing |
| Proportion of Genetic Claims out of Total Claims Per Member | Calculated based only on a value associated with genetic testing |
| Proportion of Members having Servicing Relationship ("Serviced-Member-Percentage Attribute") | Calculated based on a value related to all claims; calculated for a referring provider node not a servicing provider node |
| Average Net Paid Amount Per Member | Calculated based on a first value associated with all claims and/or a second values associated with only claims related to genetic testing |
| Average Number of Claims Per Member | Calculated based on a first value associated with all claims and/or a second values associated with only claims related to genetic testing |
| Average Number of Claim Lines Per Member ("Average-Claim-Line-Per-Member Attribute") | Calculated based on a first value associated with all claims and/or a second values associated with only claims related to genetic testing |
| Count of claims in Disposition Data | Calculated based on a first value associated with all claims and/or a second values associated with only claims related to genetic testing |

TABLE 2-continued

Example Node Attributes for a Referring Provider Node or a Servicing Provider Node

| Node Attribute | Note |
| --- | --- |
| Total Net Paid Amount of Claims in Disposition | Calculated based on a first value associated with all claims and/or a second values associated with only claims related to genetic testing |
| Proportion of Claims in Disposition | Calculated based on a first value associated with all claims and/or a second values associated with only claims related to genetic testing |
| Ratio of Net Paid Amount for Claims in Disposition vs Total Net paid Amount | Calculated based on a first value associated with all claims and/or a second values associated with only claims related to genetic testing |
| Count of Member in Disposition | Calculated based on a first value associated with all claims and/or a second values associated with only claims related to genetic testing |
| Average claims Per Member in Disposition | Calculated based on a first value associated with all claims and/or a second values associated with only claims related to genetic testing |
| Average Claim Net Paid Amount Per Member in Disposition | Calculated based on a first value associated with all claims and/or a second values associated with only claims related to genetic testing |
| Count of Connected Provider having at least 1 Claim in Disposition | Calculated based on a first value associated with all claims and/or a second values associated with only claims related to genetic testing |
| Average Number of Claims in Disposition for Connected Providers | Calculated based on a first value associated with all claims and/or a second values associated with only claims related to genetic testing |
| Count of Fully Paid Claims | Calculated based on a first value associated with all claims and/or a second values associated with only claims related to genetic testing |
| Count of Denied Claims | Calculated based on a first value associated with all claims and/or a second values associated with only claims related to genetic testing |
| Count of Partially Paid Claims | Calculated based on a first value associated with all claims and/or a second values associated with only claims related to genetic testing |
| Average Distance with Connected Entity | Calculated based on a first value associated with all claims and/or a second values associated with only claims related to genetic testing |
| Minimum Days before Genetic Claim for Members Referred or Served | Calculated based only on a value associated with genetic testing |
| Entropy: Share of Claims Provider gets from Various Members. Number will be Low if Provider Receives Most of its Claims from Only few Set of Members ("Member-entropy Attribute") | Calculated based only on a value associated with genetic testing |
| Entropy: Share of Claims Servicing Provider gets from Various Referring Providers. Number will be Low if Servicing Provider Receives Most of its Claims from Only few Set of Referring Providers ("Servicing-Provider-Entropy Attribute") | Calculated based only on a value associated with genetic testing |
| Specialty | Calculated based on a value related to all claims |
| Address State | Calculated based on a value related to all claims |
| Address ZIP | Calculated based on a value related to all claims |

While some of the example node attributes described above may include calculating a first value based on all claims and a second values based on only claims associated with genetic testing, it is noted that the scope of the present disclosure is not limited to these examples only. In some example, the second values may be calculated based on only claims associated with a service category that is determined in accordance with the scheme data object (for example, based on the scheme metadata and/or the input metadata), as described above.

The computing entity may calculate the following edge attributes listed in TABLE 3 for an edge connecting a member node with a referring provider node:

TABLE 3

Example Edge Attributes for an Edge Connecting
a Member Node and a Referring Provider Node

| Edge Attribute | Note |
| --- | --- |
| Count of claim lines | Calculated based on a first value associated with all claims and/or a second values associated with only claims related to genetic testing |
| Count of claims | Calculated based on a first value associated with all claims and/or a second values associated with only claims related to genetic testing |
| Count distinct CPT codes | Calculated based on a first value associated with all claims and/or a second values associated with only claims related to genetic testing |
| Total Claim Net Paid Amount | Calculated based on a first value associated with all claims and/or a second values associated with only claims related to genetic testing |
| Total Claim Billed Amount | Calculated based on a first value associated with all claims and/or a second values associated with only claims related to genetic testing |
| Average Lines per claim | Calculated based on a first value associated with all claims and/or a second values associated with only claims related to genetic testing |
| Average Net Paid Amount Per Claim | Calculated based on a first value associated with all claims and/or a second values associated with only claims related to genetic testing |
| Average Net Paid Amount Per Claim Line | Calculated based on a first value associated with all claims and/or a second values associated with only claims related to genetic testing |
| Count of claims in Disposition Data | Calculated based on a first value associated with all claims and/or a second values associated with only claims related to genetic testing |
| Total Net Paid Amount of Claims in Disposition | Calculated based on a first value associated with all claims and/or a second values associated with only claims related to genetic testing |
| Proportion of Claims in Disposition | Calculated based on a first value associated with all claims and/or a second values associated with only claims related to genetic testing |
| Ratio of Net Paid Amount for Claims in Disposition vs Total Net paid Amount | Calculated based on a first value associated with all claims and/or a second values associated with only claims related to genetic testing |
| Count of Fully Paid Claims | Calculated based on a first value associated with all claims and/or a second values associated with only claims related to genetic testing |
| Count of Denied Claims | Calculated based on a first value associated with all claims and/or a second values associated with only claims related to genetic testing |
| Count of Partially Paid Claims | Calculated based on a first value associated with all claims and/or a second values associated with only claims related to genetic testing |
| Average Distance ("Average-Distance attribute") | Calculated based on a first value associated with all claims and/or a second values associated with only claims related to genetic testing |
| Distance Multiplied by Count of Claims | Calculated based on a first value associated with all claims and/or a second values associated with only claims related to genetic testing |

The computing entity may calculate the following edge attributes listed in TABLE 4 for an edge connecting a member node with a servicing provider node:

TABLE 4

Example Edge Attributes for an Edge Connecting a Member Node and a Servicing Provider Node

| Edge Attribute | Note |
| --- | --- |
| Count of claim lines | Calculated based on a first value associated with all claims and/or a second values associated with only claims related to genetic testing |
| Count of claims | Calculated based on a first value associated with all claims and/or a second values associated with only claims related to genetic testing |
| Count distinct CPT codes | Calculated based on a first value associated with all claims and/or a second values associated with only claims related to genetic testing |
| Total Claim Net Paid Amount | Calculated based on a first value associated with all claims and/or a second values associated with only claims related to genetic testing |
| Total Claim Billed Amount | Calculated based on a first value associated with all claims and/or a second values associated with only claims related to genetic testing |
| Average Lines per claim | Calculated based on a first value associated with all claims and/or a second values associated with only claims related to genetic testing |
| Average Net Paid Amount Per Claim | Calculated based on a first value associated with all claims and/or a second values associated with only claims related to genetic testing |
| Average Net Paid Amount Per Claim Line | Calculated based on a first value associated with all claims and/or a second values associated with only claims related to genetic testing |
| Count of claims in Disposition Data | Calculated based on a first value associated with all claims and/or a second values associated with only claims related to genetic testing |
| Total Net Paid Amount of Claims in Disposition | Calculated based on a first value associated with all claims and/or a second values associated with only claims related to genetic testing |
| Proportion of Claims in Disposition | Calculated based on a first value associated with all claims and/or a second values associated with only claims related to genetic testing |
| Ratio of Net Paid Amount for Claims in Disposition vs Total Net paid Amount | Calculated based on a first value associated with all claims and/or a second values associated with only claims related to genetic testing |
| Count of Fully Paid Claims | Calculated based on a first value associated with all claims and/or a second values associated with only claims related to genetic testing |
| Count of Denied Claims | Calculated based on a first value associated with all claims and/or a second values associated with only claims related to genetic testing |
| Count of Partially Paid Claims | Calculated based on a first value associated with all claims and/or a second values associated with only claims related to genetic testing |
| Average Distance ("Average-Distance attribute") | Calculated based on a first value associated with all claims and/or a second values associated with only claims related to genetic testing |
| Distance Multiplied by Count of Claims | Calculated based on a first value associated with all claims and/or a second values associated with only claims related to genetic testing |
| Minimum Days before Genetic Claim | Calculated based only on a value associated with genetic testing |

The computing entity may calculate the following edge attributes listed in TABLE 5 for an edge connecting a referring provider node and a servicing provider node:

TABLE 5

Example Edge Attributes for an Edge Connecting a Referring Provider Node and a Servicing Provider Node

| Attributes | Level (Overall: Using all claims; Genetic Category: Using only Genetic Testing claims) |
| --- | --- |
| Count of claim lines | Calculated based only on a value associated with genetic testing |
| Count of claims | Calculated based only on a value associated with genetic testing |

TABLE 5-continued

Example Edge Attributes for an Edge Connecting a Referring
Provider Node and a Servicing Provider Node

| Attributes | Level (Overall: Using all claims; Genetic Category: Using only Genetic Testing claims) |
|---|---|
| Count distinct CPT codes | Calculated based only on a value associated with genetic testing |
| Total Claim Net Paid Amount | Calculated based only on a value associated with genetic testing |
| Total Claim Billed Amount | Calculated based only on a value associated with genetic testing |
| Average Lines per claim | Calculated based only on a value associated with genetic testing |
| Average Net Paid Amount Per Claim | Calculated based only on a value associated with genetic testing |
| Average Net Paid Amount Per Claim Line | Calculated based only on a value associated with genetic testing |
| Count of Members Shared | Calculated based only on a value associated with genetic testing |
| Average Net Paid Amount Per Member | Calculated based only on a value associated with genetic testing |
| Average Number of Claims Per Member | Calculated based only on a value associated with genetic testing |
| Average Number of Claim Lines Per Member | Calculated based only on a value associated with genetic testing |
| Count of claims in Disposition Data | Calculated based only on a value associated with genetic testing |
| Total Net Paid Amount of Claims in Disposition | Calculated based only on a value associated with genetic testing |
| Proportion of Claims in Disposition | Calculated based only on a value associated with genetic testing |
| Ratio of Net Paid Amount for Claims in Disposition vs Total Net paid Amount | Calculated based only on a value associated with genetic testing |
| Count of Member in Disposition | Calculated based only on a value associated with genetic testing |
| Average claims Per Member in Disposition | Calculated based only on a value associated with genetic testing |
| Average Claim Net Paid Amount Per Member in Disposition | Calculated based only on a value associated with genetic testing |
| Count of Fully Paid Claims | Calculated based only on a value associated with genetic testing |
| Count of Denied Claims | Calculated based only on a value associated with genetic testing |
| Count of Partially Paid Claims | Calculated based only on a value associated with genetic testing |
| Average Distance | Calculated based only on a value associated with genetic testing |
| Distance Multiplied by Count of Claims | Calculated based only on a value associated with genetic testing |

While some of the example edge attributes described above may include calculating a first value based on all claims and a second values based on only claims associated with genetic testing, it is noted that the scope of the present disclosure is not limited to these examples only. In some example, the second values may be calculated based on only claims associated with a service category that is determined in accordance with the scheme data object (for example, based on the scheme metadata and/or the input metadata), as described above.

Referring back to FIG. 4, subsequent to step/operation 410, the example method 400 proceeds to step/operation 412. At step/operation 412, a computing entity (such as the network analysis computing entity 105 described above in connection with FIG. 1 and FIG. 2) may include means (such as the processing element 205 of the network analysis computing entity 105 described above in connection with FIG. 2) for identifying at least one irregular member node. In some embodiments, the at least one irregular member node may represent suspicious members that may be involved in a healthcare fraud scheme as described in the scheme data object.

In some embodiments, the computing entity may identify at least one irregular member node from the plurality of member nodes based at least in part on the plurality of node attributes or the plurality of edge attributes.

Continuing from the example above, the computing entity may calculate a plurality of claim-line-count attributes as part of node attributes for the plurality of member nodes. For example, the plurality of claim-line-count attributes may include a count of claims lines associated with genetic testing as a percentage of count of all claim lines. This claim-line-count attributes may help identify if the corresponding members have an above-threshold ratio of genetic testing claim lines in their claims. In some embodiments, as described above, instead of service lines for genetic testing, the plurality of claim-line-count attributes could be tailored to the specific procedure code(s) that is (are) of interest based on the scheme data object.

The computing entity may calculate a plurality of serviced-by-referring-provider-percentage attributes as part of node attributes for the plurality of member nodes. For example, plurality of serviced-by-referring-provider-percentage attributes may include a proportion of referring provider having a servicing relationship with member. This proportion may be determined based on whether a referring provider also showed up as a servicing provider on the member's claims in the past. The plurality of serviced-by-referring-provider-percentage attributes may help identify if members do not have a servicing relationship with the referring provider.

The computing entity may calculate a plurality of average-distance attributes as part of edge attributes for edges that connect the plurality of member nodes to the plurality of referring provider nodes or servicing provider nodes. For example, the plurality of average-distance attributes may include an average of mean distances for edges between member nodes and referring provider nodes. The plurality of average-distance attributes may help identify if the distance between member and referring provider exceeds an above-threshold distance.

As described further in connection with at least FIG. 9, FIG. 10A, FIG. 10B, FIG. 11, FIG. 12, and FIG. 13, the computing entity may determine whether a claim-line-count attribute of a candidate member node is an outlier among the plurality of claim-line-count attributes based on, for example but not limited to, Tukey's Fences algorithm. The computing entity may determine whether a serviced-by-referring-provider-percentage attribute of a candidate member node is an outlier among the plurality of serviced-by-referring-provider-percentage attributes based on, for example but not limited to, Tukey's Fences algorithm. The computing entity may determine whether an average-distance attribute of a candidate member node is an outlier among the plurality of average-distance attributes based on, for example but not limited to, Tukey's Fences algorithm.

The computing entity may further calculate a Mahalanobis distance value based on the claim-line-count attribute, the serviced-by-referring-provider-percentage attribute, and the average-distance attribute of the candidate member node, and determine whether the Mahalanobis distance of the candidate member node is more than two standard deviations from a mean of the Mahalanobis distance across all member nodes. While the description above provides an example based on a Mahalanobis distance algorithm, it is noted that the scope of the present disclosure is not limited to the description above. In some examples, one or more distance based formulas or algorithms in addition to the Mahalanobis distance algorithm, or in alternative of the Mahalanobis distance algorithm, may be implemented, including, but not limited to, an Euclidean distance formula.

In some embodiments, if the candidate member node is associated with at least two of the three attributes that are determined to be outliers, and the Mahalanobis distance value is more than two standard deviations from a mean of Mahalanobis distances across all member nodes, the computing entity may determine that the candidate member node is an irregular member node, which may represent that the candidate member node is a suspicious member that may be associated with a fraud scheme corresponding to the scheme data object.

While the description above provides an example of identifying an irregular member node, it is noted that the scope of the present disclosure is not limited to the description provided above. In some embodiments, an irregular member node may be identified based on one or more additional and/or alternative steps/operations. For example, FIG. 9, FIG. 10A, FIG. 10B, FIG. 11, FIG. 12, and FIG. 13 provide example steps/operations associated with identifying irregular member node, details of which are described herein.

Referring back to FIG. 4, subsequent to step/operation 412, the example method 400 proceeds to step/operation 414. At step/operation 414, a computing entity (such as the network analysis computing entity 105 described above in connection with FIG. 1 and FIG. 2) may include means (such as the processing element 205 of the network analysis computing entity 105 described above in connection with FIG. 2) for identifying at least one irregular referring provider node. In some embodiments, the at least one irregular referring provider node may represent suspicious referring providers that may be involved in a healthcare fraud scheme as described in the scheme data object.

In some embodiments, the computing entity may identify at least one irregular referring provider node from the plurality of referring provider nodes based at least in part on the plurality of node attributes or the plurality of edge attributes. In some embodiments, the computing entity may identify the at least one irregular referring provider node based at least in part on the at least one irregular member node identified at step/operation 412.

Continuing from the example above, the computing entity may calculate a plurality of average-claim-line-per-member attributes as part of node attributes for the plurality of referring provider nodes. For example, the plurality of average-claim-line-per-member attributes may include a count of claims lines per member associated with genetic testing. The computing entity may calculate a plurality of claim-line-count attributes as part of node attributes for the plurality of referring provider nodes. For example, the plurality of claim-line-count attributes may include a ratio of genetic testing claim lines to total claim lines. The plurality of average-claim-line-per-member attributes and the plurality of claim-line-count attributes may help identify if a referring provider refers an above-threshold quantity/ratio of members for genetic testing. In some embodiments, as described above, instead of service lines for genetic testing, the plurality of average-claim-line-per-member attributes could be tailored to the specific procedure code(s) that is (are) of interest based on the scheme data object.

The computing entity may calculate a plurality of serviced-member-percentage attributes as part of node attributes for the plurality of referring provider nodes. For example, the plurality of serviced-member-percentage attributes may include proportion of members having a servicing relationship with the referring provider. This proportion may be determined based on whether a referring provider also showed up as a servicing provider on each member's claims in the past. This proportion may help identify if the referring provider does not have a servicing relationship with the members.

The computing entity may calculate a plurality of average-distance attributes as part of edge attributes for edges connecting the plurality of referring provider nodes and the plurality of member nodes. For example, the plurality of average-distance attribute may include an average of average distances between member nodes and referring provider nodes. This may help identify if the distance between a member and a referring provider is above a distance threshold.

The computing entity may calculate a plurality of member-entropy attributes as part of node attributes for the plurality of referring provider nodes. For example, the plurality of member-entropy attributes may include entropy values of a share of claims that referring provider gets from various members. This may help identify if the referring provider refers an above-threshold ratio of claims for only a few members.

The computing entity may calculate a plurality of servicing-provider-entropy attributes as part of node attributes for the plurality of referring provider nodes. For example, the plurality of servicing-provider-entropy attributes may include entropy values for share of claims servicing provider gets from various referring providers. This may help identify if the referring provider makes an above-threshold ratio of referrals to only a few servicing providers.

As described further in connection with at least FIG. 14, FIG. 15A, FIG. 15B, FIG. 16, FIG. 17, and FIG. 18, the computing entity may determine whether an average-claim-line-per-member of a candidate referring provider node is an outlier among the plurality of average-claim-line-per-member attributes based on, for example but not limited to, Tukey's Fences algorithm. The computing entity may determine whether a claim-line-count attribute of a candidate referring provider node is an outlier among the plurality of claim-line-count attributes based on, for example but not limited to, Tukey's Fences algorithm. The computing entity may determine whether a serviced-member-percentage attribute of a candidate referring provider node is an outlier among the plurality of serviced-member-percentage attributes based on, for example but not limited to, Tukey's Fences algorithm. The computing entity may determine whether an average-distance attribute of a candidate referring provider node is an outlier among the plurality average-distance attributes based on, for example but not limited to, Tukey's Fences algorithm. The computing entity may determine whether a member-entropy attribute of a candidate referring provider node is an outlier among the plurality of member-entropy attributes based on, for example but not limited to, Tukey's Fences algorithm. The computing entity may determine whether a servicing-provider-entropy attribute of a candidate referring provider node is an outlier among the plurality of servicing-provider-entropy attributes based on, for example but not limited to, Tukey's Fences algorithm.

The computing entity may further calculate a Mahalanobis distance value based on the average-claim-line-per-member attribute, the claim-line-count attribute, the serviced-member-percentage attribute, the average-distance attribute, the member-entropy attribute, and the servicing-provider-entropy attribute of the candidate referring provider node, and determine whether the Mahalanobis distance of the candidate referring provider node is more than two standard deviations from a mean of the Mahalanobis distance across all referring provider nodes. While the description above provides an example based on a Mahalanobis distance algorithm, it is noted that the scope of the present disclosure is not limited to the description above. In some examples, one or more distance based formulas or algorithms in addition to the Mahalanobis distance algorithm, or in alternative of the Mahalanobis distance algorithm, may be implemented, including, but not limited to, an Euclidean distance formula.

If the candidate member node is associated with at least three of the six attributes that are determined to be outliers, and the Mahalanobis distance value is more than two standard deviations from a mean of Mahalanobis distances across all referring provider nodes, the computing entity may determine that the candidate referring provider node is an irregular referring provider node, which may represent that the candidate referring provider node is a suspicious referring provider node that may be associated with a fraud scheme corresponding to the scheme data object.

While the description above provides an example of identifying an irregular referring provider node, it is noted that the scope of the present disclosure is not limited to the description provided above. In some embodiments, an irregular referring provider node may be identified based on one or more additional and/or alternative steps/operations. For example, FIG. 14, FIG. 15A, FIG. 15B, FIG. 16, FIG. 17, and FIG. 18 provide example steps/operations associated with identifying irregular referring provider node, details of which are described herein.

Referring back to FIG. 4, subsequent to step/operation 414, the example method 400 proceeds to step/operation 416. At step/operation 416, a computing entity (such as the network analysis computing entity 105 described above in connection with FIG. 1 and FIG. 2) may include means (such as the processing element 205 of the network analysis computing entity 105 described above in connection with FIG. 2) for identifying at least one irregular servicing provider node. In some embodiments, the at least one irregular servicing provider node may represent suspicious servicing providers that may be involved in a healthcare fraud scheme as described in the scheme data object.

In some embodiments, the computing entity may identify at least one irregular servicing provider node from the plurality of servicing provider nodes based at least in part on the at least one irregular member node and the at least one irregular referring provider node. In some embodiments, the at least one irregular referring provider node may represent a suspicious referring provider that may be involved in a healthcare fraud scheme as described in the scheme data object.

In some embodiments, the computing entity may conduct an ego-net approach with results from a community detection approach to identify the at least on irregular servicing provider node. For example, the ego-net approach may include counting the number of irregular member nodes (which represent suspicious members) identified at step/operation 412 that are connected with a candidate servicing provider node. The ego-net approach may then calculate a first percentage of the number of connected irregular member nodes (which represent suspicious members) and total connected member nodes for the candidate servicing provider node. The ego-net approach may include counting the number of irregular referring provider nodes (which represent suspicious referring providers) identified at step/operation 414 connected with the candidate servicing provider node. The ego-net approach may then calculate a second percentage of the number of connected irregular servicing provider nodes (which represent suspicious servicing providers) and total connected referring provider nodes for the candidate servicing provider node. If both the first percentage and the second percentage satisfy a corresponding predetermined threshold (for example, 20%), the candidate servicing provider node is added to a candidate servicing provider node set (which may comprise servicing provider nodes corresponding to suspicious servicing providers).

The community detection approach may include the computing entity executing, for example, but not limited to, Louvain Community Detection algorithm (also referred to as "Louvain modularity method" and "the Louvain method for community detection") and Label Propagation algorithm separately to identify communities among the servicing provider nodes (which represent communities of servicing provider). In some embodiments, the Louvain Community Detection algorithm may be configured to stop iterations if a computed modularity between iterations was less than 0.0001. In some embodiments, the Label Propagation algorithm may be configured to stop iterations if every servicing provider node has the most-frequent label of the nodes connecting the service provider node. After executing both the algorithms, the computing entity may assign each servicing provider node with a Louvain Community identifier based on the community identified by the Louvain Community Detection algorithm and a Label Propagation Community identifier based on the community identified by the Label Propagation algorithm. In some embodiments, the computing entity may concatenate the Louvain Community identifier and Label Propagation Community identifier for all the servicing provider nodes, and may use the resultant concatenated column as the new community identifier for the servicing provider node. Based on the new community identifier, the computing entity may exclude all servicing provider nodes that are singletons (i.e. where only one servicing provider node is in the community). Based on the remaining servicing provider nodes and their respective communities as filtered per the new concatenated community identifier, the computing entity may calculate a community percentage of irregular referring provider nodes (as identified based on step/operation 414 described above) to the total number of referring provider nodes in each community. The computing entity may determine that a community is an irregular community if the community percentage for the community satisfies a predetermined threshold (for example, 20%).

While the description above provides examples of implementing Louvain Community Detection algorithm and Label Propagation algorithm, it is noted that the scope of the present disclosure is not limited to the description above. In some embodiments, one or more other community identification algorithms and/or formulas may be implemented in addition to or in alternative of the Louvain Community Detection algorithm and/or the Label Propagation algorithm.

In some embodiments, the computing entity may determine that the candidate servicing provider node is an irregular servicing provider node if it is both in the candidate servicing provider node set (where both the first percentage and the second percentage satisfy a corresponding predetermined threshold) and it is in an irregular community.

While the description above provides an example of identifying an irregular servicing provider node, it is noted that the scope of the present disclosure is not limited to the description provided above. In some embodiments, an irregular servicing provider node may be identified based on one or more additional and/or alternative steps/operations. For example, FIG. 19A, FIG. 19B, FIG. 20, and FIG. 21 provide example steps/operations associated with identifying irregular servicing provider node, details of which are described herein.

In some embodiments, subsequent to identifying the irregular member nodes, the irregular servicing provider nodes, and the irregular referring provider nodes, a computing entity (such as the network analysis computing entity 105 described above in connection with FIG. 1 and FIG. 2) may include means (such as the processing element 205 of the network analysis computing entity 105 described above in connection with FIG. 2) for performing one or more actions based on the irregular member nodes, the irregular servicing provider nodes, and the irregular referring provider nodes.

For example, the computing entity may generate a prediction output user interface that describes the irregular member nodes, the irregular servicing provider nodes, and the irregular referring provider nodes. For example, the prediction output user interface may depict a transactional network user interface element and highlights nodes corresponding to the irregular member nodes, the irregular servicing provider nodes, and the irregular referring provider nodes on the transaction network user interface element.

Additionally, or alternatively, examples of prediction-based actions that may be performed include, but not limited to, generating fraud detection alerts, fraud detection notifications, automated generation of auditory review checks, automated performance of system load balancing operations, automated transmission and/or delivery of fraud review notifications, and/or the like.

Referring back to FIG. 4, subsequent to step/operation 416, the example method 400 ends at step/operation 418.

While the description above provides an example of irregular nodes, it is noted that the scope of the present disclosure is not limited to the description provided above. In some examples, an example may comprise one or more additional and/or alternative steps. For example, the graph data object generated at step/operation 408 may be modified through additions or deletions. For example, additional nodes for a member could be added (such as Plan Type or Policy Type). Additionally, or alternatively, pharmacy claim nodes (representing pharmacy claims) may be added to the graph data object. Additionally, or alternatively, graph data objects may be modified according to one or more graph modification operations. Once the graph data object is modified, the node attributes and/or the edge attributes may be consequently expanded or modified.

Additionally, or alternatively, the criteria, procedure and thresholds used for identifying irregular member nodes in connection with step/operation 412 could be modified depending upon tolerance for higher or lower false positive rates. Additionally, or alternatively, the criteria, procedure and thresholds used for identifying irregular referring provider nodes in connection with step/operation 414 could be modified depending upon tolerance for higher or lower false positive rates. Additionally, or alternatively, the criteria, procedure, community detection algorithms and thresholds used for identifying irregular servicing provider nodes in connection with step/operation 416 could be modified depending upon tolerance for higher or lower false positive rates.

b. Exemplary Operations for Generation of Scheme Data Objects

In various embodiments of the present disclosure, a computing entity (such as the network analysis computing entity 105 described above in connection with FIG. 1 and FIG. 2) may implement various processing techniques to generate a scheme data object. Referring now to FIG. 5, various examples associated with generating a scheme data object are illustrated.

The example method 500 starts at step/operation 501.

At step/operation 503, a computing entity (such as the network analysis computing entity 105 described above in connection with FIG. 1 and FIG. 2) may include means (such as the processing element 205 of the network analysis computing entity 105 described above in connection with FIG. 2) for accessing webpage data objects.

In the present disclosure, the term "webpage data object" may refer to a data object associated with a webpage and may comprise data/information related to the webpage. For example, the webpage data object may comprise webpage metadata that describes data and/or information related to the webpage. For example, the webpage metadata may describe one or more text files (for example, written in the Hypertext Markup Language (HTML), JavaScript codes, Cascading Style Sheets (CSS)). Additionally, or alternatively, the webpage metadata may comprise files such as, but not limited to, images, and/or other multimedia files.

For example, the webpage data object may be associated with webpages of industry journals, web articles that describe, for example, information related to healthcare fraud. In this example, the webpage may include text files that describe an existing or suspected healthcare fraud scheme.

In some embodiments, the webpage data object may be stored in a database. In some embodiments, the webpage data object may be dynamically generated based on, for example, a web crawler that systematically browses the World Wide Web.

Referring back to FIG. 5, subsequent to step/operation 503, the example method 500 proceeds to step/operation 505. At step/operation 505, a computing entity (such as the network analysis computing entity 105 described above in connection with FIG. 1 and FIG. 2) may include means (such as the processing element 205 of the network analysis computing entity 105 described above in connection with FIG. 2) for generating the scheme data object.

In some embodiments, the computing entity may perform natural language processing on the webpage metadata to generate the scheme data object. In the present disclosure, the term "natural language processing" refers to computer software algorithms that may process and/or analyze natural language data. In some embodiments, the computing entity may perform natural language processing on the webpage metadata to obtain various scheme metadata for the scheme data object.

Continuing from the example above, the computing entity may carry out algorithms such as speech recognition algorithms (for example, based on one or more machine learning models such as deep neural networks), natural-language analysis algorithms (for example, based on sentiment analysis algorithms, topic classification algorithms, and/or the like), and/or the like. The computing entity may extract data/information related to a healthcare fraud scheme from the webpage metadata, and may generate scheme metadata based on these extracted data/information. As described above, the scheme metadata comprises at least one of note metadata, provider specialty metadata, procedure code metadata, geographical area metadata, timeframe metadata, or line of business (LOB) metadata. For example, the computing entity may extract data/information associated with the location(s) of a healthcare scheme from the webpage metadata of the webpage data object to generate the geographical area metadata for the scheme metadata.

Referring back to FIG. 5, subsequent to step/operation 505, the example method 500 proceeds to step/operation 507. At step/operation 507, a computing entity (such as the network analysis computing entity 105 described above in connection with FIG. 1 and FIG. 2) may include means (such as the processing element 205 of the network analysis computing entity 105 described above in connection with FIG. 2) for storing the scheme data object.

In some embodiments, the computing entity may store the scheme data object in a database. For example, the computing entity may store the scheme data object in a data storage device that is internal to a network analysis platform/system (for example, the storage media 207 of the network analysis computing entity 105 in the network analysis platform/system 100 shown above in connection with FIG. 2). In some embodiments, the computing entity may store the scheme data object in a data storage device that is external to the network analysis platform/system (for example, a database that is in in electronic communication with the network analysis platform/system 100 shown above in connection with FIG. 1).

Referring back to FIG. 5, subsequent to step/operation 507, the example method 500 ends at step/operation 509.

c. Exemplary Operations for Generation of Tabular Data Objects

Figure 6:
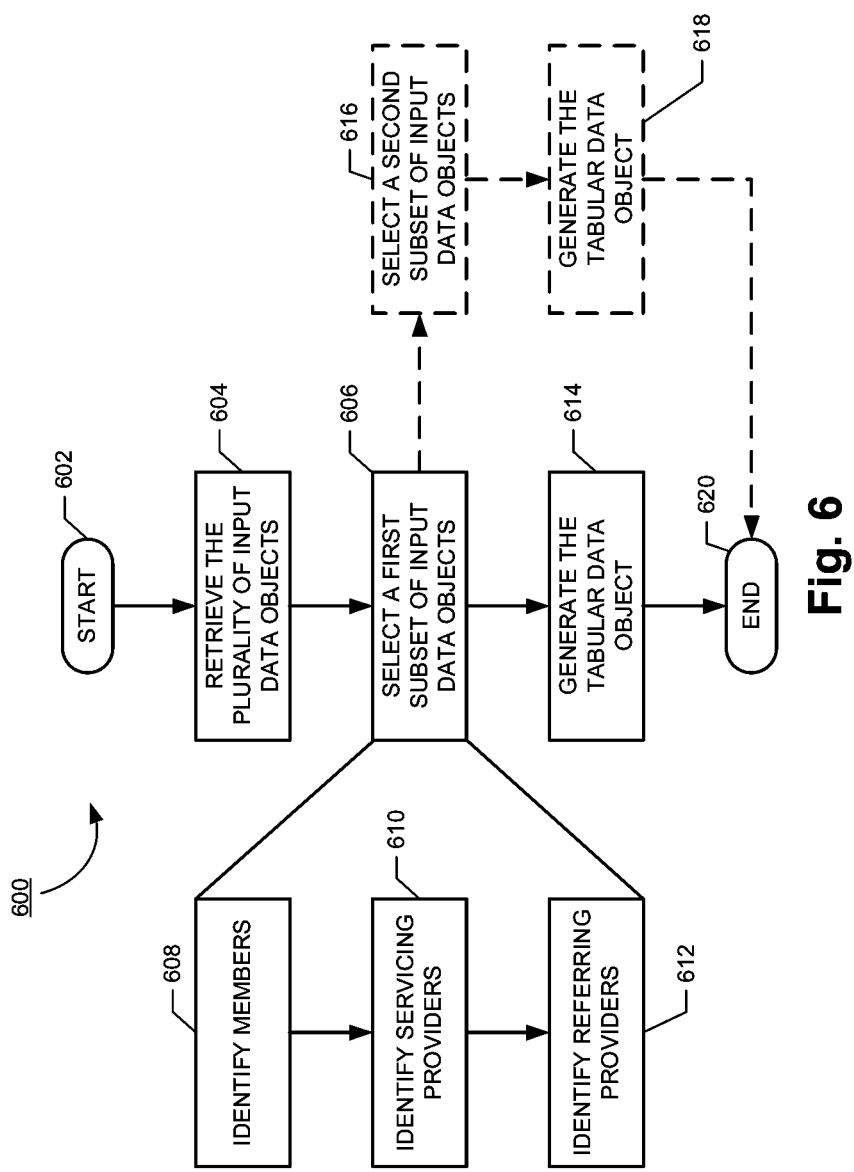

In various embodiments of the present disclosure, a computing entity (such as the network analysis computing entity 105 described above in connection with FIG. 1 and FIG. 2) may implement various processing techniques to generate a tabular data object. Referring now to FIG. 6, various examples associated with generating the tabular data object are illustrated.

The example method 600 starts at step/operation 602.

At step/operation 604, a computing entity (such as the network analysis computing entity 105 described above in connection with FIG. 1 and FIG. 2) may include means (such as the processing element 205 of the network analysis computing entity 105 described above in connection with FIG. 2) for retrieving the plurality of input data objects.

As described above, an input data object may be associated with a health insurance claim. In some embodiments, the claim data objects may be stored in a database. For example, the claim data objects may be in a data storage device that is internal to a network analysis platform/system (for example, the storage media 207 of the network analysis computing entity 105 in the network analysis platform/system 100 shown above in connection with FIG. 2). In some embodiments, the computing entity may store the input data object in a data storage device that is external to the network analysis platform/system (for example, a database that is in in electronic communication with the network analysis platform/system 100 shown above in connection with FIG. 1).

As described above, each of the plurality of input data objects may comprise input metadata. For example, the input metadata may comprise at least one of claim type metadata, input actor metadata, procedure code metadata, geographical area metadata, timeframe metadata, or line of business (LOB) metadata. The claim type metadata may provide data/information related to the type of health insurance claim. The input actor metadata may provide data/information related to the actors associated with the health insurance claim. The input metadata may describe procedure code associated with the health insurance claim (for example, CPT codes associated with a health insurance claim). The geographical area metadata may describe geographical area associated with a health insurance claim. The timeframe metadata may describe a timeframe associated with a health insurance claim. The LOB metadata may describe a line of business associated with a health insurance claim.

As an example, the input data object may correspond to a request for reimbursement of costs and fees associated with provide a back brace to a member in North Carolina in Oct. 1, 2019 through the Medicare program. In this example, the input data object may comprise claim type metadata that the indicates the health insurance claim is a facility claim or a claim from a durable medical equipment supplier. The input data object may comprise input actor metadata that indicates the actors associated with the health insurance claim (for example, a name/identifier of a member who received service, a name/identifier of a servicing provider who provided the service, and/or a name/identifier of a referring provider who referred the member to the service).

The input data object may comprise procedure code metadata indicating that the procedure code associated with the health insurance claim is related to back brace. The input data object may comprise geographical area metadata indicating that the health insurance claim is submitted from North Carolina. The input data object may comprise timeframe metadata indicating that the health insurance claim is submitted on Oct. 1, 2019. The input data object may comprise LOB metadata indicating that the health insurance claim is through Medicare.

Referring back to FIG. 6, subsequent to step/operation 604, the example method 600 proceeds to step/operation 606. At step/operation 606, a computing entity (such as the network analysis computing entity 105 described above in connection with FIG. 1 and FIG. 2) may include means (such as the processing element 205 of the network analysis computing entity 105 described above in connection with FIG. 2) for selecting a first subset of input data objects from the plurality of input data objects based at least in part on at least one input metadata field of the input metadata of each input data object in the first subset of input data objects matching a corresponding scheme metadata field of the scheme metadata of the scheme data object.

As described above, the scheme metadata comprises at least one of note metadata, provider specialty metadata, procedure code metadata, geographical area metadata, timeframe metadata, or line of business (LOB) metadata, and the input metadata comprises at least one of claim type metadata, input actor metadata, procedure code metadata, geographical area metadata, timeframe metadata, or line of business (LOB) metadata. As such, the computing entity may determine whether one or more input metadata associated with an input data object matches one or more corresponding scheme metadata of a scheme metadata (for example, whether the procedure code metadata of the input data object matches the procedure code metadata of the scheme data object). If so, the computing entity may select the input data object for the first subset of the input data objects.

Continuing from the example above, the scheme metadata may include one or more of note metadata (describing the healthcare fraud scheme associated with back brace), provider specialty metadata (describing the specialty as DME), procedure code metadata (describing CPT codes referring to back braces), geographical area metadata (describing Florida, Georgia, South Carolina and North Carolina, which are associated with the healthcare fraud scheme), timeframe metadata (describing 2019), or line of business (LOB) metadata (describing Medicare and retirement). In this example, the computing entity may filter the input data objects, and may identify one or more input data objects that include procedure code metadata describing CPT codes referring to back braces, geographical area metadata describing Florida, Georgia, South Carolina or North Carolina, timeframe metadata describing a timeframe that is within 2019, and/or line of business (LOB) metadata describing Medicare or retirement. Based on determining that the one or more metadata of the input data object matching one or more metadata of the scheme data object, the computing entity may add the corresponding input data object to a first subset of input data objects.

Referring to FIG. 6, the step/operation 606 may comprise various sub-steps/sub-operations, including, for example, step/operation 608, step/operation 610, and step/operation 612.

At step/operation 608, a computing entity (such as the network analysis computing entity 105 described above in connection with FIG. 1 and FIG. 2) may include means (such as the processing element 205 of the network analysis computing entity 105 described above in connection with FIG. 2) for identifying members associated with the input data objects (for example, the first subset of input data objects).

In some embodiments, the input data object may comprise metadata that describes a name or an identifier of member associated with the health insurance claim. Continuing from the back brace example above, the computing entity may identify the member associated with the input data object based on the input metadata, which may be, for example, the patient who received the back brace.

At step/operation 610, a computing entity (such as the network analysis computing entity 105 described above in connection with FIG. 1 and FIG. 2) may include means (such as the processing element 205 of the network analysis computing entity 105 described above in connection with FIG. 2) for identifying servicing providers associated with the input data objects (for example, the first subset of input data objects).

In some embodiments, the input data object may comprise input actor metadata that describes a name or an identifier of servicing provider associated with the health insurance claim. Continuing from the back brace example above, the computing entity may identify the servicing provider associated with the input data object based on the metadata, which may be, for example, the supplier who supplied the back brace to the member.

At step/operation 612, a computing entity (such as the network analysis computing entity 105 described above in connection with FIG. 1 and FIG. 2) may include means (such as the processing element 205 of the network analysis computing entity 105 described above in connection with FIG. 2) for identifying referring providers associated with the input data objects (for example, the first subset of input data objects).

In some embodiments, the input data object may comprise metadata that describes a name or an identifier of referring provider associated with the health insurance claim. Continuing from the back brace example above, the computing entity may identify the referring provider associated with the input data object based on the metadata, which may be, for example, a physician who ordered the back brace for the member.

In different embodiments, step/operation 608, step/operation 610, and/or step/operation 612 may be performed in different sequences. For example, step/operation 610 may be performed subsequent to step/operation 608, and step/operation 612 may be performed subsequent to step/operation 610. In some embodiments, step/operation 608, step/operation 610, and/or step/operation 612 may be performed concurrently, e.g., using one or more parallel processing techniques and/or using one or more distributed processing techniques.

Referring back to FIG. 6, subsequent to step/operation 606, the example method 600 proceeds to step/operation 614. At step/operation 614, a computing entity (such as the network analysis computing entity 105 described above in connection with FIG. 1 and FIG. 2) may include means (such as the processing element 205 of the network analysis computing entity 105 described above in connection with FIG. 2) for generating the tabular data object based at least in part on the first subset of input data objects.

In some embodiments, the tabular data object indicates a plurality of tabular correlations among input metadata of the first subset of input data objects. As described above, the tabular data object may comprise a plurality of columns and a plurality of rows, where each of the plurality of columns may correspond to one of input metadata types associated with input data objects (for example, claim type metadata, input actor metadata, procedure code metadata, geographical area metadata, timeframe metadata, or LOB metadata), and each of the plurality of row may corresponding to each of the input data objects. As such, the tabular data object may indicate a plurality of tabular correlations that correspond to the correlations between/among columns and rows.

Continuing from the example above, the computing entity may generate the tabular data object that may indicate the correlations between various metadata for a given input data object. For example, the tabular data object may indicate that a first input data object from the first subset of the input data objects (for example, one row in the tabular data object) includes correlated metadata (for example, columns in the tabular data object) that comprise one or more of claim type metadata, input actor metadata, procedure code metadata, geographical area metadata, timeframe metadata, or line of business (LOB) metadata.

Subsequent to step/operation 614, the example method 600 ends at step/operation 620.

Referring back to FIG. 6, in some embodiments, subsequent to step/operation 606 and instead of performing the step/operation 614, the example method 600 optionally proceeds to step/operation 616. At step/operation 616, a computing entity (such as the network analysis computing entity 105 described above in connection with FIG. 1 and FIG. 2) may include means (such as the processing element 205 of the network analysis computing entity 105 described above in connection with FIG. 2) for selecting a second subset of input data objects from the plurality of input data objects.

In some embodiments, the computing entity may select the second subset of input data objects based on an input actor metadata field of the input metadata of each input data object in the second subset of input data objects matching the input actor metadata field of the input metadata of at least one input data object in the first subset of input data objects. In other words, each of the second subset of the input data objects is associated with a member, a referring provider, or a servicing provider that is also associated with at least one of the input data objects in the first subset of the input data objects.

For example, the first subset of input data objects may comprise health insurance claims associated with members M, N, and L, referring providers A, B, and C, and servicing providers X, Y, and Z (as determined, for example, based on the input actor metadata). Each input data object in the first subset of input data objects may comprise input metadata that matches at least one scheme metadata of the scheme data object. In this example, the computing entity may filter the plurality of input data objects to identify one or more input data objects that are associated with members M, N, or L, referring providers A, B, or C, or servicing providers X, Y, or Z. In some embodiments, one or more input data objects in the second subset of input data objects may comprise input metadata that does not match at least one scheme metadata of the scheme data object. As such, various embodiments of the present disclosure may identify other health insurance claims that, while not directly linked to the fraud scheme corresponding to the scheme data object, may nonetheless be deemed related to the suspicious member, the referring provider, or the servicing provider, and may comprise fraudulent activities that are not identified in scheme data object.

Subsequent to step/operation 616, the example method 600 proceeds to step/operation 618. At step/operation 618, a computing entity (such as the network analysis computing entity 105 described above in connection with FIG. 1 and FIG. 2) may include means (such as the processing element 205 of the network analysis computing entity 105 described above in connection with FIG. 2) for generating the tabular data object based on the second subset of input data objects.

In some embodiments, the tabular data object indicates a plurality of tabular correlations among input metadata of the second subset of input data objects, similar to those described above in connection with step/operation 614.

Subsequent to step/operation 618, the example method 600 ends at step/operation 620.

d. Exemplary Operations for Generation of Graph Date Object

In various embodiments of the present disclosure, a computing entity (such as the network analysis computing entity 105 described above in connection with FIG. 1 and FIG. 2) may implement various processing techniques to generate a graph data object. Referring now to FIG. 7-FIG. 8, various examples associated with generating a graph data object are illustrated.

Referring now to FIG. 7, an example method 700 illustrates example generation of example summary metadata in accordance with embodiments of the present disclosure.

The example method 700 starts at step/operation 701.

At step/operation 703, a computing entity (such as the network analysis computing entity 105 described above in connection with FIG. 1 and FIG. 2) may include means (such as the processing element 205 of the network analysis computing entity 105 described above in connection with FIG. 2) for generating member nodes.

In some embodiments, the computing entity may generate the plurality of member nodes based at least in part on input actor metadata of the plurality of input data objects indicating a plurality of members. In some embodiments, the plurality of input data objects may correspond to the first subset of input data objects or the second subset of input data objects as described above in connection with FIG. 6.

For example, the input actor metadata associated with the input data objects may comprise health insurance claims associated with members M, N, and L. In this example, the computing entity may generate a member node corresponding to member M, a member node corresponding to member N, and a member node corresponding to member L.

Referring now to FIG. 8, an example member node 802 in an example graph data object 800 is shown.

Referring back to FIG. 7, at step/operation 705, a computing entity (such as the network analysis computing entity 105 described above in connection with FIG. 1 and FIG. 2) may include means (such as the processing element 205 of the network analysis computing entity 105 described above in connection with FIG. 2) for generating referring provider nodes.

In some embodiments, the computing entity may generate the plurality of referring provider nodes based at least in part on the input actor metadata of the plurality of input data objects indicating a plurality of referring providers. In some embodiments, the plurality of input data objects may correspond to the first subset of input data objects or the second subset of input data objects described above in connection with FIG. 6.

For example, the input actor metadata associated with the input data objects may comprise health insurance claims associated with referring provider A, B, and C. In this example, the computing entity may generate a referring provider node corresponding to referring provider A, a referring provider node corresponding to referring provider B, and a referring provider node corresponding to referring provider C.

Referring now to FIG. 8, an example provider node 804 in the example graph data object 800 is shown, which may be a referring provider node that corresponds to a referring provider.

At step/operation 707, a computing entity (such as the network analysis computing entity 105 described above in connection with FIG. 1 and FIG. 2) may include means (such as the processing element 205 of the network analysis computing entity 105 described above in connection with FIG. 2) for generating servicing provider nodes.

In some embodiments, the computing entity may generate the plurality of servicing provider nodes based at least in part on the input actor metadata of the plurality of input data objects indicating a plurality of servicing providers. In some embodiments, the plurality of input data objects may correspond to the first subset of input data objects or the second subset of input data objects described above in connection with FIG. 6.

For example, the input actor metadata associated with the input data objects may comprise health insurance claims associated with servicing provider X, Y, and Z. In this example, the computing entity may generate a servicing provider node corresponding to servicing provider X, a servicing provider node corresponding to servicing provider Y, and a servicing provider node corresponding to servicing provider Z.

Referring now to FIG. 8, the example provider node 804 may be a servicing provider node that corresponds to a referring provider.

While, in the example shown FIG. 8, the provider node 804 may represent both a servicing provider and a referring provider, it is noted that the scope of the present disclosure is not limited to this example. In some embodiments, the computing entity may generate separate nodes for referring providers and servicing providers. For example, the computing entity may generate a referring provider node for each referring provider, and a servicing provider for each servicing provider.

As described above, the computing entity may generate one or more supporting nodes. For example, each of the supporting nodes may correspond to one of the input metadata associated with the input data object. In the example shown in FIG. 8, the computing entity may generate one or more supporting nodes based on input metadata describing the state and/or zip code associated with the health insurance claim, input metadata describing the consumer segment of the member, provider specialty of the provider, input metadata describing the health insurance claim, input metadata describing the disposition detection method associated with the health insurance claim, input metadata describing diagnosis associated with the health insurance claim, input metadata describing claim line associated with the health insurance claim, input metadata describing reasons associated with the health insurance claim, input metadata describing procedure codes associated with the health insurance claim, input metadata describing procedure modifier associated with the health insurance claim, input metadata describing service category associated with the health insurance claim, input metadata describing tax identifier (TIN) associated with the health insurance claim, and/or the like.

Referring back to FIG. 7, in different embodiments, one or more of the step/operation 703, step/operation 705, and/or step/operation 707 may be performed in different sequences.

In some embodiments, one or more of the step/operation 703, step/operation 705, and/or step/operation 707 may be performed at the same time.

Subsequent to step/operation 703, step/operation 705, and/or step/operation 707, the method 700 proceeds to step/operation 709, At step/operation 709, a computing entity (such as the network analysis computing entity 105 described above in connection with FIG. 1 and FIG. 2) may include means (such as the processing element 205 of the network analysis computing entity 105 described above in connection with FIG. 2) for generating the plurality of edges.

In some embodiments, each of the plurality of edges may connect two of the nodes (for example, one member node and one servicing provider node, one member node and one referring provider node, one referring provider node and one servicing provider node, one member node/referring provider node/servicing provider node and one supporting node, and/or two supporting nodes). In some embodiments, the computing entity may generate the plurality of edges based on a plurality of tabular correlations indicated by the tabular data object.

As described above in connection with at least FIG. 6, the tabular data object may indicate a plurality of tabular correlations among input metadata of input data objects. Accordingly, the computing entity may generate the one or more edges that connects two nodes based on the corresponding input metadata that is reflected in these nodes.

In the example shown in FIG. 8, the computing entity may generate an edge 806 that connects the member node 802 and the provider node 804. For example, the tabular data object may indicate a tabular correlation that connects a member (for example, a member M) and a provider (for example, a servicing provider X or a referring provider A), as the member and the provider are related to the same health insurance claim (for example, the servicing provider X renders the service to member M or the referring provider A refers service for member M). In this example, the correlations between the member and the provider is reflected using graph edges such as edge 806.

As described above, the computer entity may generate one or more supporting nodes based on the input metadata of the input data objects. Similarly, the computing entity may generate one or more edges that connects a supporting node with another supporting node, a member node, a referring provider node, or a servicing provider node based on the tabular data object. For example, the tabular data object may comprise a column that indicates the consumer segment for each member, and the computing entity may generate an edge that connects a member with the corresponding consumer segment.

As such, the plurality of edges in the graph data objects may indicate the relationships between and among multiple actors associated with a health insurance claim. For example, the graph data object may illustrate triangular relationships between members, referring providers, and servicing providers, where one or more members may be directed to one or more servicing providers by one or more referring providers, and may receive services from the one or more servicing providers. The graph data object may be ingested by subsequent algorithms to detect suspicious members, referring providers, and servicing providers, and may provide technical benefit of reducing latency and improving accuracy in identifying irregular nodes, details of which are described herein.

Referring back to FIG. 7, subsequent to step/operation 709, the method 700 proceeds to step/operation 711 and ends.

e. Exemplary Operations for Calculation of Member Node Attributes

In various embodiments of the present disclosure, a computing entity (such as the network analysis computing entity 105 described above in connection with FIG. 1 and FIG. 2) may implement various processing techniques to calculate node attributes and edge attributes and to identify irregular member nodes. Referring now to FIG. 9, FIG. 10A, FIG. 10B, FIG. 11, FIG. 12, and FIG. 13, various examples associated with calculating node/edge attributes and identifying irregular member nodes are illustrated.

Referring now to FIG. 9, an example method 900 illustrates example calculations of node attributes and edge attributes in accordance with embodiments of the present disclosure.

The example method 900 starts at step/operation 901.

At step/operation 903, a computing entity (such as the network analysis computing entity 105 described above in connection with FIG. 1 and FIG. 2) may include means (such as the processing element 205 of the network analysis computing entity 105 described above in connection with FIG. 2) for calculating claim-line-count attributes for the plurality of member nodes.

In the present disclosure, the term "claim-line-count attribute" may refer to a type of node attribute that is associated with counts (or the amount) of claim lines. For example, to calculate a claim-line-count attribute for a member node, the computing entity may calculate a first value that represents the total count or amount of claim lines that correlate the member node to referring provider node(s), and a second value that represents the count of amount of claim lines that correlate the member node to the referring provider node(s) and are related to a scheme data object. The computing entity may calculate a percentage or ratio of the second value in the first value as the claim-line-count attribute for the member node.

Figure 11:
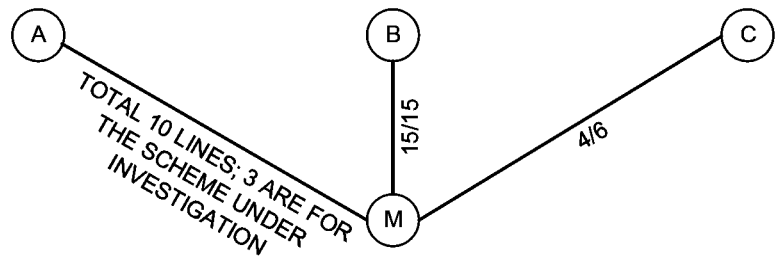

Referring now to FIG. 11, as an example, as an example, the member node M may be correlated to three referring provider nodes A, B, and C, and the scheme data object may be related to a fraudulent scheme of genetic testing. Based on the graph data object, the computing entity may calculate that there are a total of 10 claim lines that correlate the member node M with the referring provider node A. In other words, there are 10 health insurance claims that are related to services referred by a referring provider (corresponding to the referring provider node A) for a member (corresponding to the member node M). The computing entity may calculate that there are a total of 15 claim lines that correlate the member node M with the referring provider node B. In other words, there are 15 health insurance claims that are related to services referred by a referring provider (corresponding to the referring provider node B) for the member (corresponding to the member node M). The computing entity may calculate that there are a total of 6 claim lines that correlate the member node M with the referring provider node C. In other words, there are 6 health insurance claims that are related to services referred by a referring provider (corresponding to the referring provider node C) for the member (corresponding to the member node M). The computing entity may calculate the first value as a sum of 10, 15, and 6, which is 31.

The computing entity may also calculate that, of the 10 claim lines correlated between the member node M and the referring provider node A, there are 3 claim lines that are related to genetic testing. In other words, there are 3 health insurance claims that are for services related to genetic testing referred by the referring provider (corresponding to referring provider node A) for the member (corresponding to the member node M). The computing entity may calculate that, of the 15 claim lines correlated between the member node M and the referring provider node B, there are 15 claim lines that are related to genetic testing. In other words, all of the 15 health insurance claims are for services related to genetic testing referred by the referring provider (corresponding to referring provider node B) for the member (corresponding to the member node M). The computing entity may calculate that, of the 6 claim lines correlated between the member node M and the referring provider node C, there are 4 claim lines that are related to genetic testing. In other words, 4 of the health insurance claims are for services related to genetic testing referred by the referring provider (corresponding to referring provider node C) for the member (corresponding to the member node M). The computing entity may calculate the second value as a sum of 3, 15, and 4, which is 22.

In this example, the computing entity may calculate the claim-line-count attribute for the member node M as 22/31.

As such, the claim-line-count attributes may indicate whether the relationship between the referring provider and the members are centered only around one type of service or alternatively a gamut of services (which may be expected in non-fraudulent circumstances).

Referring back to FIG. 9, at step/operation 905, a computing entity (such as the network analysis computing entity 105 described above in connection with FIG. 1 and FIG. 2) may include means (such as the processing element 205 of the network analysis computing entity 105 described above in connection with FIG. 2) for calculating serviced-by-referring-provider-percentage attributes for the plurality of member nodes.

In the present disclosure, the term "serviced-by-referring-provider-percentage attribute" may refer to a type of node attribute that indicates the proportion (for example, a percentage or ratio) of all referring provider(s) that also have servicing relationship with a member. For example, to calculate a serviced-by-referring-provider-percentage attribute, the computing entity may calculate a ratio of claims of a member that are referral claims to all of the claims of the member.

Figure 12:
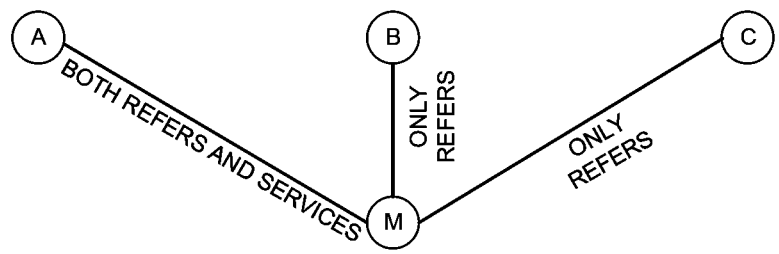

Referring now to FIG. 12, as an example, the member node M may be correlated to three referring provider nodes A, B, and C. In other words, the graph data object may indicate that there are three referring providers (represented by the referring provider nodes A, B, and C) that are associated with the member (represented by the member node M). In this example, the graph data object may also indicate that the referring provider corresponding to the referring provider node A also has a servicing relationship with the member corresponding to the member node M. For example, the referring provider corresponding to the referring provider node A may be a primary care physician that not only refers services for the member, but also renders service for the member. In contrast, the graph data object may indicate that the referring providers corresponding to the referring provider nodes B and C do not have a servicing relationship with the member corresponding to the member node M. As such, the computing entity may calculate the serviced-by-referring-provider-percentage attribute for the member node as 1/3.

As such, serviced-by-referring-provider-percentage attribute may indicate whether the member has only a referring relationship with a provider or has also a servicing relationship with a provider (which may be expected in non-fraudulent circumstances).

Referring back to FIG. 9, at step/operation 907, a computing entity (such as the network analysis computing entity 105 described above in connection with FIG. 1 and FIG. 2) may include means (such as the processing element 205 of the network analysis computing entity 105 described above in connection with FIG. 2) for calculating average-distance attributes for the plurality of member nodes.

In the present disclosure, the term "average-distance attribute" may refer to a type of edge attribute that indicates an average physical distance between the locations of member(s) and referring provider(s). For example, the average-distance attribute for a member node calculated at step/operation 907 may correspond to an average physical distance between the location(s) of a member as represented by a member node and location(s) of all referring provider(s) correlated to that member as represented by referring provider node(s) that are connected to the member node.

Figure 13:
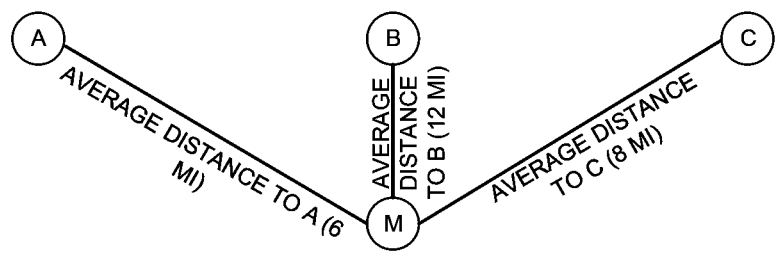

Referring now to FIG. 13, as an example, the member node M may be correlated to three referring provider nodes A, B, and C. In other words, the graph data object may indicate that there are three referring providers (represented by the referring provider nodes A, B, and C) associated with the member (represented by the member node M). In this example, the graph data object may indicate that an average distance between the referring provider corresponding to the referring provider node A and the member corresponding to the member node M is 6 miles. The graph data object may also indicate that an average distance between the referring provider corresponding to the referring provider node B and the member corresponding to the member node M is 12 miles. The graph data object may also indicate that an average distance between the referring provider corresponding to the referring provider node C and the member corresponding to the member node M is 8 miles. As such, the computing entity may calculate the average-distance attribute as an average or mean of 6 miles, 12 miles, and 8 miles, which is 8.7 miles.

As such, the average-distance attribute may indicate, on an average, how far is the member from the referring providers that they see.

Referring back to FIG. 9, in different embodiments, one or more of the step/operation 903, step/operation 905, and/or step/operation 907 may be performed in different sequences. In some embodiments, one or more of the step/operation 903, step/operation 905, and/or step/operation 907 may be performed at the same time.

Subsequent to step/operation 903, step/operation 905, and/or step/operation 907, the example method 900 ends at step/operation 909.

In the example shown in FIG. 9, the computing entity may calculate node attributes and edge attributes that may be utilized to examine the focus of the relationship (just one type of service is suspicious) through claim-line-count attributes, the nature of the relationship (just referring is suspicious) through serviced-by-referring-provider-percentage attributes, and the provider-member distance through average-distance attributes. These attributes may facilitate the identification of irregular member nodes, exemplary details of which are described in connection with at least FIG. 10A and FIG. 10B.

f. Exemplary Operations for Identification of Irregular Member Nodes

Figure 10A:
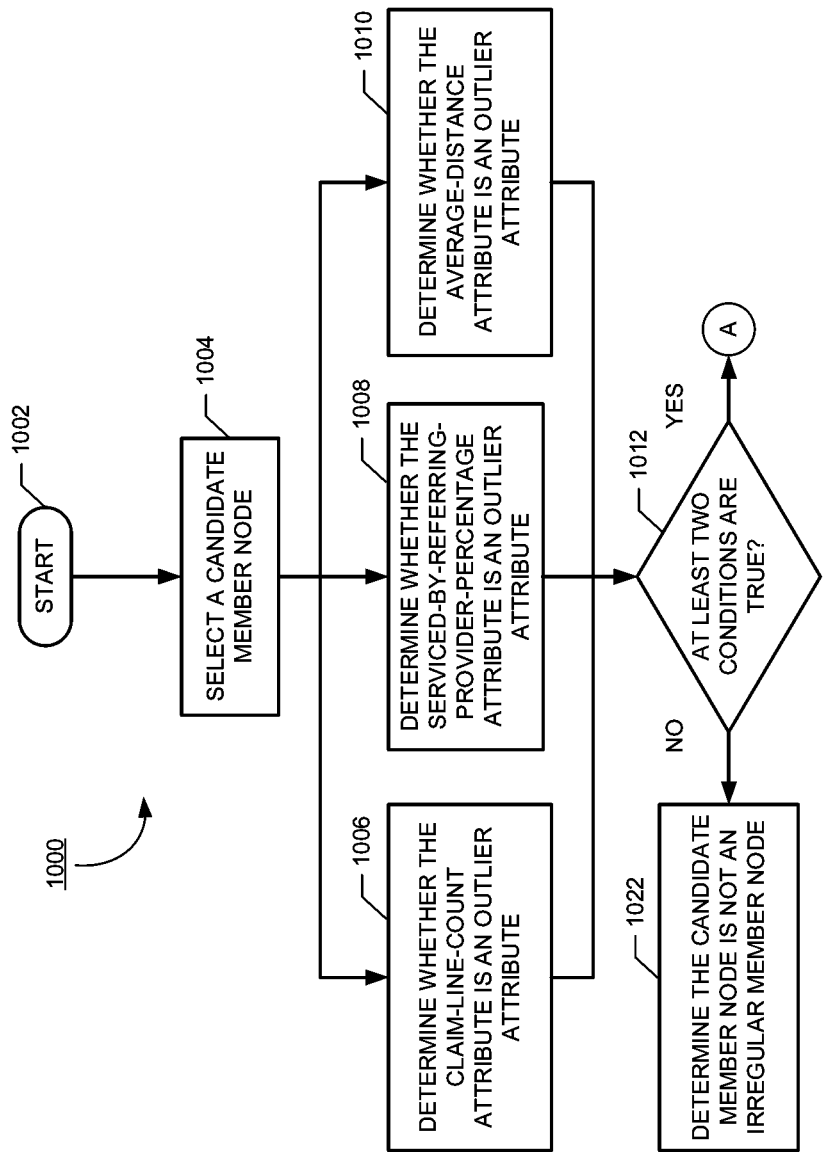
Figure 10B:
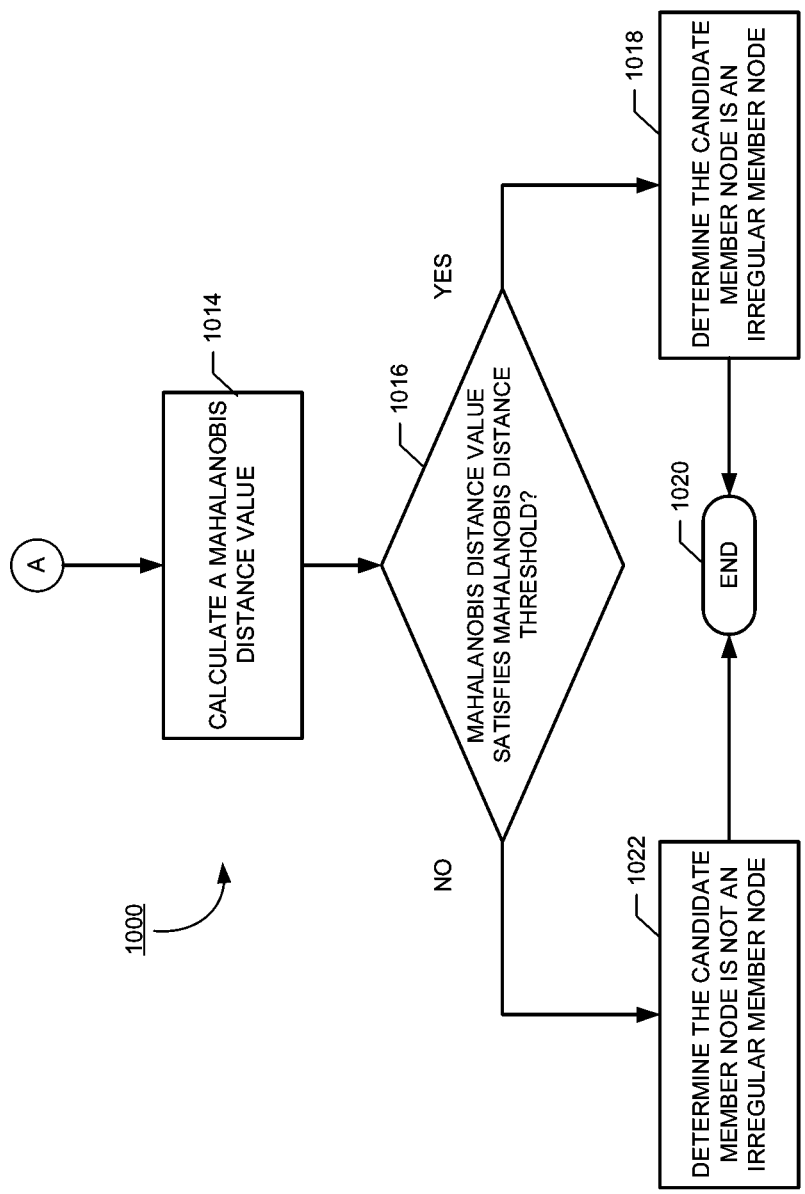

Referring now to FIG. 10A and FIG. 10B, an example method 1000 illustrates example identification of an irregular member node in accordance with embodiments of the present disclosure.

Referring now to FIG. 10A, the example method 1000 starts at step/operation 1002.

At step/operation 1004, a computing entity (such as the network analysis computing entity 105 described above in connection with FIG. 1 and FIG. 2) may include means (such as the processing element 205 of the network analysis computing entity 105 described above in connection with FIG. 2) for selecting a candidate member node from the plurality of member nodes.

In some embodiments, the computing entity may select a candidate member node from the plurality of member nodes of a graph data object that is generated in accordance with embodiments of the present disclosure. In some embodiments, the computing entity may traverse all member nodes in the graph data object, and may perform the example method 1000 on each member node to determine whether it is an irregular member node.

As an example, the graph data object may comprise member nodes M, N, and L, and the computing entity may select the member node M as the candidate member node at step/operation 1004.

In some embodiments, at step/operation 1006, a computing entity (such as the network analysis computing entity 105 described above in connection with FIG. 1 and FIG. 2) may include means (such as the processing element 205 of the network analysis computing entity 105 described above in connection with FIG. 2) for determining whether the claim-line-count attribute of the candidate member node is an outlier attribute among the plurality of claim-line-count attributes.

As described above in connection with at least FIG. 9 and FIG. 11, the computing entity may calculate a plurality of claim-line-count attributes for a plurality of member nodes in the graph data object. Continuing from the above example, the computing entity may calculate a first claim-line-count attribute for the member node M, a second claim-line-count attribute for the member node N, and a third claim-line-count attribute for the member node L.

In this example, the computing entity may determine whether the first claim-line-count attribute (of the candidate member node M selected at step/operation 1004) is an outlier attribute among the plurality of claim-line-count attributes (in other words, the first claim-line-count attribute, the second claim-line-count attribute, and the third claim-line-count attribute).

In some embodiments, the computing entity may determine whether the claim-line-count attribute of the candidate member node is an outlier attribute based on one or more algorithms, including, but not limited to, Tukey's Fences algorithm.

Continuing from the above example, the computing entity may provide the first claim-line-count attribute, the second claim-line-count attribute, and the third claim-line-count attribute as inputs to the Tukey's Fences algorithm, and may determine whether the first claim-line-count attribute is an outlier among these attributes.

In some embodiments, at step/operation 1008, a computing entity (such as the network analysis computing entity 105 described above in connection with FIG. 1 and FIG. 2) may include means (such as the processing element 205 of the network analysis computing entity 105 described above in connection with FIG. 2) for determining whether the serviced-by-referring-provider-percentage attribute of the candidate member node is an outlier attribute among the plurality of serviced-by-referring-provider-percentage attributes.

As described above in connection with at least FIG. 9 and FIG. 12, the computing entity may calculate a plurality of serviced-by-referring-provider-percentage attributes for a plurality of member nodes in the graph data object. Continuing from the above example, the computing entity may calculate a first serviced-by-referring-provider-percentage attribute for the member node M, a second serviced-by-referring-provider-percentage for the member node N, and a third serviced-by-referring-provider-percentage attribute for the member node L.

In this example, the computing entity may determine whether the first serviced-by-referring-provider-percentage attribute (of the candidate member node M selected at step/operation 1004) is an outlier attribute among the plurality of serviced-by-referring-provider-percentage attributes (in other words, the first serviced-by-referring-provider-percentage attribute, the second serviced-by-referring-provider-percentage attribute, and the third serviced-by-referring-provider-percentage attribute).

In some embodiments, the computing entity may determine whether the serviced-by-referring-provider-percentage attribute of the candidate member node is an outlier attribute based on one or more algorithms, including, but not limited to, Tukey's Fences algorithm.

Continuing from the above example, the computing entity may provide the first serviced-by-referring-provider-percentage attribute, the second serviced-by-referring-provider-percentage attribute, and the third serviced-by-referring-provider-percentage attribute as inputs to the Tukey's Fences algorithm, and may determine whether the first serviced-by-referring-provider-percentage attribute is an outlier among these attributes.

In some embodiments, at step/operation 1010, a computing entity (such as the network analysis computing entity 105 described above in connection with FIG. 1 and FIG. 2) may include means (such as the processing element 205 of the network analysis computing entity 105 described above in connection with FIG. 2) for determining whether the average-distance attribute of the candidate member node is an outlier attribute among the plurality of average-distance attributes.

As described above in connection with at least FIG. 9 and FIG. 12, the computing entity may calculate a plurality of average-distance attributes for a plurality of member nodes in the graph data object. Continuing from the above example, the computing entity may calculate a first average-distance attribute for the member node M, a second average-distance for the member node N, and a third average-distance attribute for the member node L.

In this example, the computing entity may determine whether the first average-distance attribute (of the candidate member node M selected at step/operation 1004) is an outlier attribute among the plurality of average-distance attributes (in other words, the first average-distance attribute, the second average-distance attribute, and the third average-distance attribute).

In some embodiments, the computing entity may determine whether the average-distance attribute of the candidate member node is an outlier attribute based on one or more algorithms, including, but not limited to, Tukey's Fences algorithm.

Continuing from the above example, the computing entity may provide the first average-distance attribute, the second average-distance attribute, and the third average-distance attribute as inputs to the Tukey's Fences algorithm, and may determine whether the first average-distance attribute is an outlier among these attributes.

In different embodiments, one or more of the step/operation 1006, step/operation 1008, and/or step/operation 1010 may be performed in different sequences. In some embodiments, one or more of step/operation 1006, step/operation 1008, and/or step/operation 1010 may be performed concurrently, e.g., using one or more parallel processing techniques and/or one or more distributed processing techniques.

Subsequent to step/operation 1006, step/operation 1008, and/or step/operation 1010, the example method 1000 proceeds to step/operation 1012. At step/operation 1012, a computing entity (such as the network analysis computing entity 105 described above in connection with FIG. 1 and FIG. 2) may include means (such as the processing element 205 of the network analysis computing entity 105 described above in connection with FIG. 2) for determining whether at least two outlier-status-based conditions associated with the candidate member node are true.

In some embodiments, conditions associated with the candidate member node may be whether the member node is associated with one or more outlier attributes, as determined by, for example but not limited to, step/operation 1006, step/operation 1008, and/or step/operation 1010. For example, if one of the attributes of the member node is determined to be an outlier attribute, the computing entity may determine that the corresponding condition associated with the candidate member node is true. If one of the attributes of the member node is determined to not be an outlier attribute, the computing entity may determine that the condition associated with the candidate member node is not true.

In other words, the computing entity determines whether at least two conditions of a group of conditions are satisfied—the group of conditions comprising: (1) a first condition requiring that the claim-line-count attribute being the outlier attribute among the plurality of claim-line-count attributes, (2) a second condition requiring that the serviced-by-referring-provider-percentage attribute being the outlier attribute among the plurality of serviced-by-referring-provider-percentage attributes, and (3) a third condition requiring that the average-distance attribute being the outlier attribute among the plurality of average-distance attributes.

Continuing from the example above, if the computing entity determines that at least two of the claim-line-count attribute (determined at step/operation 1006), the serviced-by-referring-provider-percentage attribute (determined at step/operation 1008), and/or the average-distance attribute (determined at step/operation 1010) associated with the candidate member node are determined to be outlier attributes, the computing entity determines that at least two conditions are true at step/operation 1012. If the computing entity determines that only one of the claim-line-count attribute, the serviced-by-referring-provider-percentage attribute, or the average-distance attribute is determined to be an outlier attribute, the computing entity determines that less than two conditions are true.

If, at step/operation 1012, the computing entity determines that less than two conditions associated with the candidate member node are true, the example method 1000 proceeds to step/operation 1022. At step/operation 1022, a computing entity (such as the network analysis computing entity 105 described above in connection with FIG. 1 and FIG. 2) may include means (such as the processing element 205 of the network analysis computing entity 105 described above in connection with FIG. 2) for determining that the candidate member node is not an irregular member node.

If, at step/operation 1012, the computing entity determines that at least two conditions associated with the candidate member node are true, the method 1000 proceeds to block A, which connects FIG. 10A to FIG. 10B. Referring now to FIG. 10B, subsequent to block A (e.g. subsequent to determining that at least two conditions associated with the candidate member node are true), the example method 1000 proceeds to step/operation 1014. At step/operation 1014, a computing entity (such as the network analysis computing entity 105 described above in connection with FIG. 1 and FIG. 2) may include means (such as the processing element 205 of the network analysis computing entity 105 described above in connection with FIG. 2) for calculating a Mahalanobis distance value.

In some embodiments, the Mahalanobis distance value is a statistical measure of the extent to which attributers are multivariate outliers. The larger the Mahalanobis distance value, the more unusual the node is. In some embodiments, the computing entity may calculate the Mahalanobis distance value based on the claim-line-count attribute, the serviced-by-referring-provider-percentage attribute, and the average-distance attribute of the candidate member node.

Continuing from the example above, the computing entity may provide the claim-line-count attribute, the serviced-by-referring-provider-percentage attribute, and the average-distance attribute of the candidate member node M as inputs to a Mahalanobis distance algorithm, and the Mahalanobis distance algorithm may generate an output that is the Mahalanobis distance value.

Subsequent to step/operation 1014, the example method 1000 proceeds to step/operation 1016. At step/operation 1016, a computing entity (such as the network analysis computing entity 105 described above in connection with FIG. 1 and FIG. 2) may include means (such as the processing element 205 of the network analysis computing entity 105 described above in connection with FIG. 2) for determining whether the Mahalanobis distance value calculated at step/operation 1014 satisfies a Mahalanobis distance threshold for the member node M.

In some embodiments, the Mahalanobis distance threshold is two standard deviations from the mean Mahalanobis distance across all member nodes. For example, if the Mahalanobis distance value calculated at step/operation 1014 is more than two standard deviations from the mean Mahalanobis distance across all member nodes, the computing entity determines that the Mahalanobis distance value satisfies the Mahalanobis distance threshold. If the Mahalanobis distance value calculated at step/operation 1014 is not more than two standard deviations from the mean Mahalanobis distance across all member nodes, the computing entity determines that the Mahalanobis distance value does not satisfy the Mahalanobis distance threshold.

In some embodiments, the Mahalanobis distance threshold may be determined based on statistical measures other than two standard deviations from the mean Mahalanobis distance across all member nodes.

While the description above provides an example based on a Mahalanobis distance algorithm, it is noted that the scope of the present disclosure is not limited to the description above. In some examples, one or more distance based formulas or algorithms in addition to the Mahalanobis distance algorithm, or in alternative of the Mahalanobis distance algorithm, may be implemented, including, but not limited to, an Euclidean distance formula.

If, at step/operation 1016, the computing entity determines that the Mahalanobis distance value does not satisfy the Mahalanobis distance threshold, the example method 1000 proceeds to step/operation 1022. At step/operation 1022, a computing entity (such as the network analysis computing entity 105 described above in connection with FIG. 1 and FIG. 2) may include means (such as the processing element 205 of the network analysis computing entity 105 described above in connection with FIG. 2) for determining the candidate member node is not an irregular member node.

Subsequent to step/operation 1022, the example method 1000 ends at step/operation 1020.

If, at step/operation 1016, the computing entity determines that the Mahalanobis distance value satisfies the Mahalanobis distance threshold, the example method 1000 proceeds to step/operation 1018. At step/operation 1018, a computing entity (such as the network analysis computing entity 105 described above in connection with FIG. 1 and FIG. 2) may include means (such as the processing element 205 of the network analysis computing entity 105 described above in connection with FIG. 2) for determining that the candidate member node is an irregular member node.

As such, in accordance with various embodiments of the present disclosure, the computing entity may identify that a candidate member node is an irregular member node in response to determining that: the Mahalanobis distance value satisfies a Mahalanobis distance threshold, and at least two of (1) the claim-line-count attribute being an outlier attribute, (2) the serviced-by-referring-provider-percentage attribute being an outlier attribute, or (3) the average-distance attribute being an outlier attribute are true.

As described above, an irregular member node may correspond to a member that may be suspicious of or associated with healthcare fraud.

Subsequent to step/operation 1018, the example method 1000 ends at step/operation 1020.

g. Exemplary Operations for Calculation of Referring Provider Node Attributes

In various embodiments of the present disclosure, a computing entity (such as the network analysis computing entity 105 described above in connection with FIG. 1 and FIG. 2) may implement various processing techniques to calculate node attributes and edge attributes and to identify irregular referring provider nodes. Referring now to FIG. 14, FIG. 15A, FIG. 15B, FIG. 16, FIG. 17, FIG. 18, various examples associated with calculating node/edge attributes and identifying irregular referring provider nodes are illustrated.

Figure 14:
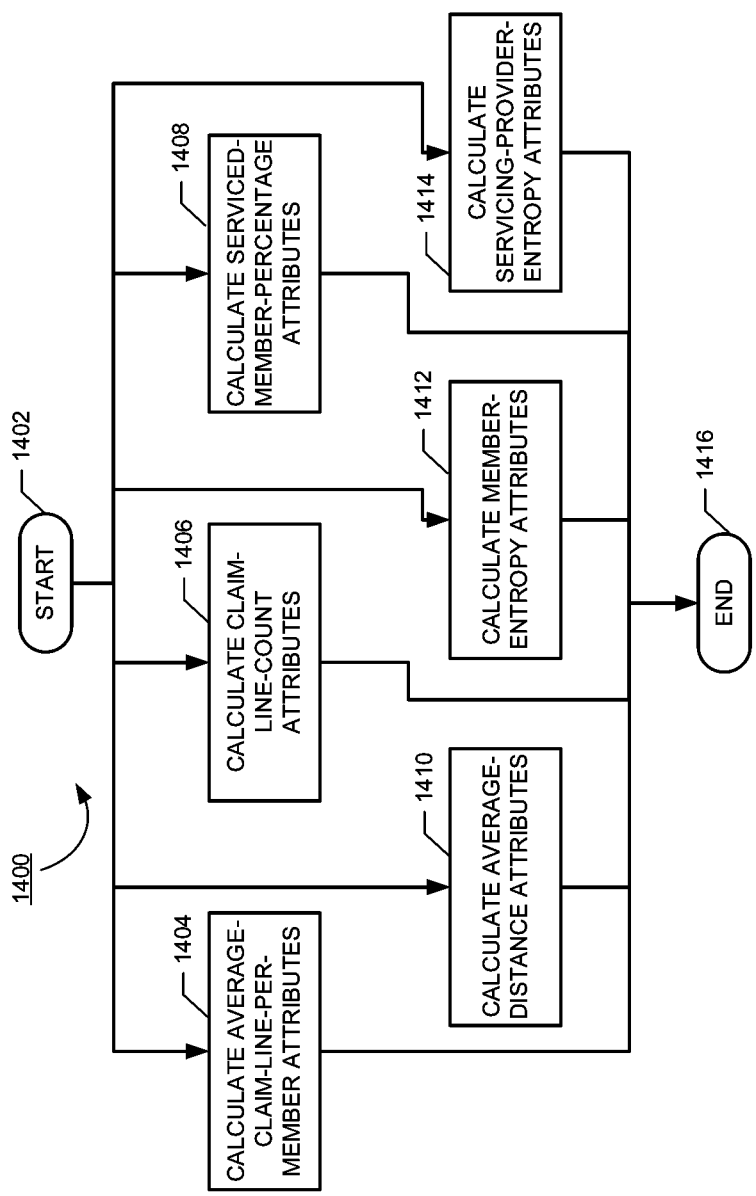

Referring now to FIG. 14, an example method 1400 illustrates example calculations of node attributes and edge attributes related to referring service providers in accordance with embodiments of the present disclosure.

The example method 1400 starts at step/operation 1402.

At step/operation 1404, a computing entity (such as the network analysis computing entity 105 described above in connection with FIG. 1 and FIG. 2) may include means (such as the processing element 205 of the network analysis computing entity 105 described above in connection with FIG. 2) for calculating average-claim-line-per-member attributes for the plurality of referring provider nodes.

In the present disclosure, the term "average-claim-line-per-member attribute" may refer to a type of node attribute that is associated with counts (or the amount) of claim lines on a per member basis. For example, to calculate an average-claim-line-per-member attribute for a referring provider node, the computing entity may calculate a number of claim lines associated with the referring provider node that are associated with the scheme data object, and may divided by the number of member nodes that are correlated to the servicing provider node in the graph data object.

Figure 16:
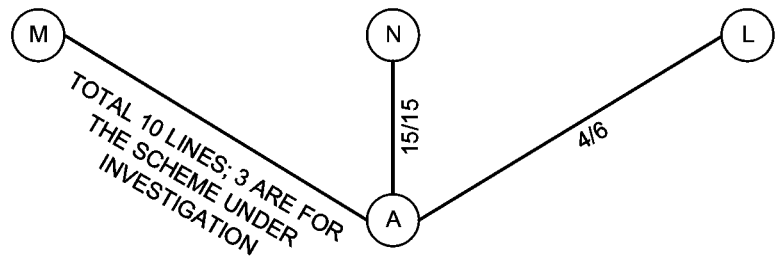

Referring now to FIG. 16, as an example, the referring provider node A may be correlated to three member nodes M, N, and L, and the scheme data object may be related to a fraudulent scheme of genetic testing. The computing entity may calculate that there are 3 claim lines that are related to genetic testing out of the 10 claim lines correlated between the member node M and the referring provider node A. In other words, there are 3 health insurance claims that are for services related to genetic testing referred by the referring provider (corresponding to referring provider node A) for the member (corresponding to the member node M). The computing entity may calculate that there are 15 claim lines that are related to genetic testing out of the 15 claim lines correlated between the member node N and the referring provider node A. In other words, all of the 15 health insurance claims are for services related to genetic testing referred by the referring provider (corresponding to referring provider node A) for the member (corresponding to the member node N). The computing entity may calculate that there are 4 claim lines that are related to genetic testing out of the 6 claim lines correlated between the member node L and the referring provider node A. In other words, 4 of the health insurance claims are for services related to genetic testing referred by the referring provider (corresponding to referring provider node A) for the member (corresponding to the member node L). The computing entity may calculate the average-claim-line-per-member as a sum of 3, 15, and 4 divided the number of member nodes (3), which is 22/3.

Referring back to FIG. 14, at step/operation 1406, a computing entity (such as the network analysis computing entity 105 described above in connection with FIG. 1 and FIG. 2) may include means (such as the processing element 205 of the network analysis computing entity 105 described above in connection with FIG. 2) for calculating claim-line-count attributes for the plurality of referring provider nodes.

In some embodiments, to calculate the claim-line-count attribute, the computing entity may calculate a first value that represents the total count or amount of claim lines that correlate the referring provider node to member node(s), and a second value that represents the count of amount of claim lines that correlate the referring provider node to the member node(s) and are related to a scheme data object. The computing entity may calculate a percentage or ratio of the second value in the first value as the claim-line-count attribute for the referring provider node.

Referring now to FIG. 16, as an example, the computing entity may calculate that there are a total of 10 claim lines that correlate the member node M with the referring provider node A. The computing entity may calculate that there are a total of 15 claim lines that correlate the member node N with the referring provider node A. The computing entity may calculate that there are a total of 6 claim lines that correlate the member node L with the referring provider node A. The computing entity may calculate the first value as a sum of 10, 15, and 6, which is 31.

The computing entity may calculate that there are 3 claim lines that are related to genetic testing correlated between the member node M and the referring provider node A. The computing entity may calculate that there are 15 claim lines that are related to genetic testing correlated between the member node N and the referring provider node A. The computing entity may calculate that there are 4 claim lines that are related to genetic testing correlated between the member node L and the referring provider node A. The computing entity may calculate the second value as a sum of 3, 15, and 4, which is 22.

In this example, the computing entity may calculate the claim-line-count attribute for the referring provider node M as 22/31.

As such, the average-claim-line-per-member attribute and the claim-line-count attribute may indicate whether a referring provider makes a lot of referrals for a particular type of service and whether the pattern of referral are the same or different across members.

Referring back to FIG. 14, at step/operation 1408, a computing entity (such as the network analysis computing entity 105 described above in connection with FIG. 1 and FIG. 2) may include means (such as the processing element 205 of the network analysis computing entity 105 described above in connection with FIG. 2) for calculating serviced-member-percentage attributes for the plurality of referring provider nodes.

In the present disclosure, the term "serviced-member-percentage attribute" refers to a type of node attribute that indicates the proportion (for example, a percentage or ratio) of all member(s) that also have servicing relationship with a referring provider.

Figure 17:
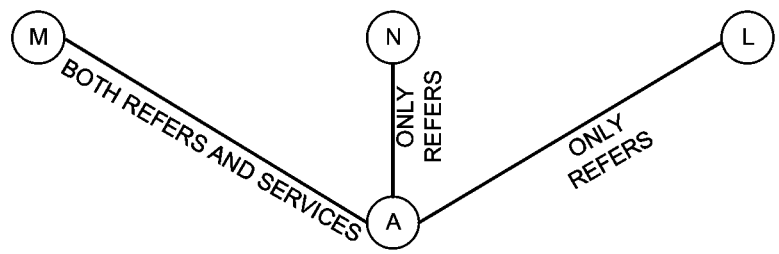

Referring now to FIG. 17, as an example, the referring provider node A may be correlated to three member nodes M, N, and L. In other words, the graph data object may indicate that there are three members (represented by the member nodes M, N, and L) that are associated with the referring provider (represented by the referring provider node A). In this example, the graph data object may also indicate that the member corresponding to the member node M also has a servicing relationship with the servicing provider corresponding to the servicing provider node A. For example, the referring provider corresponding to the referring provider node A may be a primary care physician that not only refers services for the member, but also renders service for the member. In contrast, the graph data object may indicate that the members corresponding to the member nodes N and L do not have a servicing relationship with the referring provider corresponding to the referring provider node A. As such, the computing entity may calculate the serviced-member-percentage attribute for the servicing provider node as 1/3.

As such, the serviced-member-percentage attribute may indicate whether the referring provider's relationship with their members center around referrals, as normally referring providers may also render some services to the member.

Referring back to FIG. 14, at step/operation 1410, a computing entity (such as the network analysis computing entity 105 described above in connection with FIG. 1 and FIG. 2) may include means (such as the processing element 205 of the network analysis computing entity 105 described above in connection with FIG. 2) for calculating average-distance attributes for the plurality of referring provider nodes.

As described above, the term "average-distance attribute" may refer to a type of edge attribute that indicates an average physical distance between the locations of member(s) and referring provider(s). For example, the average-distance attribute for a referring provider node calculated at step/operation 1410 may correspond to an average physical distance between the location(s) of a referring provider as represented by a referring provider node and location(s) of all member(s) correlated to that referring provider as represented by member node(s) that are connected to the referring provider node.

Figure 18:
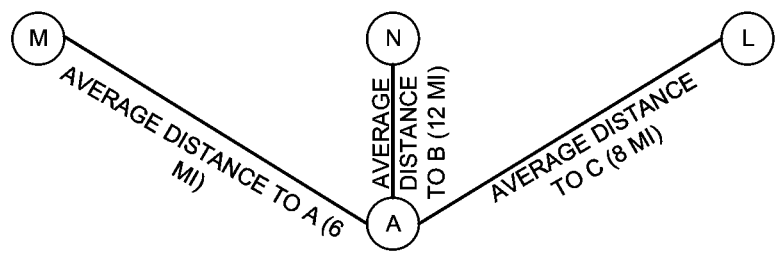

Referring now to FIG. 18, as an example, the referring provider node A may be correlated to three member nodes M, N, and L. In other words, the graph data object may indicate that there are three members (represented by the member nodes M, N, and L) associated with the referring provider (represented by the referring provider node A). In this example, the graph data object may indicate that an average distance between the referring provider corresponding to the referring provider node A and the member corresponding to the member node M is 6 miles. The graph data object may also indicate that an average distance between the referring provider corresponding to the referring provider node A and the member corresponding to the member node N is 12 miles. The graph data object may also indicate that an average distance between the referring provider corresponding to the referring provider node A and the member corresponding to the member node L is 8 miles. As such, the computing entity may calculate the average-distance attribute as an average or mean of 6 miles, 12 miles, and 8 miles, which is 8.7 miles.

As such, the average-distance attribute may indicate, on an average, how far is referring provider to the members.

Referring back to FIG. 14, at step/operation 1412, a computing entity (such as the network analysis computing entity 105 described above in connection with FIG. 1 and FIG. 2) may include means (such as the processing element 205 of the network analysis computing entity 105 described above in connection with FIG. 2) for calculating member-entropy attributes for the plurality of referring provider nodes.

In the present disclosure, the term "member-entropy attribute" refers to an entropy value that corresponds to the share of claims that a referring provider node received from various members that are related to the scheme data object. In some embodiments, the member-entropy attribute may be low if the referring provider node refers most claims related to the fraud scheme as indicated by the scheme data object for only a few members.

For example, the scheme data object may be related to a fraud scheme associated with genetic testing. A referring provider node A may be correlated to three member nodes M, N, and L. If the referring provider represented by the referring provider node A refers genetic testing only for member node M, the value of the member-entropy attribute may be smaller as compared to the value of the member-entropy attribute if the referring provider node A refers genetic testing for member nodes M, N, and L.

At step/operation 1414, a computing entity (such as the network analysis computing entity 105 described above in connection with FIG. 1 and FIG. 2) may include means (such as the processing element 205 of the network analysis computing entity 105 described above in connection with FIG. 2) for calculating servicing-provider-entropy attributes for the plurality of referring provider nodes.

In the present disclosure, the term "servicing-provider-entropy attribute" refers to an entropy value that corresponds to the share of claims that a referring provider node refers to various servicing providers that are related to the scheme data object. In some embodiments, the servicing-provider-entropy attribute may be low if the referring provider node refers most claims related to the fraud scheme as indicated by the scheme data object to only a few servicing providers.

For example, the scheme data object may be related to a fraud scheme associated with genetic testing. A referring provider node A may be correlated to three servicing provider node X, Y, and Z. If the referring provider represented by the referring provider node A refers genetic testing to only servicing provider node X, the value of the servicing-provider-entropy attribute may be smaller as compared to the value of servicing-provider-entropy attribute if the referring provider node A refers genetic testing to servicing provider nodes X, Y, and Z.

In different embodiments, one or more of the step/operation 1404, step/operation 1406, step/operation 1408, step/operation 1410, step/operation 1412, and/or step/operation 1414 may be performed in different sequences. In some embodiments, one or more of the step/operation 1404, step/operation 1406, step/operation 1408, step/operation 1410, step/operation 1412, and/or step/operation 1414 may be performed concurrently, e.g., using one or more parallel processing techniques and/or using one or more distributed processing techniques.

Subsequent to step/operation 1404, step/operation 1406, step/operation 1408, step/operation 1410, step/operation 1412, and/or step/operation 1414, the example method 1400 ends at step/operation 1416.

In the example shown in FIG. 14, the computing entity may calculate node attributes and edge attributes that may be utilized to examine the focus of the relationship (high number and percentage of referrals for a certain type of service) through average-claim-line-per-member attributes and claim-line-count attributes, the nature of the relationship (largely centered around referrals for a certain type of service) through the serviced-member-percentage attributes, the provider-member distance through the average-distance attributes, as well as the concentration of the relationship with members as well as servicing providers measured using entropy through the member-entropy attributes and the servicing-provider-entropy attributes. These attributes may facilitate the identification of irregular referring provider nodes, exemplary details of which are described in connection with at least FIG. 15A and FIG. 15B.

h. Exemplary Operations for Identification of Irregular Referring Provider Nodes Referring now to FIG. 15A and FIG. 15B, an example method 1500 illustrates example identification of an irregular referring provider node in accordance with embodiments of the present disclosure.

Figure 15A:
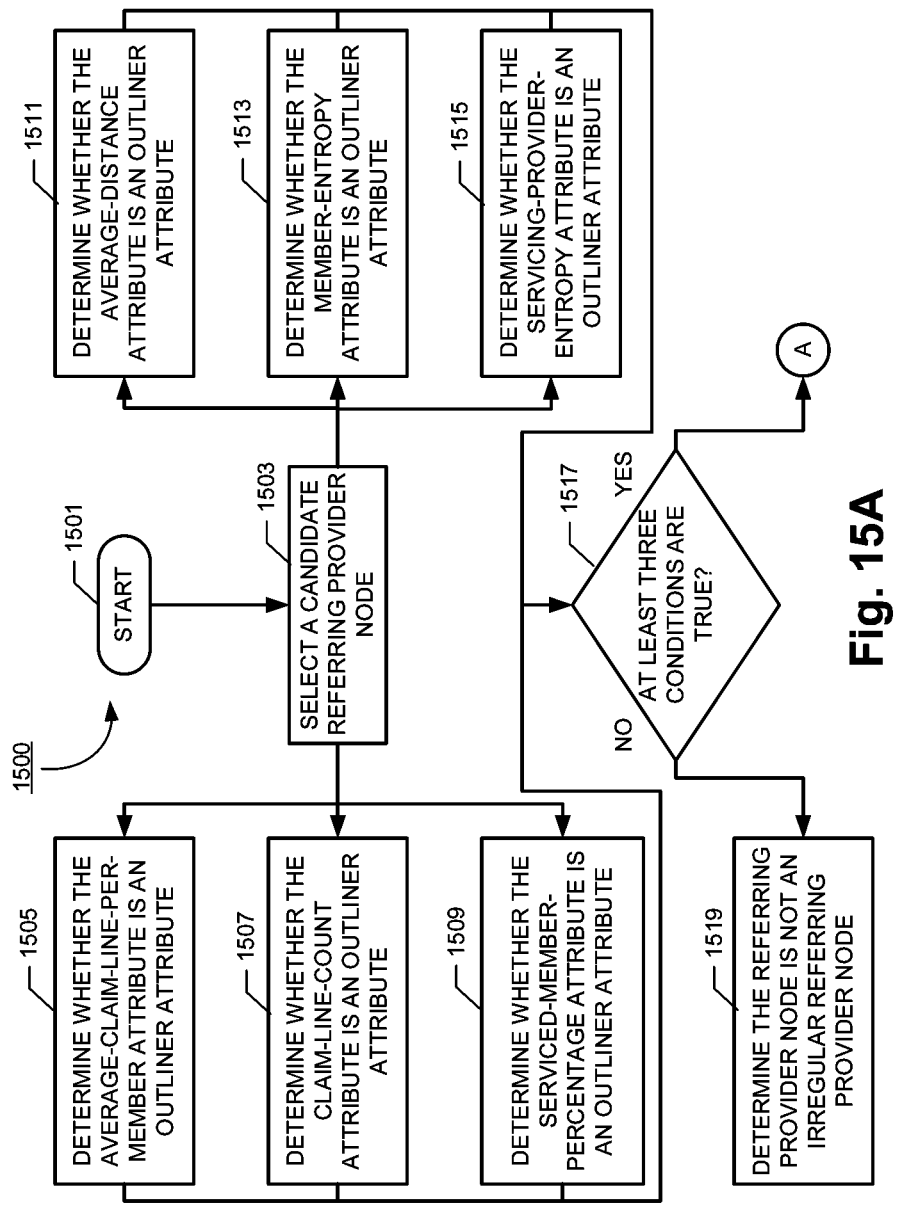

Referring now to FIG. 15A, the example method 1500 starts at step/operation 1501.

At step/operation 1503, a computing entity (such as the network analysis computing entity 105 described above in connection with FIG. 1 and FIG. 2) may include means (such as the processing element 205 of the network analysis computing entity 105 described above in connection with FIG. 2) for selecting a candidate referring provider node from the plurality of referring provider nodes.

In some embodiments, the computing entity may select a referring provider node from the plurality of referring provider nodes of a graph data object that is generated in accordance with embodiments of the present disclosure. In some embodiments, the computing entity may traverse all referring provider nodes in the graph data object, and may perform the example method 1500 on each referring provider node to determine whether it is an irregular referring provider node.

As an example, the graph data object may comprise referring provider nodes A, B, and C, and the computing entity may select the referring provider node A as the candidate referring provider node at step/operation 1503.

In some embodiments, at step/operation 1505, a computing entity (such as the network analysis computing entity 105 described above in connection with FIG. 1 and FIG. 2) may include means (such as the processing element 205 of the network analysis computing entity 105 described above in connection with FIG. 2) for determining whether the average-claim-line-per-member attribute of the candidate referring provider node is an outlier attribute among the plurality of average-claim-line-per-member attributes.

As described above in connection with at least FIG. 14 and FIG. 16, the computing entity may calculate a plurality of average-claim-line-per-member attributes for a plurality of referring provider nodes in the graph data object. Continuing from the above example, the computing entity may calculate a first average-claim-line-per-member attribute for the servicing provider node A, a second average-claim-line-per-member attribute for the referring provider node B, and a third average-claim-line-per-member attribute for the referring provider node C.

In this example, the computing entity may determine whether the first average-claim-line-per-member attribute (of the candidate referring provider node A selected at step/operation 1503) is an outlier attribute among the plurality of average-claim-line-per-member attributes (in other words, the first average-claim-line-per-member attribute, the second average-claim-line-per-member attribute, and the third average-claim-line-per-member attribute).

In some embodiments, the computing entity may determine whether the average-claim-line-per-member attribute of the candidate referring provider node is an outlier attribute based on one or more algorithms, including, but not limited to, Tukey's Fences algorithm.

Continuing from the above example, the computing entity may provide the first average-claim-line-per-member attribute, the second average-claim-line-per-member attribute, and the third average-claim-line-per-member attribute as inputs to the Tukey's Fences algorithm, and may determine whether the first average-claim-line-per-member attribute is an outlier among these attributes.

In some embodiments, at step/operation 1507, a computing entity (such as the network analysis computing entity 105 described above in connection with FIG. 1 and FIG. 2) may include means (such as the processing element 205 of the network analysis computing entity 105 described above in connection with FIG. 2) for determining whether the claim-line-count attribute of the candidate referring provider node is an outlier attribute among the plurality of claim-line-count attributes.

As described above in connection with at least FIG. 14 and FIG. 16, the computing entity may calculate a plurality of claim-line-count attributes for a plurality of referring provider nodes in the graph data object. Continuing from the above example, the computing entity may calculate a first claim-line-count attribute for the servicing provider node A, a second claim-line-count attribute for the referring provider node B, and a third claim-line-count attribute for the referring provider node C.

In this example, the computing entity may determine whether the first claim-line-count attribute (of the candidate referring provider node A selected at step/operation 1503) is an outlier attribute among the plurality of claim-line-count attributes (in other words, the first claim-line-count attribute, the second claim-line-count attribute, and the third claim-line-count attribute).

In some embodiments, the computing entity may determine whether the claim-line-count attribute of the candidate referring provider node is an outlier attribute based on one or more algorithms, including, but not limited to, Tukey's Fences algorithm.

Continuing from the above example, the computing entity may provide the first claim-line-count attribute, the second claim-line-count attribute, and the third claim-line-count attribute as inputs to the Tukey's Fences algorithm, and may determine whether the first claim-line-count attribute is an outlier among these attributes.

In some embodiments, at step/operation 1509, a computing entity (such as the network analysis computing entity 105 described above in connection with FIG. 1 and FIG. 2) may include means (such as the processing element 205 of the network analysis computing entity 105 described above in connection with FIG. 2) for determining whether serviced-member-percentage attribute of the candidate referring provider node is an outlier attribute among the plurality of serviced-member-percentage attributes.

As described above in connection with at least FIG. 14 and FIG. 17, the computing entity may calculate a plurality of serviced-member-percentage attributes for a plurality of referring provider nodes in the graph data object. Continuing from the above example, the computing entity may calculate a first serviced-member-percentage attribute for the servicing provider node A, a second serviced-member-percentage attribute for the referring provider node B, and a third serviced-member-percentage attribute for the referring provider node C.

In this example, the computing entity may determine whether the first serviced-member-percentage attribute (of the candidate referring provider node A selected at step/operation 1503) is an outlier attribute among the plurality of serviced-member-percentage attributes (in other words, the first serviced-member-percentage attribute, the second serviced-member-percentage attribute, and the third serviced-member-percentage attribute).

In some embodiments, the computing entity may determine whether the serviced-member-percentage attribute of the candidate referring provider node is an outlier attribute based on one or more algorithms, including, but not limited to, Tukey's Fences algorithm.

Continuing from the above example, the computing entity may provide the first serviced-member-percentage attribute, the second serviced-member-percentage attribute, and the third serviced-member-percentage attribute as inputs to the Tukey's Fences algorithm, and may determine whether the first serviced-member-percentage attribute is an outlier among these attributes.

In some embodiments, at step/operation 1511, a computing entity (such as the network analysis computing entity 105 described above in connection with FIG. 1 and FIG. 2) may include means (such as the processing element 205 of the network analysis computing entity 105 described above in connection with FIG. 2) for determining whether the average-distance attribute of the candidate referring provider node is an outlier attribute among the plurality of average-distance attributes.

As described above in connection with at least FIG. 14 and FIG. 18, the computing entity may calculate a plurality of average-distance attributes for a plurality of referring provider nodes in the graph data object. Continuing from the above example, the computing entity may calculate a first average-distance attribute for the servicing provider node A, a second average-distance attribute for the referring provider node B, and a third average-distance attribute for the referring provider node C.

In this example, the computing entity may determine whether the first average-distance attribute (of the candidate referring provider node A selected at step/operation 1503) is an outlier attribute among the plurality of average-distance attributes (in other words, the first average-distance attribute, the second average-distance attribute, and the third average-distance attribute).

In some embodiments, the computing entity may determine whether the average-distance attribute of the candidate referring provider node is an outlier attribute based on one or more algorithms, including, but not limited to, Tukey's Fences algorithm.

Continuing from the above example, the computing entity may provide the first average-distance attribute, the second average-distance attribute, and the third average-distance attribute as inputs to the Tukey's Fences algorithm, and may determine whether the first average-distance attribute is an outlier among these attributes.

In some embodiments, at step/operation 1513, a computing entity (such as the network analysis computing entity 105 described above in connection with FIG. 1 and FIG. 2) may include means (such as the processing element 205 of the network analysis computing entity 105 described above in connection with FIG. 2) for determining whether the member-entropy attribute of the candidate referring provider node is an outlier attribute among the plurality of member-entropy attributes.

As described above in connection with at least FIG. 14, the computing entity may calculate a plurality of member-entropy attributes for a plurality of referring provider nodes in the graph data object. Continuing from the above example, the computing entity may calculate a first member-entropy attribute for the servicing provider node A, a second member-entropy attribute for the referring provider node B, and a third member-entropy attribute for the referring provider node C.

In this example, the computing entity may determine whether the first member-entropy attribute (of the candidate referring provider node A selected at step/operation 1503) is an outlier attribute among the plurality of member-entropy attributes (in other words, the first member-entropy attribute, the second member-entropy attribute, and the third member-entropy attribute).

In some embodiments, the computing entity may determine whether the member-entropy attribute of the candidate referring provider node is an outlier attribute based on one or more algorithms, including, but not limited to, Tukey's Fences algorithm.

Continuing from the above example, the computing entity may provide the first member-entropy attribute, the second member-entropy attribute, and the third member-entropy attribute as inputs to the Tukey's Fences algorithm, and may determine whether the first member-entropy attribute is an outlier among these attributes.

In some embodiments, at step/operation 1515, a computing entity (such as the network analysis computing entity 105 described above in connection with FIG. 1 and FIG. 2) may include means (such as the processing element 205 of the network analysis computing entity 105 described above in connection with FIG. 2) for determining whether the servicing-provider-entropy attribute of the candidate referring provider node is an outlier attribute among the plurality of servicing-provider-entropy attributes.

As described above in connection with at least FIG. 14, the computing entity may calculate a plurality of servicing-provider-entropy attributes for a plurality of referring provider nodes in the graph data object. Continuing from the above example, the computing entity may calculate a first servicing-provider-entropy attribute for the servicing provider node A, a second servicing-provider-entropy attribute for the referring provider node B, and a third servicing-provider-entropy attribute for the referring provider node C.

In this example, the computing entity may determine whether the first servicing-provider-entropy attribute (of the candidate referring provider node A selected at step/operation 1503) is an outlier attribute among the plurality of servicing-provider-entropy attributes (in other words, the first servicing-provider-entropy attribute, the second servicing-provider-entropy attribute, and the third servicing-provider-entropy attribute).

In some embodiments, the computing entity may determine whether the servicing-provider-entropy attribute of the candidate referring provider node is an outlier attribute based on one or more algorithms, including, but not limited to, Tukey's Fences algorithm.

Continuing from the above example, the computing entity may provide the first servicing-provider-entropy attribute, the second servicing-provider-entropy attribute, and the third servicing-provider-entropy attribute as inputs to the Tukey's Fences algorithm, and may determine whether the first servicing-provider-entropy attribute is an outlier among these attributes.

In different embodiments, one or more of the step/operation 1505, step/operation 1507, step/operation 1509, step/operation 1511, step/operation 1513, and/or step/operation 1515 may be performed in different sequences. In some embodiments, one or more of the step/operation 1505, step/operation 1507, step/operation 1509, step/operation 1511, step/operation 1513, and/or step/operation 1515 may be performed concurrently, e.g., using one or more parallel processing techniques and/or using one or more distributed processing techniques.

Referring back to FIG. 15A, subsequent to step/operation 1505, step/operation 1507, step/operation 1509, step/operation 1511, step/operation 1513, and/or step/operation 1515, the example method 1500 proceeds to step/operation 1517. At step/operation 1517, a computing entity (such as the network analysis computing entity 105 described above in connection with FIG. 1 and FIG. 2) may include means (such as the processing element 205 of the network analysis computing entity 105 described above in connection with FIG. 2) for determining whether at least three of the outlier-detection-based conditions associated with the candidate referring provider node are true.

In some embodiments, conditions associated with the candidate referring provider node may be whether the candidate referring provider node is associated with one or more outlier attributes, as determined by, for example but not limited to, step/operation 1505, step/operation 1507, step/operation 1509, step/operation 1511, step/operation 1513, and/or step/operation 1515. For example, if one of the attributes of the candidate referring provider node is determined to be an outlier attribute, the computing entity may determine that the corresponding condition associated with the candidate referring provider node is true. If one of the attributes of the member node is determined to not be an outlier attribute, the computing entity may determine that the corresponding condition associated with the candidate referring provider node is not true.

In other words, the computing entity determines whether at least three conditions of a group of conditions are satisfied—the group of conditions comprising: (1) a first condition requiring that the average-claim-line-per-member attribute being the outlier attribute among the plurality of average-claim-line-per-member attributes, (2) a second condition requiring that the claim-line-count attribute being the outlier attribute among the plurality of claim-line-count attributes, (3) a third condition requiring that the serviced-member-percentage attribute being the outlier attribute among the plurality of serviced-member-percentage attributes, (4) a fourth condition requiring that the average-distance attribute being the outlier attribute among the plurality of average-distance attributes, (5) a fifth condition requiring that the member-entropy attribute being the outlier attribute among the plurality of member-entropy attributes, and (6) a sixth condition requiring that the servicing-provider-entropy attribute being the outlier attribute among the plurality of servicing-provider-entropy attributes.

Continuing from the example above, if the computing entity determine that at least three of the average-claim-line-per-member attribute (determined at step/operation 1505), the claim-line-count attribute (determined at step/operation 1507), the serviced-member-percentage attribute (determined at step/operation 1509), the average-distance attribute (determined at step/operation 1511), the member-entropy attribute (determined at step/operation 1513) and/or the servicing-provider-entropy attribute (determined at step/operation 1515) associated with the candidate referring provider node are determined to be outlier attributes, the computing entity determines that at least three conditions are true at step/operation 1517. If the computing entity determine that only one or two of the average-claim-line-per-member attribute, the claim-line-count attribute, the serviced-member-percentage attribute, the average-distance attribute, the member-entropy attribute and/or the servicing-provider-entropy attribute are determined to be an outlier attribute, the computing entity determines that less than three conditions are true.

If, at step/operation 1517, the computing entity determines that less than three conditions associated with the candidate referring provider node are true, the example method 1500 proceeds to step/operation 1519. At step/operation 1519, a computing entity (such as the network analysis computing entity 105 described above in connection with FIG. 1 and FIG. 2) may include means (such as the processing element 205 of the network analysis computing entity 105 described above in connection with FIG. 2) for determining that the referring provider node is not an irregular referring provider node.

Figure 15B:
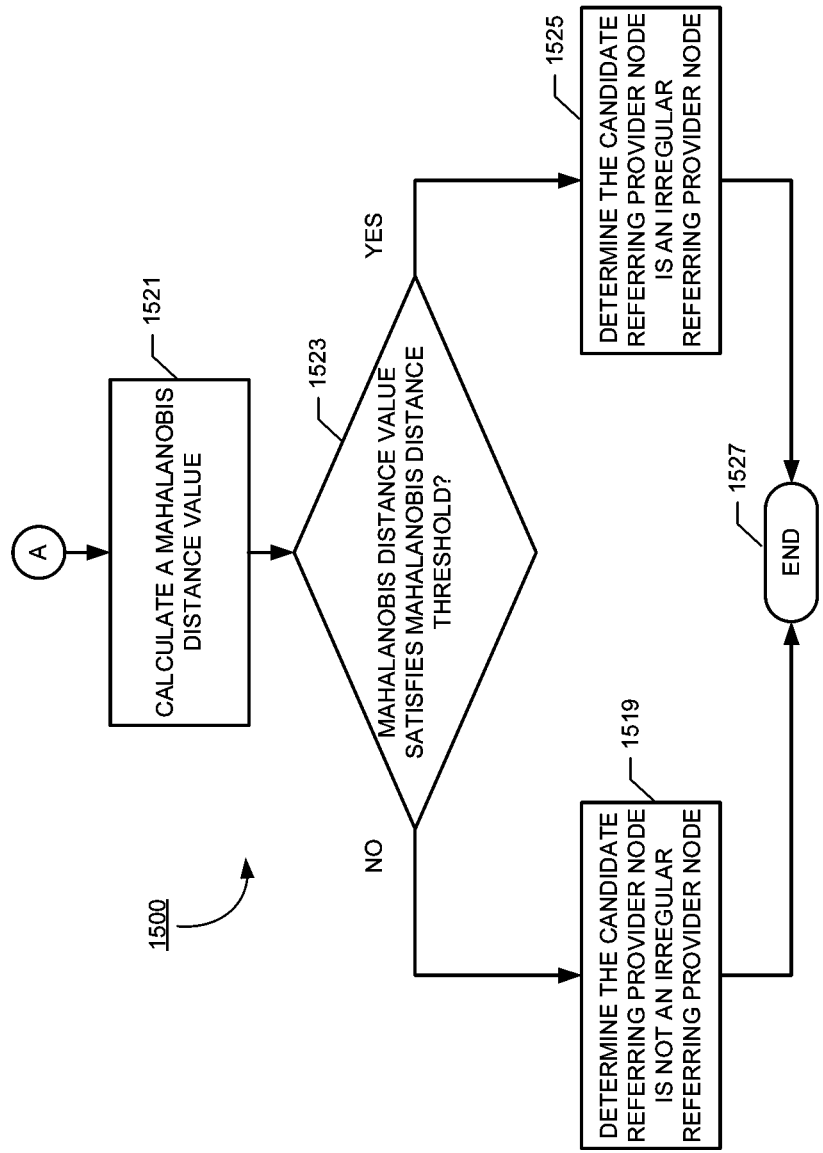

If, at step/operation 1517, the computing entity determines that at least three conditions associated with the candidate referring provider node are true, the method 1500 proceeds to block A, which connects FIG. 15A to FIG. 15B. Referring now to FIG. 15B, subsequent to block A (e.g. subsequent to determining that at least three outlier-detection-based conditions associated with the candidate referring provider node are true), the example method 1500 proceeds to step/operation 1521. At step/operation 1521, a computing entity (such as the network analysis computing entity 105 described above in connection with FIG. 1 and FIG. 2) may include means (such as the processing element 205 of the network analysis computing entity 105 described above in connection with FIG. 2) for calculating a Mahalanobis distance value for the candidate referring provider node.

As described above, the Mahalanobis distance value is a statistical measure of the extent to which attributes of a node are multivariate outliers. In some embodiments, the computing entity may calculate the Mahalanobis distance value based on the average-claim-line-per-member attribute, the claim-line-count attribute, the serviced-member-percentage attribute, the average-distance attribute, the member-entropy attribute, and the servicing-provider-entropy attribute.

Continuing from the example above, the computing entity may provide the average-claim-line-per-member attribute, the claim-line-count attribute, the serviced-member-percentage attribute, the average-distance attribute, the member-entropy attribute, and the servicing-provider-entropy attribute of the candidate referring provider node A as inputs to a Mahalanobis distance algorithm, and the Mahalanobis distance algorithm may generate an output that is the Mahalanobis distance value for the referring provider node A.

While the description above provides an example based on a Mahalanobis distance algorithm, it is noted that the scope of the present disclosure is not limited to the description above. In some examples, one or more distance based formulas or algorithms in addition to the Mahalanobis distance algorithm, or in alternative of the Mahalanobis distance algorithm, may be implemented, including, but not limited to, an Euclidean distance formula.

Subsequent to step/operation 1521, the example method 1500 proceeds to step/operation 1523. At step/operation 1523, a computing entity (such as the network analysis computing entity 105 described above in connection with FIG. 1 and FIG. 2) may include means (such as the processing element 205 of the network analysis computing entity 105 described above in connection with FIG. 2) for determining whether the Mahalanobis distance value calculated at step/operation 1521 satisfies a Mahalanobis distance threshold.

In some embodiments, the Mahalanobis distance threshold is two standard deviations from the mean Mahalanobis distance across all referring provider nodes. For example, if the Mahalanobis distance value calculated at step/operation 1523 is more than two standard deviations from the mean Mahalanobis distance across all referring provider nodes, the computing entity determines that the Mahalanobis distance value satisfies the Mahalanobis distance threshold. If the Mahalanobis distance value calculated at step/operation 1523 is not more than two standard deviations from the mean Mahalanobis distance across all referring provider nodes, the computing entity determines that the Mahalanobis distance value does not satisfy the Mahalanobis distance threshold.

In some embodiments, the Mahalanobis distance threshold may be determined based on statistical measures other than two standard deviations from the mean Mahalanobis distance across all referring provider nodes.

If, at step/operation 1523, the computing entity determines that the Mahalanobis distance value does not satisfy the Mahalanobis distance threshold, the example method 1500 proceeds to step/operation 1519. At step/operation 1519, a computing entity (such as the network analysis computing entity 105 described above in connection with FIG. 1 and FIG. 2) may include means (such as the processing element 205 of the network analysis computing entity 105 described above in connection with FIG. 2) for determining that the candidate referring provider node is not an irregular referring provider node.

Subsequent to step/operation 1519, the example method 1500 ends at step/operation 1527.

If, at step/operation 1523, the computing entity determines that the Mahalanobis distance value satisfies the Mahalanobis distance threshold, the example method 1500 proceeds to step/operation 1525. At step/operation 1525, a computing entity (such as the network analysis computing entity 105 described above in connection with FIG. 1 and FIG. 2) may include means (such as the processing element 205 of the network analysis computing entity 105 described above in connection with FIG. 2) for determining that the candidate referring provider node is an irregular referring provider node.

As such, in accordance with various embodiments of the present disclosure, the computing entity may identify that a candidate referring provider node is an irregular referring provider node in response to determining that: the Mahalanobis distance value satisfies a Mahalanobis distance threshold, and at least three of (1) the average-claim-line-per-member attribute being an outlier attribute, (2) the claim-line-count attribute being an outlier attribute, (3) the serviced-member-percentage attribute being an outlier attribute, (4) the average-distance attribute being an outlier attribute, (5) the member-entropy attribute being an outlier attribute, or (6) the servicing-provider-entropy attribute being an outlier attribute are true.

As described above, an irregular referring provider node may correspond to a referring provider that may be suspicious of or associated with healthcare fraud.

Subsequent to step/operation 1525, the example method 1500 ends at step/operation 1527.

i. Exemplary Operations for Identification of Irregular Servicing Provider Nodes In various embodiments of the present disclosure, a computing entity (such as the network analysis computing entity 105 described above in connection with FIG. 1 and FIG. 2) may implement various processing techniques to identify irregular servicing provider nodes. Referring now to FIG. 19A, FIG. 19B, FIG. 20, and FIG. 21, various examples associated with identifying irregular servicing provider nodes are illustrated.

Figure 19A:
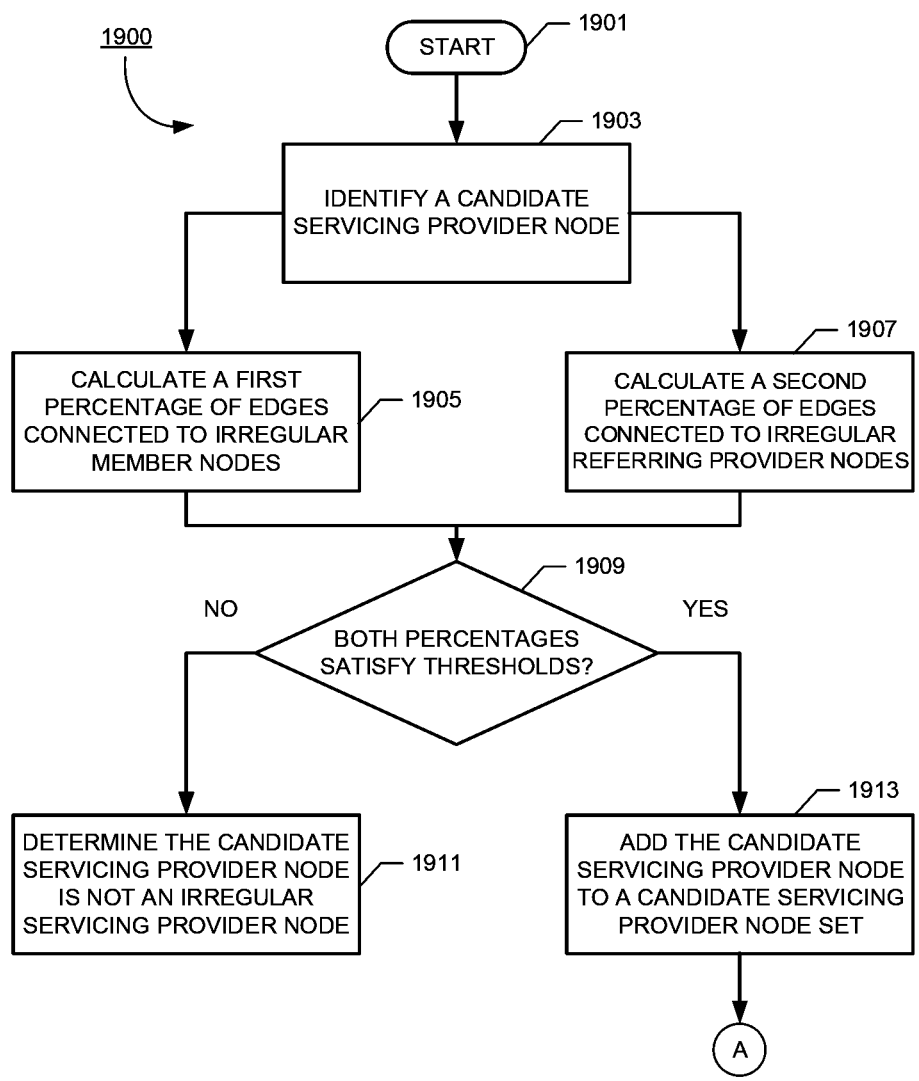
Figure 19B:
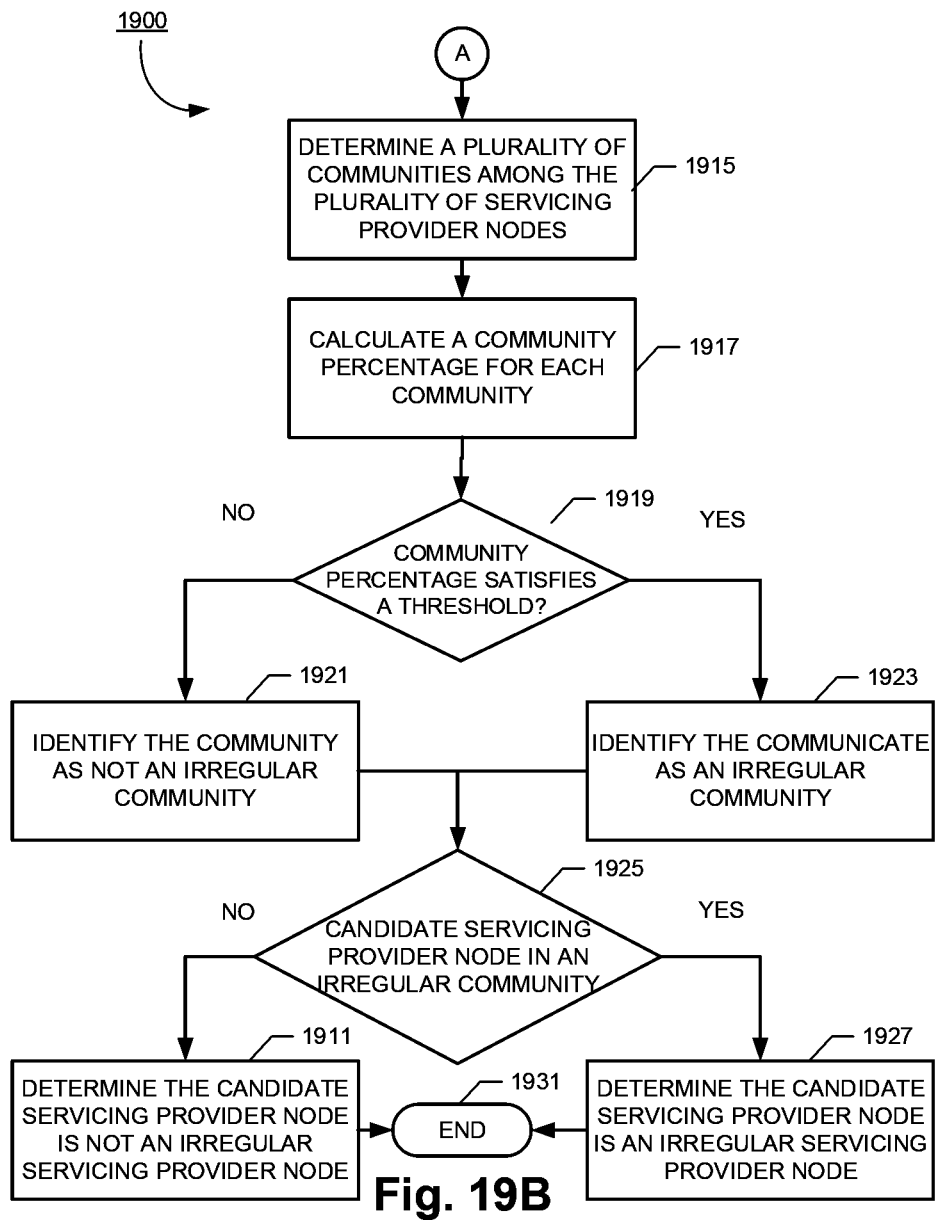

Referring now to FIG. 19A and FIG. 19B, an example method 1900 illustrates example identification of irregular servicing provider nodes in accordance with embodiments of the present disclosure.

Referring now to FIG. 19A, the example method 1900 starts at step/operation 1901.

At step/operation 1903, a computing entity (such as the network analysis computing entity 105 described above in connection with FIG. 1 and FIG. 2) may include means (such as the processing element 205 of the network analysis computing entity 105 described above in connection with FIG. 2) for identifying a candidate servicing provider node from the plurality of servicing provider nodes.

In some embodiments, the computing entity may select a servicing provider node from the plurality of servicing provider nodes of a graph data object that is generated in accordance with embodiments of the present disclosure. In some embodiments, the computing entity may traverse all servicing provider nodes in the graph data object, and may perform the example method 1900 on each servicing provider node to determine whether it is an irregular servicing provider node.

In some embodiments, subsequent to step/operation 1903, the example method 1900 proceeds to step/operation 1905. At step/operation 1905, a computing entity (such as the network analysis computing entity 105 described above in connection with FIG. 1 and FIG. 2) may include means (such as the processing element 205 of the network analysis computing entity 105 described above in connection with FIG. 2) for calculating a first percentage of the number of edges connecting the irregular member nodes to the candidate servicing provider node and the number of edges connecting all of the plurality of member nodes to the candidate servicing provider node.

For example, the computing entity may identify one or more irregular member nodes based at least on the example method 1000 described above in connection with at least FIG. 10A and FIG. 10B. The computing entity may calculate the number of irregular member node(s) connected to the candidate servicing provider node as a percentage of the number of all member node(s) connected to the candidate servicing provider node.

Figure 20:
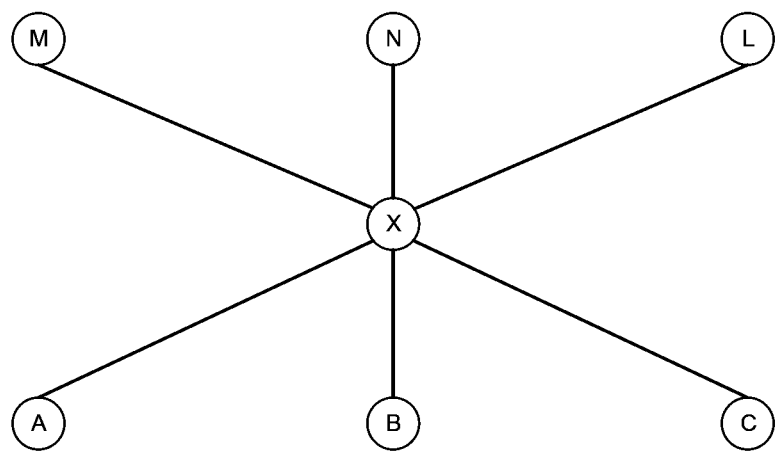

For example, referring now to FIG. 20, the candidate servicing provider node X may be connected to three member nodes M, N, and L. The computing entity may determine that the member nodes M and N are irregular member nodes. The computing entity may calculate the first percentage for the candidate servicing provider node as 2/3.

Referring back to FIG. 19A, in some embodiments, subsequent to step/operation 1903, the example method 1900 proceeds to step/operation 1907. At step/operation 1907, a computing entity (such as the network analysis computing entity 105 described above in connection with FIG. 1 and FIG. 2) may include means (such as the processing element 205 of the network analysis computing entity 105 described above in connection with FIG. 2) for calculating a second percentage of the number of edges connecting the irregular referring provider nodes to the candidate servicing provider node and the number of edges connecting the plurality of referring provider nodes to the candidate servicing provider node.

For example, the computing entity may identify one or more irregular referring provider nodes based at least on the example method 1500 described above in connection with at least FIG. 15A and FIG. 15B. The computing entity may calculate the number of irregular referring provider node(s) connected to the candidate servicing provider node as a percentage of the number of all referring provider node(s) connected to the candidate servicing provider node.

For example, referring now to FIG. 20, the candidate servicing provider node X may be connected to three referring provider nodes A, B, and C. The computing entity may determine that only the referring provider node A is an irregular member node. The computing entity may calculate the second percentage for the candidate servicing provider node as 1/3.

Referring back to FIG. 19A, in some embodiments, the step/operation 1905 may be performed prior to the step/operation 1907. In some embodiments, the step/operation 1905 may be performed subsequent to the step/operation 1907. In some embodiments, the step/operation 1905 may be performed concurrently with the step/operation 1907, e.g., using one or more parallel processing techniques and/or one or more distributed processing techniques.

Subsequent to step/operation 1905 and/or step/operation 1907, the example method 1900 proceeds to step/operation 1909. At step/operation 1909, a computing entity (such as the network analysis computing entity 105 described above in connection with FIG. 1 and FIG. 2) may include means (such as the processing element 205 of the network analysis computing entity 105 described above in connection with FIG. 2) for determining whether both the first percentage and the second percentage satisfy their corresponding thresholds.

For example, the computing entity may set the threshold at 20% for both the first percentage and the second percentage. If both the first percentage and the second percentage are more than 20%, the computing entity may determine that both the first percentage and the second percentage satisfy their thresholds. If one of the first percentage or the second percentage is not more than 20%, the computing entity may determine that not all of the first percentage and the second percentage satisfy their thresholds.

In some embodiments, the computing entity may set different values for the threshold for the first percentage and the second percentage. In some embodiments, the threshold value may be less than or more than 20%. In some embodiments, the computing entity may set at least one of the first percentage thresholds and the second percentage thresholds using a threshold determination machine learning models.

If, at step/operation 1909, the computing entity determines that at least one of the first percentage or the second percentage does not satisfy the corresponding threshold(s), the example method 1900 proceeds to step/operation 1911. At step/operation 1911, a computing entity (such as the network analysis computing entity 105 described above in connection with FIG. 1 and FIG. 2) may include means (such as the processing element 205 of the network analysis computing entity 105 described above in connection with FIG. 2) for determining that the candidate servicing provider node is not an irregular servicing provider node.

For example, if one or both of the first percentage or the second percentage is less than 20%, the computing entity may determine that the candidate servicing provider node is not an irregular servicing provider node.

If, at step/operation 1909, the computing entity determines that both the first percentage and the second percentage satisfy their corresponding thresholds, the example method 1900 proceeds to step/operation 1913. At step/operation 1913, a computing entity (such as the network analysis computing entity 105 described above in connection with FIG. 1 and FIG. 2) may include means (such as the processing element 205 of the network analysis computing entity 105 described above in connection with FIG. 2) for adding the candidate servicing provider node to a candidate servicing provider node set.

For example, if both the first percentage and the second percentage are more than 20%, the computing entity may determine that the candidate servicing provider node is an irregular servicing provider node. As described above, the computing entity may traverse each servicing provider node in the graph data object, may collect all the servicing provider nodes whose first percentage and second percentage satisfy the threshold, and may group them into a candidate servicing provider node set.

As described above, aspects of the step/operations 1905, 1907, and 1909 implement an ego-net approach to identify potentially irregular servicing provider node that correspond to suspicious servicing providers, as a servicing provider may be deemed suspicious if the servicing provider is connected to a high percentage of suspicious members and a high percentage of suspicious referring providers.

In some embodiments, the computing entity may use the candidate servicing provider node set to determine a plurality of irregular communities among the plurality of servicing provider nodes, details of which are described herein.

Referring back to FIG. 19A, subsequent to step/operation 1913, the example method 1900 proceeds to block A, which connects FIG. 19A to FIG. 19B. In particular, FIG. 19B illustrates example steps/operations associated with determining a plurality of irregular communities among the plurality of servicing provider nodes.

Referring now to FIG. 19B, subsequent to block A (e.g. subsequent to determining that both the first percentage and the second percentage satisfy their corresponding thresholds), the example method 1900 proceeds to step/operation 1915. At step/operation 1915, a computing entity (such as the network analysis computing entity 105 described above in connection with FIG. 1 and FIG. 2) may include means (such as the processing element 205 of the network analysis computing entity 105 described above in connection with FIG. 2) for determining a plurality of communities among the plurality of servicing provider nodes and/or the plurality of referring provider nodes.

In some embodiments, the computing entity may separately implement, for example but not limited to, Louvain Community Detection algorithm and the Label Propagation algorithm to identify communities of servicing provider nodes and/or referring provider nodes. For example, the computing entity may assign each servicing provider node and/or each referring provider node with a Louvain Community identifier based on the community identified by the Louvain Community Detection algorithm. The computing entity may assign each servicing provider node and/or each referring provider node with a Label Propagation Community identifier based on the community identified by the Label Propagation algorithm.

Figure 21:
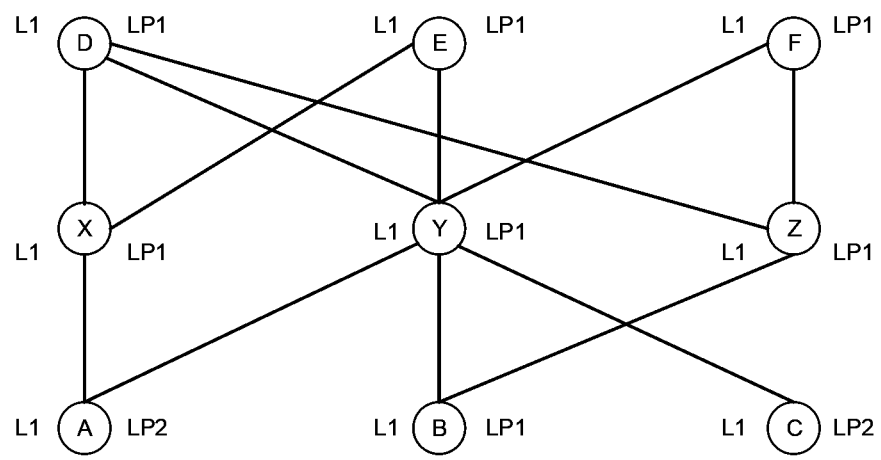

In the example shown in FIG. 21, the referring provider nodes A, B, C, D, E, and F, as well as the servicing provider nodes X, Y, and Z, are all assigned to the Louvain Community identifier L1. In other words, they are all part of Louvain Community L1. However, the referring provider nodes A and C are assigned to the Label Propagation Community identifier LP2, while the referring provider nodes B, D, E, and F, as well as the servicing provider nodes X, Y, and Z, are assigned to the Label Propagation Community identifier LP1. In other words, the referring provider nodes A and C are part of Label Propagation Community LP2 and the referring provider nodes B, D, E, and F, as well as the servicing provider nodes X, Y, and Z, are part of Label Propagation Community LP1. In some embodiments, the computing entity may concatenate the community identifiers based on the overlap between the Louvain Community and the Label Propagation Community. For example, as the referring provider nodes B, D, E, and F, as well as the servicing provider nodes X, Y, and Z, are all part of the same Louvain Community and the same Label Propagation Community, the computing entity may determine a community L1-LP1 that comprises the referring provider nodes B, D, E, and F, as well as the servicing provider nodes X, Y, and Z.

In some embodiments, the computing entity may exclude a community from subsequent steps/operations if there is only one servicing provider node in the community. For example, if there is only one servicing provider node in the community, the computing entity may determine that such community is not an irregular community (which is described in detail herein).

While the description above provides examples of implementing Louvain Community Detection algorithm and Label Propagation algorithm, it is noted that the scope of the present disclosure is not limited to the description above. In some embodiments, one or more other community identification algorithms and/or formulas may be implemented in addition to or in alternative of the Louvain Community Detection algorithm and/or the Label Propagation algorithm.

Referring back to FIG. 19B, subsequent to step/operation 1915, the example method 1900 proceeds to step/operation 1917. At step/operation 1917, a computing entity (such as the network analysis computing entity 105 described above in connection with FIG. 1 and FIG. 2) may include means (such as the processing element 205 of the network analysis computing entity 105 described above in connection with FIG. 2) for calculating a community percentage for each community based on a ratio of the number of irregular referring provider nodes to the number of total referring provider nodes in each community.

In the example shown in FIG. 21, the community L1-LP1 may comprise one irregular referring provider node D, and the referring provider nodes B, E, and F are not irregular referring provider node. In this example, the computing entity may calculate the community percentage as ¼ or 25%.

Referring back to FIG. 19B, subsequent to step/operation 1917, the example method 1900 proceeds to step/operation 1919. At step/operation 1919, a computing entity (such as the network analysis computing entity 105 described above in connection with FIG. 1 and FIG. 2) may include means (such as the processing element 205 of the network analysis computing entity 105 described above in connection with FIG. 2) for determining whether the community percentage calculated at step/operation 1917 satisfies a community percentage threshold.

For example, the computing entity may set the threshold at 20% for the community percentage. If the community percentage is more than 20%, the computing entity may determine that the community percentage satisfies the threshold. If the community percentage is not more than 20%, the computing entity may determine that the community percentage does not satisfy the threshold.

If, at step/operation 1919, the computing entity determines that the community percentage calculated at step/operation 1917 does not satisfy the threshold, the method 1900 proceeds to step/operation 1921. At step/operation 1921, a computing entity (such as the network analysis computing entity 105 described above in connection with FIG. 1 and FIG. 2) may include means (such as the processing element 205 of the network analysis computing entity 105 described above in connection with FIG. 2) for identifying the community as not an irregular community.

Continuing from the example above, if the community percentage for the Community L1-LP1 is 15%, and the threshold is 20%, the computing entity may determine that the Community L1-LP1 is not an irregular community.

If, at step/operation 1919, the computing entity determines that the community percentage calculated at step/operation 1917 satisfies the threshold, the method 1900 proceeds to step/operation 1923. At step/operation 1923, a computing entity (such as the network analysis computing entity 105 described above in connection with FIG. 1 and FIG. 2) may include means (such as the processing element 205 of the network analysis computing entity 105 described above in connection with FIG. 2) for identifying the communicate as an irregular community.

Continuing from the example above, if the community percentage for the Community L1-LP1 is 25%, and the threshold is 20%, the computing entity may determine that the Community L1-LP1 is an irregular community.

In some embodiments, the computing entity may traverse nodes in the graph data object to identify various communities, may determine all communities whose community percentage satisfies the threshold, and may group them into an irregular community set.

Subsequent to step/operation 1921 and/or step/operation 1923, the example method 1900 proceeds to step/operation 1925. At step/operation 1925, a computing entity (such as the network analysis computing entity 105 described above in connection with FIG. 1 and FIG. 2) may include means (such as the processing element 205 of the network analysis computing entity 105 described above in connection with FIG. 2) for determining whether the candidate servicing provider is in an irregular community.

As described above in connection with at least step/operation 1909 and step/operation 1913, the candidate servicing provider node is determined to be part of the candidate servicing provider node set. As described above in connection with the at least step/operation 1915, step/operation 1917, step/operation 1919, step/operation 1921, and step/operation 1923, the computing entity has identified an irregular community set. At step/operation 1925, the computing entity determines whether the candidate servicing provider node is part of an irregular community in the irregular community set.

If, at step/operation 1925, the computing entity determines that the candidate servicing provider is not in an irregular community, the example method 1900 proceeds to step/operation 1911. At step/operation 1911, a computing entity (such as the network analysis computing entity 105 described above in connection with FIG. 1 and FIG. 2) may include means (such as the processing element 205 of the network analysis computing entity 105 described above in connection with FIG. 2) for determining the candidate servicing provider node is not an irregular servicing provider node.

Continuing from the example above, if the candidate servicing provider node X is not part of any irregular community, the computing entity may determine that the candidate servicing provider node X is not an irregular servicing provider node.

Subsequent to step/operation 1911, the example method 1900 ends at step/operation 1931.

If, at step/operation 1925, the computing entity determines that the candidate servicing provider is in an irregular community, the example method 1900 proceeds to step/operation 1927. At step/operation 1927, a computing entity (such as the network analysis computing entity 105 described above in connection with FIG. 1 and FIG. 2) may include means (such as the processing element 205 of the network analysis computing entity 105 described above in connection with FIG. 2) for determining the candidate servicing provider node is an irregular servicing provider node.

Continuing from the example above, if the candidate servicing provider node X is part of an irregular community L1-LP1, the computing entity may determine that the candidate servicing provider node X is an irregular servicing provider node.

As such, in accordance with various examples of the present disclosure, the computing entity may determine whether the candidate servicing provider node is at least one of the at least one irregular servicing provider node based at least in part on the first percentage, the second percentage, and the plurality of irregular communities (e.g. the irregular community set). For example, in some embodiments, if the candidate servicing provider node is both (1) a servicing provider node in the candidate servicing provider node set based on the first percentage and the second percentage; and (2) within an irregular community from the plurality of irregular communities, the computing entity determines that the candidate servicing provider node is an irregular servicing provider node. As described above, an irregular servicing provider node may correspond to a servicing provider that may be suspicious of or associated with healthcare fraud.

Subsequent to step/operation 1927, the example method 1900 ends at step/operation 1931.

VI. Conclusion

Many modifications and other embodiments of the disclosure set forth herein will come to mind to one skilled in the art to which this disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising one or more processors and at least one memory storing processor executable instructions that, when executed by the one or more processors, cause the one or more processors to perform operations comprising:
receiving, from a database and based at least in part on input metadata of at least one input data object of a plurality of input data objects, a scheme data object that comprises scheme metadata;
generating a tabular data object based at least in part on the plurality of input data objects and the scheme metadata;
generating a graph data object based at least in part on the tabular data object, wherein:
(i) the graph data object comprises (a) a plurality of nodes and a plurality of node attributes for the plurality of nodes and (b) a plurality of edges and plurality of edge attributes for the plurality of edges,
(ii) the plurality of node attributes and the plurality of edge attributes represent one or more behavioral utilization aspects of a triangular relationship that is (a) among one or more of a plurality of referring provider nodes, one or more of a plurality of servicing provider nodes, and one or more of a plurality of member nodes, and (b) with respect to a fraud scheme corresponding to the scheme data object,
(iii) the plurality of nodes comprises
(a) the plurality of member nodes,
(b) the plurality of referring provider nodes, and
(c) the plurality of servicing provider nodes,
(iv) each edge of the plurality of edges connects two of the plurality of nodes;
(v) one or more columns of the tabular data object are used to identify one or more of the plurality of nodes; and
(vi) the plurality of edges is based at least in part on a plurality of tabular correlations indicated by the tabular data object;
generating a reduced search space for a second stage of processing the graph data object by, in a first stage of processing the graph data object:
identifying, using a first traversal of the graph data object, one or more member nodes of the plurality of member nodes as one or more irregular member nodes based at least in part on detecting, during the first traversal, that the one or more member nodes comprise a first outlier attribute relative to at least one of the plurality of node attributes or the plurality of edge attributes; and
identifying, using a second traversal of the graph data object, one or more referring provider nodes of the plurality of referring provider nodes as one or more irregular referring provider nodes based at least in part on detecting, during the second traversal, that the one or more referring provider nodes comprise at least a second outlier attribute relative to at least one of the plurality of node attributes or the plurality of edge attributes;
in the second stage of processing the graph data object, selectively processing the graph data object within the reduced search space by:
identifying, using a third traversal of the graph data object, a servicing provider node of the plurality of servicing provider nodes as an irregular servicing provider node based at least in part on (i) the one or more irregular member nodes identified in the first traversal connected to the servicing provider node and (ii) the one or more irregular referring provider nodes identified in the second traversal; and
generating a prediction output user interface configured to depict one or more of the one or more irregular member nodes, the one or more irregular referring provider nodes, or the irregular servicing provider node.

2. The system of claim 1, wherein the operations further comprise, prior to retrieving the scheme data object:
receiving webpage data objects comprising webpage metadata, wherein the webpage data objects are dynamically generated based on systematic browsing of webpage data;
generating the scheme data object by:
performing natural language processing on the webpage metadata to generate the scheme metadata; and
compiling the scheme metadata into the scheme data object; and
storing the scheme data object in the database.

3. The system of claim 1, wherein each input data object of the plurality of input data objects comprises input metadata, and wherein the operations further comprise generating the tabular data object based at least in part on:
selecting a first subset of input data objects from the plurality of input data objects, wherein at least one input metadata field of the input metadata of each input data object in the first subset of input data objects matches a corresponding scheme metadata field of the scheme metadata of the scheme data object.

4. The system of claim 3, wherein the operations further comprise generating the tabular data object based at least in part on:
generating the tabular data object based at least in part on the first subset of input data objects, wherein the tabular data object indicates a plurality of tabular correlations among the input metadata of the first subset of input data objects.

5. The system of claim 3, wherein the operations further comprise:
selecting a second subset of input data objects from the plurality of input data objects, wherein an input actor metadata field of the input metadata of each input data object in the second subset of input data objects matches the input actor metadata field of the input metadata of at least one input data object in the first subset of input data objects; and
generating the tabular data object based at least in part on the second subset of input data objects, wherein the tabular data object indicates a plurality of tabular correlations among the input metadata of the second subset of input data objects.

6. The system of claim 1, wherein the operations further comprise generating the graph data object based at least in part on:
generating the plurality of member nodes based at least in part on a first subset of input actor metadata of the plurality of input data objects indicating a plurality of members;

generating the plurality of referring provider nodes based at least in part on a second subset of input actor metadata of the plurality of input data objects indicating a plurality of referring providers; and generating the plurality of servicing provider nodes based at least in part on a third subset of input actor metadata of the plurality of input data objects indicating a plurality of servicing providers.

7. The system of claim 6, wherein the operations further comprise generating the plurality of node attributes and the plurality of edge attributes based at least in part on:

for the plurality of member nodes, generating (i) a plurality of claim-line-count attributes, (ii) a plurality of serviced-by-referring-provider-percentage attributes, and (iii) a plurality of average-distance attributes.

8. The system of claim 7, wherein the operations further comprise identifying the one or more irregular member nodes based at least in part on:

selecting a member node from the plurality of member nodes;

determining whether a claim-line-count attribute of the member node is an outlier attribute among the plurality of claim-line-count attributes;

determining whether a serviced-by-referring-provider-percentage attribute of the member node is an outlier attribute among the plurality of serviced-by-referring-provider-percentage attributes; and determining whether an average-distance attribute of the member node is an outlier attribute among the plurality of average-distance attributes.

9. The system of claim 8, wherein the operations further comprise identifying the one or more irregular member nodes based at least in part on:

generating a Mahalanobis distance value based at least in part on the claim-line-count attribute, the serviced-by-referring-provider-percentage attribute, and the average-distance attribute.

10. The system of claim 9, wherein the operations further comprise:

identifying the member node as one of the one or more irregular member nodes in response to determining that:

the Mahalanobis distance value satisfies a Mahalanobis distance threshold, and at least two conditions of a group of conditions are satisfied, the group of conditions comprising: (1) a first condition requiring that the claim-line-count attribute be the outlier attribute among the plurality of claim-line-count attributes, (2) a second condition requiring that the serviced-by-referring-provider-percentage attribute be the outlier attribute among the plurality of serviced-by-referring-provider-percentage attributes, or (3) a third condition requiring that the average-distance attribute be the outlier attribute among the plurality of average-distance attributes.

11. The system of claim 6, wherein the operations further comprise generating the plurality of node attributes and the plurality of edge attributes based at least in part on:

for the plurality of referring provider nodes, generating (i) a plurality of average-claim-line-per-member attributes, (ii) a plurality of claim-line-count attributes, (iii) a plurality of serviced-member-percentage attributes, (iv) a plurality of average-distance attributes, (v) a plurality of member-entropy attributes, and (vi) a plurality of servicing-provider-entropy attributes.

12. The system of claim 11, wherein the operations further comprise identifying the one or more irregular referring provider nodes based at least in part on:

selecting a referring provider node from the plurality of referring provider nodes;

determining whether an average-claim-line-per-member attribute of the referring provider node is an outlier attribute among the plurality of average-claim-line-per-member attributes;

determining whether a claim-line-count attribute of the referring provider node is an outlier attribute among the plurality of claim-line-count attributes;

determining whether a serviced-member-percentage attribute of the referring provider node is an outlier attribute among the plurality of serviced-member-percentage attributes;

determining whether an average-distance attribute of the referring provider node is an outlier attribute among the plurality of average-distance attributes;

determining whether a member-entropy attribute of the referring provider node is an outlier attribute among the plurality of member-entropy attributes; and determining whether a servicing-provider-entropy attribute of the referring provider node is an outlier attribute among the plurality of servicing-provider-entropy attributes.

13. The system of claim 12, wherein the operations further comprise identifying the one or more irregular referring provider nodes based at least in part on:

generating a Mahalanobis distance value based at least in part on the average-claim-line- per-member attribute, the claim-line-count attribute, the serviced-member-percentage attribute, the average-distance attribute, the member-entropy attribute, and the servicing-provider-entropy attribute.

14. The system of claim 13, wherein the further comprise:

identifying the referring provider node as one of the one or more irregular referring provider nodes in response to determining that:

the Mahalanobis distance value satisfies a Mahalanobis distance threshold, and at least three conditions of a group of conditions are satisfied, the group of conditions comprising: (1) a first condition requiring that the average-claim-line-per-member attribute be the outlier attribute among the plurality of average-claim-line-per-member attributes, (2) a second condition requiring that the claim-line-count attribute be the outlier attribute among the plurality of claim-line-count attributes, (3) a third condition requiring that the serviced-member-percentage attribute being the outlier attribute among the plurality of serviced-member-percentage attributes, (4) a fourth condition requiring that the average-distance attribute be the outlier attribute among the plurality of average- distance attributes, (5) a fifth condition requiring that the member-entropy attribute be the outlier attribute among the plurality of member-entropy attributes, or (6) a sixth condition requiring that the servicing-provider-entropy attribute be the outlier attribute among the plurality of servicing-provider-entropy attributes.

15. The system of claim 1, wherein the operations further comprise identifying the irregular servicing provider node based at least in part on:

identifying the servicing provider node from the plurality of servicing provider nodes;

generating a first percentage based at least in part on a first number of edges connecting the one or more irregular member nodes to the servicing provider node and a second number of edges connecting the plurality of member nodes to the servicing provider node;

generating a second percentage based at least in part on a third number of edges connecting the one or more irregular referring provider nodes to the servicing provider node and a fourth number of edges connecting the plurality of referring provider nodes to the servicing provider node;

determining a plurality of irregular communities among the plurality of servicing provider nodes; and determining whether the servicing provider node is the irregular servicing provider node based at least in part on the first percentage, the second percentage, and the plurality of irregular communities.

16. A computer-implemented method comprising:

receiving, by one or more processors, from a database and based at least in part on input metadata of at least one input data object of a plurality of input data objects, a scheme data object that comprises scheme metadata;

generating, by the one or more processors, a tabular data object based at least in part on the plurality of input data objects and the scheme metadata;

generating, by the one or more processors, a graph data object based at least in part on the tabular data object, wherein (i) the graph data object comprises (a) a plurality of nodes and a plurality of node attributes for the plurality of nodes and (b) a plurality of edges and plurality of edge attributes for the plurality of edges, (ii) the plurality of node attributes and the plurality of edge attributes represent one or more behavioral utilization aspects of a triangular relationship that is (a) among one or more of a plurality of referring provider nodes, one or more of a plurality of servicing provider nodes, and one or more of a plurality of member nodes, and (b) with respect to a fraud scheme corresponding to the scheme data object, (iii) the plurality of nodes comprises
  (a) the plurality of member nodes,
  (b) the plurality of referring provider nodes, and
  (c) the plurality of servicing provider nodes, (iv) each edge of the plurality of edges connects two of the plurality of nodes;

(v) one or more columns of the tabular data object are used to identify one or more of the plurality of nodes; and (vi) the plurality of edges is based at least in part on a plurality of tabular correlations indicated by the tabular data object;

generating, by the one or more processors, a reduced search space for a second stage of processing the graph data object by, in a first stage of processing the graph data object:

identifying, by the one or more processors and using a first traversal of the graph data object, one or more member nodes of the plurality of member nodes as one or more irregular member nodes based at least in part on detecting, during the first traversal, that the one or more member nodes comprise a first outlier attribute relative to at least one of the plurality of node attributes or the plurality of edge attributes; and identifying, by the one or more processors and using a second traversal of the graph data object, one or more referring provider nodes of the plurality of referring provider nodes as one or more irregular referring provider nodes based at least in part on detecting, during the second traversal, that the one or more referring provider nodes comprise at least a second outlier attribute relative to at least one of the plurality of node attributes or the plurality of edge attributes;

in the second stage of processing the graph data object, selectively processing, by the one or more processors, the graph data object within the reduced search space by:

identifying, by the one or more processors and using a third traversal of the graph data object a servicing provider node of the plurality of servicing provider nodes as an irregular servicing provider node based at least in part on (i) the one or more irregular member nodes identified in the first traversal connected to the servicing provider node and (ii)the one or more irregular referring provider nodes identified in the second traversal; and generating, by the one or more processors, a prediction output user interface configured to depict one or more of the one or more irregular member nodes, the one or more irregular referring provider nodes, or the irregular servicing provider node.

17. The computer-implemented method of claim 16, further comprising, prior to retrieving the scheme data object:

receiving webpage data objects comprising webpage metadata, wherein the webpage data objects are dynamically generated based on systematic browsing of webpage data;

generating the scheme data object by:

performing natural language processing on the webpage metadata to generate the scheme metadata; and compiling the scheme metadata into the scheme data object; and storing the scheme data object in the database.

18. The computer-implemented method of claim 16, wherein each input data object of the plurality of input data objects comprises input metadata, and wherein the computer-implemented method further comprises generating the tabular data object based at least in part on:

retrieving the plurality of input data objects, wherein each of the plurality of input data objects comprises input metadata;

selecting a first subset of input data objects from the plurality of input data objects wherein at least one input metadata field of the input metadata of each input data object in the first subset of input data objects matches a corresponding scheme metadata field of the scheme metadata of the scheme data object; and generating the tabular data object based at least in part on the first subset of input data objects, wherein the tabular data object indicates a plurality of tabular correlations among the input metadata of the first subset of input data objects.

19. One or more non-transitory computer-readable storage media storing instructions that, when executed by one or more processors, cause the one or more processors to perform operations comprising:

receiving, from a database and based at least in part on input metadata of at least one input data object of a plurality of input data objects, a scheme data object that comprises scheme metadata;

generating a tabular data object based at least in part on the plurality of input data objects and the scheme metadata;

generating a graph data object based at least in part on the tabular data object, wherein:
  (i) the graph data object comprises (a) a plurality of nodes and a plurality of node attributes for the plurality of nodes and (b) a plurality of edges and plurality of edge attributes for the plurality of edges,
  (ii) the plurality of node attributes and the plurality of edge attributes represent one or more behavioral utilization aspects of a triangular relationship that is (a) among one or more of a plurality of referring provider nodes, one or more of a plurality of servicing provider nodes, and one or more of a plurality of member nodes, and (b) with respect to a fraud scheme corresponding to the scheme data object,
  (iii) the plurality of nodes comprises
    (a) the plurality of member nodes,
    (b) the plurality of referring provider nodes, and
    (c) the plurality of servicing provider nodes,
  (iv) each edge of the plurality of edges connects two of the plurality of nodes;
  (v) one or more columns of the tabular data object are used to identify one or more of the plurality of nodes; and
  (vi) the plurality of edges is based at least in part on a plurality of tabular correlations indicated by the tabular data object;
generating a reduced search space for a second stage of processing the graph data object by, in a first stage of processing the graph data object:
  identifying, using a first traversal of the graph data object, one or more member nodes of the plurality of member nodes as one or more irregular member nodes based at least in part on detecting, during the first traversal, that the one or more member nodes comprise a first outlier attribute relative to at least one of the plurality of node attributes or the plurality of edge attributes; and
  identifying, using a second traversal of the graph data object, one or more referring provider nodes of the plurality of referring provider nodes as one or more irregular referring provider nodes based at least in part on detecting, during the second traversal, that the one or more referring provider nodes comprise at least a second outlier attribute relative to at least one of the plurality of node attributes or the plurality of edge attributes;
in the second stage of processing the graph data object, selectively processing the graph data object within the reduced search space by:
  identifying, using a third traversal of the graph data object, a servicing provider node of the plurality of servicing provider nodes as an irregular servicing provider node based at least in part on (i) the one or more irregular member nodes identified in the first traversal connected to the servicing provider node and (ii) the one or more irregular referring provider nodes identified in the second traversal; and
generating a prediction output user interface configured to depict one or more of the one or more irregular member nodes, the one or more irregular referring provider nodes, or the irregular servicing provider node.

* * * * *

UNITED STATES PATENT AND TRADEMARK OFFICE
CERTIFICATE OF CORRECTION

| | | |
|---|---|---|
| PATENT NO. | : 12,346,913 B2 | Page 1 of 1 |
| APPLICATION NO. | : 17/249383 | |
| DATED | : July 1, 2025 | |
| INVENTOR(S) | : Chirag Mittal et al. | |

It is certified that error appears in the above-identified patent and that said Letters Patent is hereby corrected as shown below:

In the Claims

In Column 78, Line 31, Claim 13, delete "average-claim-line- per-member" and insert
-- average-claim-line-per-member --, therefor.

In Column 78, Line 36, Claim 14, delete "wherein the further" and insert -- wherein the operations further --, therefor.

In Column 78, Line 55, Claim 14, delete "average- distance" and insert -- average-distance --, therefor.

Signed and Sealed this
Seventh Day of October, 2025

John A. Squires
*Director of the United States Patent and Trademark Office*